US011362846B1

(12) United States Patent
Head et al.

(10) Patent No.: US 11,362,846 B1
(45) Date of Patent: *Jun. 14, 2022

(54) PUBLISH/SUBSCRIBE MESSAGING PATTERN IN COMMUNICATIONS AMONG MOBILE COMPUTING DEVICES

(71) Applicant: WHATNOT INC., Marina Del Rey, CA (US)

(72) Inventors: Logan Head, Marina Del Rey, CA (US); Alexander Loukissas, Los Angeles, CA (US)

(73) Assignee: WHATNOT INC., Marina Del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/543,073

(22) Filed: Dec. 6, 2021

Related U.S. Application Data

(63) Continuation of application No. 17/238,018, filed on Apr. 22, 2021, now Pat. No. 11,196,577.

(51) Int. Cl.
| | |
|---|---|
| *H04L 12/18* | (2006.01) |
| *G06Q 30/08* | (2012.01) |
| *H04L 67/55* | (2022.01) |
| *G06K 7/14* | (2006.01) |

(52) U.S. Cl.
CPC ......... *H04L 12/1809* (2013.01); *G06Q 30/08* (2013.01); *H04L 67/26* (2013.01); *G06K 7/1417* (2013.01)

(58) Field of Classification Search
CPC ..... H04L 12/1809; H04L 67/26; G06Q 30/08; G06K 7/1417
See application file for complete search history.

(56) References Cited

U.S. PATENT DOCUMENTS

| | | | |
|---|---|---|---|
| 2006/0112003 A1* | 5/2006 | Levy .................. | G06Q 30/0633 705/37 |
| 2009/0099939 A1* | 4/2009 | Thakur ................. | G06Q 30/08 705/26.3 |
| 2010/0325004 A1* | 12/2010 | Schoettle ........... | G06Q 30/0623 705/26.1 |
| 2012/0130843 A1* | 5/2012 | Himmerick ........... | G06Q 30/08 705/26.3 |
| 2018/0060945 A1* | 3/2018 | Hammond ......... | G06Q 30/0641 |
| 2020/0226676 A1* | 7/2020 | Hamor .................. | G06Q 30/08 |

\* cited by examiner

*Primary Examiner* — Asghar H Bilgrami
(74) *Attorney, Agent, or Firm* — Marshall, Gerstein & Borun LLP

(57) ABSTRACT

Systems and method may implement a publish/subscribe messaging framework for distributing messages among a plurality of mobile computing devices. A particular "publish/subscribe channel" may be implemented in the context of an auction for one or more items, e.g., collectibles such as trading cards, toys, and/or figurines. The implementation of the publish/subscribe messaging framework may allow for real-time communications of developments in the auction(s) which, in combination with a real-time video stream from a host to a plurality of guests in the channel, amounts to an improved user experience at host devices and guest devices.

27 Claims, 29 Drawing Sheets

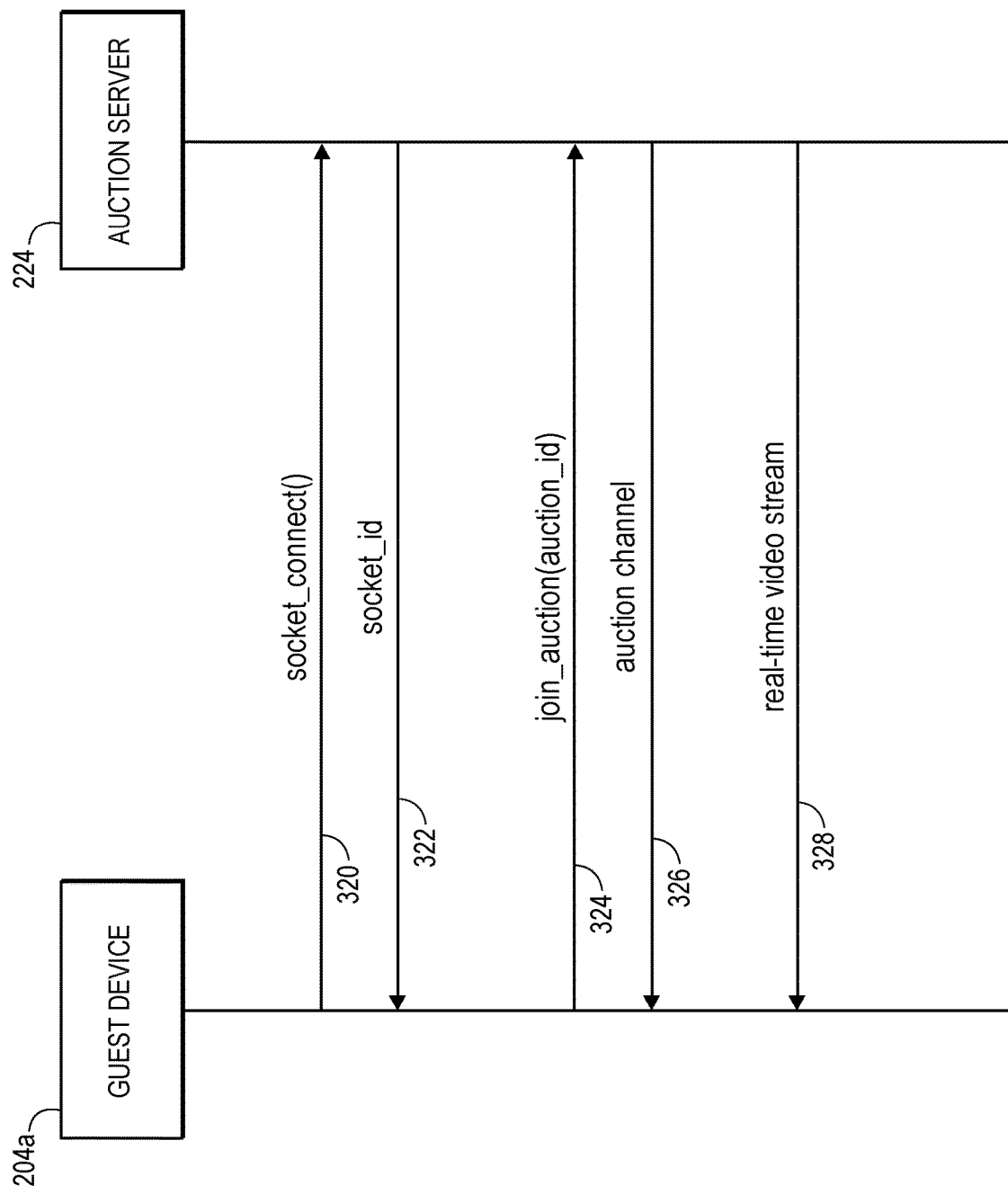

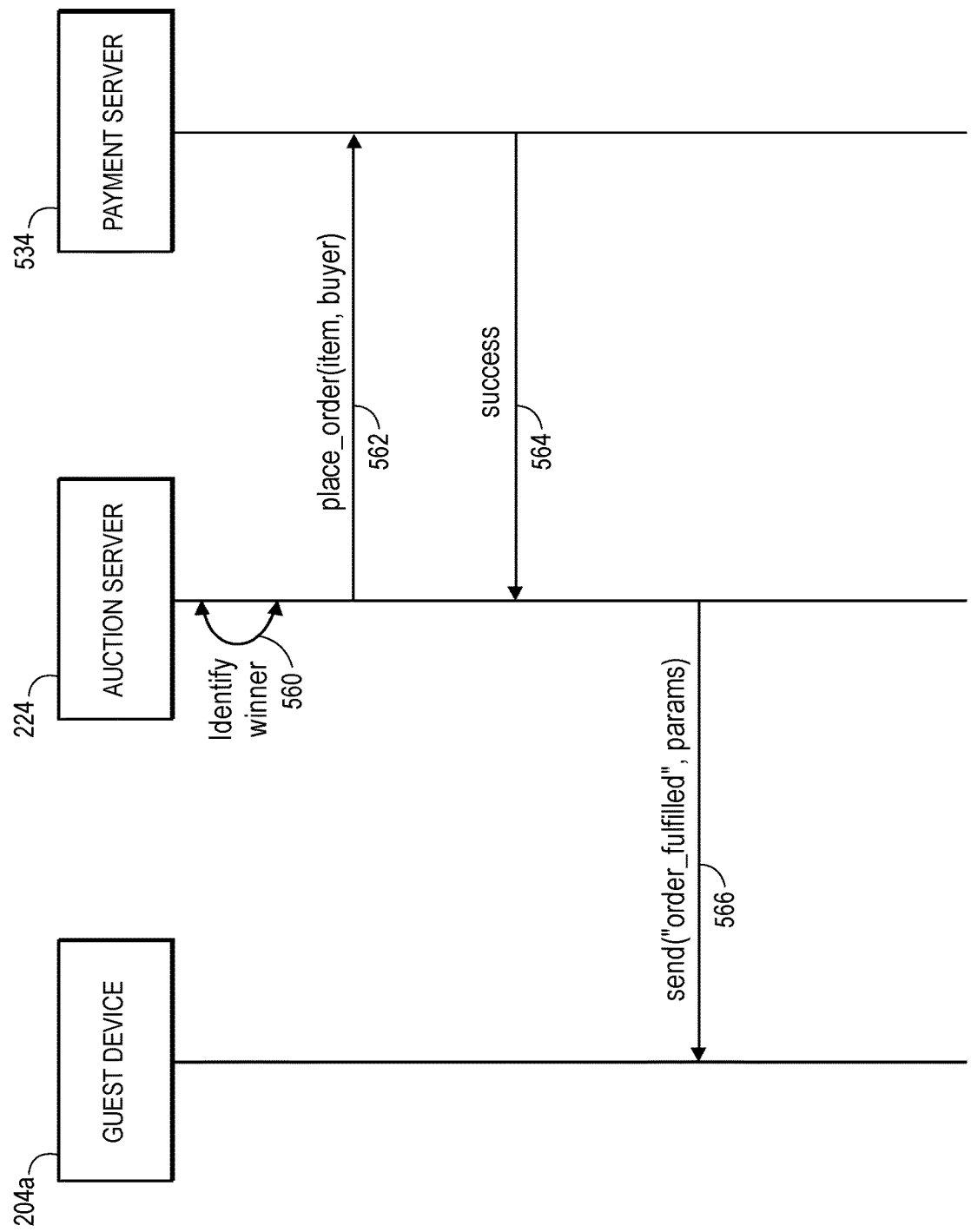

PUBLISH/SUBSCRIBE MESSAGING PATTERN IN COMMUNICATIONS AMONG MOBILE COMPUTING DEVICES

CROSS REFERENCE TO RELATED APPLICATIONS

This application is a continuation application that claims priority to and the benefit of the filing date of U.S. patent application Ser. No. 17/238,028, filed Apr. 22, 2021 and entitled "Publish/Subscribe Messaging Pattern in Communications Among Mobile Computing Devices." The disclosure of the above-referenced application is hereby expressly incorporated by reference in its entirety.

TECHNICAL FIELD

The present disclosure generally relates to mobile computing device communications, and more specifically, to a scalable publish/subscribe messaging framework for handling communications among mobile devices in conjunction with provision of a real-time video stream.

BACKGROUND OF THE DISCLOSURE

In the field of mobile computing devices such as smartphones, smart tablets, and the like, recent innovations have produced improvements to graphical display capabilities, touchscreen interactivity, integrated camera hardware, and data processing and transmission rates. Moreover, improvements to mobile cellular communication networks and other wired/wireless communications networks have produced improvements to data transmission speeds, traffic handling capacity, and connection reliability.

These and other technological improvements offer opportunities to make various interactive services available via mobile computing devices, those services including, for example, auctions of collectible items such as trading cards, toys, figurines, etc. However, existing attempts to implement such interactive services present technological shortcomings, at least in relation to timeliness of distribution of information, level of user interactivity, and scalability of computing architectures in environments comprising a large number of mobile computing devices.

SUMMARY

At a high level, systems and methods described herein relate to a publish/subscribe messaging framework for messaging among a plurality of client computing devices (e.g., mobile computing devices such as smartphones, smart tablets, etc.). Specifically, a publish/subscribe channel may be implemented in the context of an auction of one or more items by a user of "host" device to users of a plurality of "guest" devices (a "live auction event"). One or more servers may function as a message broker in the publish/subscribe channel associated with the live auction event (a "live auction channel"), enabling the host device and guest devices to publish and/or subscribe to pre-defined classes of messages distributed by way of the one or more servers. Use of the publish/subscribe messaging framework enables scalable, real-time communication of auction information among participating devices which, in combination with distribution of a real-time video stream from the host device to the guest devices as described herein, amounts to an improved user experience at host devices and guest device, in comparison technologies implementing online auction platforms.

In embodiments, one or more servers are provided. The one or more servers may include (1) one or more processors, and (2) one or more memories storing non-transitory computer executable instructions that, when executed via the one or more processors, cause the one or more servers to, (i) responsive to first communications received from a first client computing device, establish the first client device as a host device in a publish/subscribe channel, the publish/subscribe channel enabling the host device to publish, via the one or more servers to a plurality of guest devices in the publish/subscribe channel, information associated with one or more items, (ii) provide, to each of a plurality of second client computing devices, an indication of the publish/subscribe channel being available to each of the plurality of second client devices, (iii) responsive to second communications from respective ones of the plurality of second client devices, establish the respective ones of the plurality of second client devices as guest devices in the publish/subscribe channel, (iv) cause a real-time video stream to be transmitted to each of the plurality of guest devices, the real-time video stream originating from the host device, (v) receive, from the host device, third communications indicative at least of a particular item for sale from among the one or more items, and/or (vi) responsive to receiving the third communications from the host device, transmit a plurality of real-time values to each of the plurality of guest devices via the publish/subscribe channel, the plurality of real-time values being indicative of the particular item, a price of the particular item, and an end time of the sale of the particular item. The one or more servers may be configured to perform additional, fewer, and/or alternate actions, in various embodiments.

In other embodiments, one or more non-transitory computer readable media may be provided. The one or more non-transitory computer readable media may store non-transitory computer executable instructions that, when executed via one or more processors of a client computing device, cause the client computing device to (1) receive, via a graphical user interface presented at a display unit of the client device, a first one or more user interactions indicative of one or more items, (2) via communications between the client device and one or more servers, establish the client device as a host device in a publish/subscribe channel associated with the one or more items, the publish/subscribe channel enabling the client device to publish, to a plurality of guest devices in the publish/subscribe channel, real-time information associated with the one or more items, (3) via communications between the client device and one or more servers, establish the client device as a host device in a publish/subscribe channel associated with the one or more items, the publish/subscribe channel enabling the client device to publish, to a plurality of guest devices in the publish/subscribe channel, real-time information associated with the one or more items, (4) receive, via the graphical user interface, a second one or more user interactions indicative of item information including at least (i) a particular item for sale from among the one or more items, and (ii) a price of the particular item, and/or (5) transmit, to the one or more servers in real-time, the video stream and the item information for display of the real-time video stream concurrently with the item information at each of the plurality of guest devices in the publish/subscribe channel. The one or more non-transitory computer readable media may include additional, fewer, and/or alternate instructions, in various embodiments.

In still other embodiments, one or more non-transitory computer readable media may be provided. The one or more non-transitory computer readable media may store non-transitory computer executable instructions that, when executed via one or more processors of a client computing device, cause the client computing device to (1) receive, via a graphical user interface presented at a display unit of the client device, a user selection of a publish/subscribe channel associated with one or more items, (2) responsive to receiving the user interaction, and via communications with one or more servers, establish the client device as a first guest device in the publish/subscribe channel to enable the client device to receive real-time information published by a host device and by one or more other guest devices via the publish/subscribe channel, (3) upon establishing the client device as the first guest device, receive and display at the display unit, via the graphical user interface, a real-time video stream associated with the publish/subscribe channel, the real-time video stream originating from the host device, (4) receive, from the one or more servers via the publish/subscribe channel, a plurality of real-time values indicative of item information including at least (i) a particular item for sale from among the one or more items, the particular item being selected via the host device, (ii) a real-time price of the particular item, and (iii) real-time participation of the one or more other guest devices in the publish/subscribe channel, (5) receive, from the one or more servers via the publish/subscribe channel, a value indicative of an end time of the sale of the particular item, and/or (6) display, via the graphical user interface concurrently with the real-time video stream, a plurality of user interface elements indicative of the received item information and the end time. The one or more non-transitory computer readable media may include additional, fewer, and/or alternate instructions, in various embodiments.

BRIEF DESCRIPTION OF THE FIGURES

FIG. 3A is a signal diagram detailing example actions associated with joining an auction channel, in accordance with some embodiments;

FIG. 5C is a signal diagram detailing example actions associated with a successful payment process, in accordance with some embodiments;

DETAILED DESCRIPTION

Figure 1:
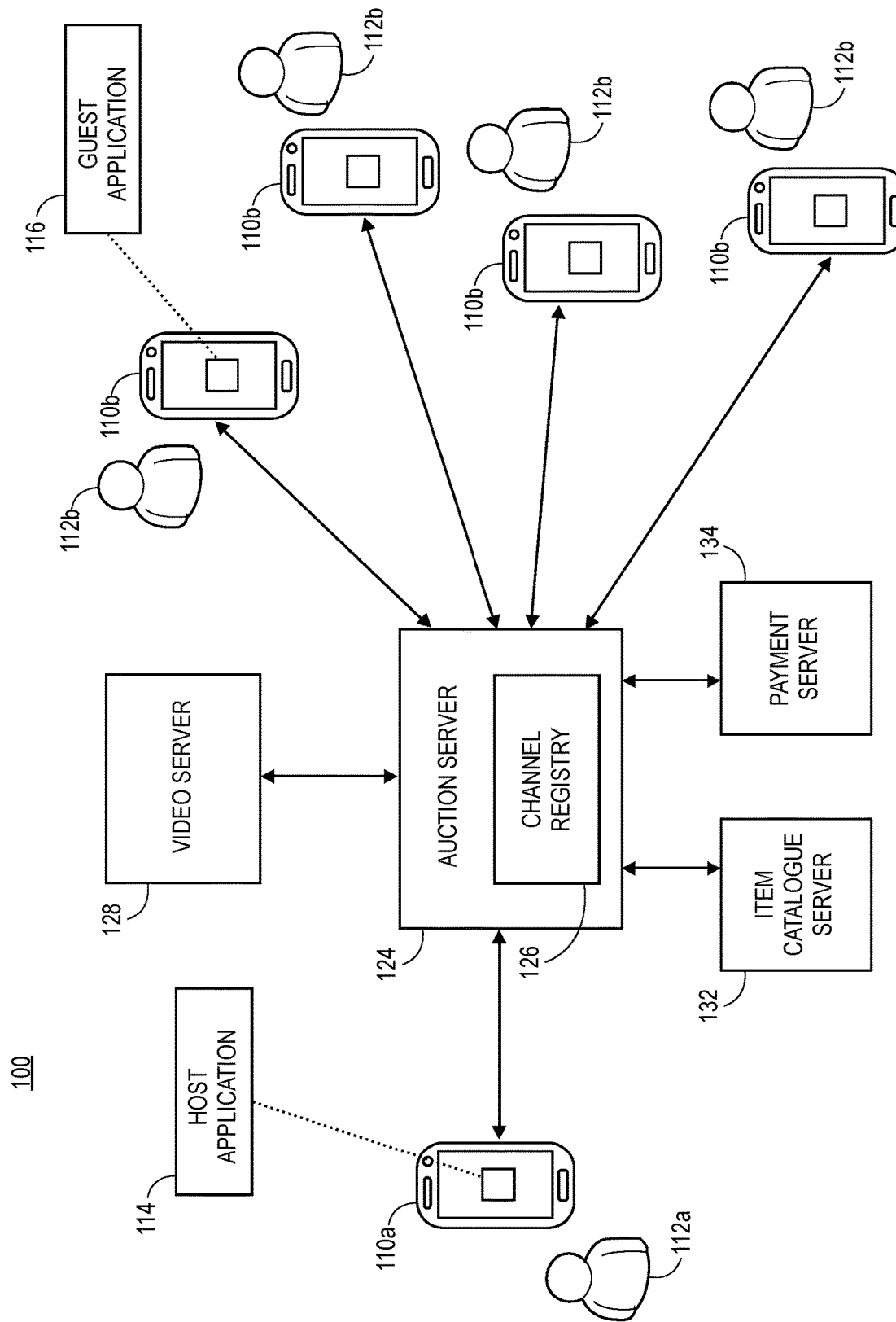
FIG. 1 is a block diagram of an example computing environment, in accordance with some embodiments of the present description.

Embodiments of the present disclosure relate to computing systems and computer-implemented methods for implementing live, online auction events accessible via mobile computing devices such as smartphones, smart tablets, and the like. A "live auction event" according to the present description may be implemented, for example, to auction a variety of collectible items, including but not limited to trading cards, toys, and/or figurines. Notably, systems and methods of the present disclosure implement messaging among a plurality of participant devices in the live auction event via a messaging framework referred to as a "publish/subscribe pattern," which offers a number of technological benefits over existing approaches to online auctions, and which will be described in further detail herein.

Very broadly speaking, in a live auction event, a "host" of the event (e.g., a seller of one or more items) can designate one, two, three, or more items to be auctioned during the event, in an order that the host can figure before and/or during the event. Upon a start time of the event, a plurality of "guests" (i.e., prospective bidders for the one or more items) can connect to the live auction event and receive, at their respective mobile computing devices ("guest devices"), a unidirectional real-time video stream originating from the host's device (i.e., a one-way video stream, with or without accompanying audio from the host's device). A guest device, upon connecting to the live auction event, accesses graphical user interfaces (GUIs) providing access to real-time values of parameters associated with the auction, e.g., a particular item currently being auctioned, a current price of the particular item (e.g., a current highest bid and the corresponding bidder), and an end time for the auction (e.g., a countdown timer). Guests may use GUIs at their respective devices to submit bids, post comments visible to the host and other guests, and/or otherwise participate in the live auction event, all without interrupting the provision of the real-time video stream to the guest device. In some embodiments, the host can offer, in the context of the live auction event, additional items for "direct purchase" by other participants (i.e., purchase at a preset price without performing an auction), still without interrupting the real-time video stream at devices of participants viewing said additional items.

Upon the end of an auction for any particular item, the host device and guest device are notified of the winner of the auction for the particular item, and the host may designate a next item to subsequently be auctioned. The auction event accordingly transitions to the auctioning of the designated next item, without interrupting the provision of the real-time video stream to guest devices and without requiring guests to navigate to a new environment (e.g., a different web page) to access the auction of the next item.

Throughout this detailed description, the term "host" generally refers to a user who performs actions to administrate a live auction event, e.g., designating one or more items for auction, setting prices for the one or more items, and transmitting a real-time video stream to "guests" who may view the real-time video stream and bid on the one or more items. It should be understood that, in some instances, the term "host," when used herein, may refer in shorthand to the computing device of the host user (the "host device"). Similarly, the terms "guest" or "bidder" may refer in shorthand to the computing device of the guest user (the "guest device"). Additionally, as used herein, "real-time" communication of data refers to electronic communication of data through electronic communication networks with ordinary delays for processing, routing, and transmission, without the intentional introduction of non-trivial delays. In some embodiments, real-time communications may involve trivial delays (e.g., less than five seconds, and preferably less than two seconds or one second) to reduce network congestion when communicating data in real-time.

Messaging Framework for Live Auction Events

To implement the live auction events described herein, the systems and methods of the present description implement messaging among a host device and guest devices by way of a messaging framework referred to as a "publish/subscribe channel." In a publish/subscribe channel, a message broker (e.g., one or more servers) is configured to operate as a central hub for messaging among each of a plurality of devices "registered" as participants in the channel (e.g., host and guest devices, which may be registered by a device identifier and/or by a user identifier). Broadly speaking, the message broker maintains a registry indicating a list of registered participants and the particular types "classes" of messages the participants are registered to send ("publish") to the message broker and/or automatically receive ("subscribe to") from the message broker in the publish/subscribe channel. For any first participant to distribute a given message to one or more other registered participants, the first participant sends or "publishes" a message to the message broker. Rather than the published message explicitly identifying one or more intended recipients, the message broker in the publish/subscribe framework identifies the class of the message and uses the message class (and, in some instances, the payload of the message) to determine which other one(s) of the registered participants are subscribed to receive the published message. Responsive to this determination, the message broker automatically transmits (or "broadcasts") the message to the other identified participant device(s) in real-time.

Thus, the publisher of a given message in the publish/subscribe channel does not directly program the message to be sent to specific recipients, but rather, categorizes the message as belonging to a particular class, based upon which the message broker identifies the proper recipient(s). Conversely, subscribers express interest in receiving particular classes of messages automatically from the message broker, but are not specifically aware of what publishers exist at any given time, and do not explicitly request the messages broadcasted by the message broker. As a result, in the publish/subscribe framework, publisher and subscriber devices do not need to be specifically aware of each other or directly connected to each other. Rather, each registered participant device maintains a connection only to the message broker, allowing the message broker to control the distribution of messages. As a result, the publish/subscribe channel provides a scalable, pre-defined framework allowing for dynamic addition or subtraction of participant devices, and facilitates real-time communications among participant devices by automatically directing messages from publisher devices to appropriate subscriber devices in real-time.

To control the distribution of messages in the publish/subscribe channel, the message broker registry stores a list of pre-defined message classes that effectively function as "sub-channels" to the publish/subscribe channel. The message classes are identified, respectively, by unique identifiers (e.g., unique identification numbers or strings). Each message class is associated with a respective one or more parameters, values for which form the payload of any given message belonging to a given class. Each message class may further be associated with authorization information defining what types of participants or "roles" are authorized to publish and/or subscribe to messages belonging to the given class. Responsive to a request from a given device to join or "register" in the publish/subscribe channel, the message broker adds the device to the channel by adding an indication of the participant to the registry (i.e., a unique identifier of the device and/or its user), including a role for the participant to be used to control the participant's publish and/or subscribe capabilities. One or more applications executing at respective devices participating in the publish/subscribe channel may store configuration information indicating the pre-defined message classes and the pre-defined parameters associated therewith, such that the participant devices are capable of generating, transmitting, and/or recognizing messages in a format conforming to the publish/subscribe channel.

Upon receiving a given message from a publisher device ("a published message"), the message broker references the stored list of pre-defined message classes stored at the registry to determine the class of the message. The message broker cross-references the registry to (1) verify that the publisher is, in fact, authorized to publish the class of message, and (2) identify a subset of registered participants that are subscribed to receive the message. In some instances, the message broker performs additional processing upon the received message, such as content-based filtering (e.g., permitting or denying distribution of the message based upon the message payload), adding or removing parameters, and/or storing parameters to message broker's local memory based upon the message. Furthermore, in some instances, the message broker may generate and transmit messages of its own, in addition to those published by participant devices. In any event, the message broker, upon determining that the published message is in appropriate form for distribution to identified recipients, transmits or "broadcasts" the message to the identified recipients.

In the context of the present description, communications associated with a live auction event are facilitated by a unique instance of a publish/subscribe channel (a "live auction channel"), comprising a unique registry of participants, roles, and messages etc. In a live auction channel, each registered participant is assigned to either the role of "host" or "guest." In some embodiments, each live auction channel is permitted to have only a small, limited number of hosts (e.g., one, two, or three hosts), but a much larger number of guests (e.g., one hundred, three hundred, or one thousand concurrent guests). Roles among guests may be further differentiated into sub-roles, e.g., to differentiate guests who have configured valid payment information to be used to place orders for items, from guests who have not configured valid payment information.

Message classes in a live auction channel correspond, respectively, to a limited number of actions that registered participants can perform in a live auction event. As an example, host participants may be uniquely permitted to publish messages identifying which item is to be auctioned, identifying a starting auction price for an item, pausing/resuming the live auction event, etc. Hosts may be subscribed to receive messages indicating new bids from guests, but may not themselves be permitted to publish new bids. As another example, all guests may be permitted to publish new comments and subscribe to new bids and comments, but may not be permitted to publish the classes of messages reserved for the host only. Furthermore, guests having valid payment information may be permitted to publish new bids, but guests lacking valid payment information may not be permitted to publish new bids. Some messaging permissions may be further limited based upon a state of the live auction event, as managed by logic executing at the message broker (for example, new bid messages cannot be placed between auctions for first and second items). Still additionally, in some embodiments, the message broker itself is uniquely permitted to generate and broadcast certain classes of messages (e.g., upon an auction timer expiring, only the message broker may generate and broadcast a message notifying participants of the winning bidder). Additional examples of message classes and permissions in a live auction channel will be evident from the present description.

Upon registering with the message broker as a guest in a live auction channel, the guest device may be configured to initially "load" the live auction event by requesting and receiving information the message broker indicating the current state of the event (e.g., a current item for auction, a current price and highest bidder, recently posted comments, other items queued for auction or available for purchase during the event, etc.), and by establishing a connection to the real-time video stream of the host device to the guest device (e.g., via further communications with the message broker). After loading the live auction event, communications of the registered guest device is limited to only (1) transmitting or receiving the real-time videos stream, and (2) publishing/subscribing to particular classes of messages in the live auction channel in accordance with the guest's role. Because the message broker manages the message classes, roles, and participants, the registered device does not need to form direct connections to other individual ones of the participant devices in the live auction channel, nor does the registered device need to refresh to explicitly request content from the message broker after the initial loading. Instead, the registered device simply publishes and/or subscribes to particular classes of messages, without requiring specific knowledge of the ultimate destinations or origins of said messages.

The live auction channels described herein offer a number of technological advantages as compared to conventional approaches for implementing online auctions. A few such advantages are described below.

Some conventional implementations of online auctions may, for example, allow bidders to use a web browser or another application to access a web page hosted by a server and listing an item (or, in some cases, multiple items) currently being auctioned. Specifically, responsive to the bidder device requesting access to the web page (e.g., the bidder device sending an HTTP request), the server may transmit auction information to the bidder device to be displayed on the web page the bidder device, the auction information including the item name, the current auction price for the item, etc. If, however, said auction information changes while the user of the bidder device is viewing the web page (e.g., another bidder has placed a higher bid), the web page as shown at the bidder's device will not immediately reflect the changes to the information. That is, the current price, highest bidder, etc. will not change, despite the higher bid having been placed. Instead, the user of the bidder device would need to refresh the web page to pull the entire web page from the server anew, to thereby receive the updated auction information (e.g., the bidder device sends another HTTP request and receives another response from the server). Accordingly, if the user of the bidder device attempts to place a bid some time after the most recent page refresh, the bid may unexpectedly fail because of actions that occurred without the user's knowledge since the most recent page refresh.

Certain approaches may attempt to mitigate this problem by encoding the server, the bidder device or both to automatically refresh the web page at the bidder device upon a predetermined interval of time (e.g., 15 seconds, 30 seconds, 60 seconds, etc.), and/or in response to particular actions by the user (e.g., interaction with a particular portion of the web page). However, although these approaches might remove the need for the user to manually refresh the page, problems remain that are inherent to requiring a web page refresh. For one, auction information may still change substantially between refreshes of the web page, thus maintaining the potential for failed bids. Additionally, the web page may effectively be unavailable at the bidder device for whatever amount of time is required to perform the refresh (e.g., the time required to send the HTTP request, receive a response, and load and display the information at the bidder device). Still additionally, the process of refreshing the web page may erase any content partially entered into fields within the web page (e.g., a bid text field or a comment text field).

Additionally even still, if an auction using any of the aforementioned "refresh" approaches were to attempt to provide a real-time video stream viewable at the web page at the bidder device, the video stream would be ineffective at least because (1) page refreshes would frequently interrupt the video stream, and (2) auction information depicted in the video stream would often be out-of-date with information viewed at the bidder device, particularly if the bidder device has not recently refreshed. In light of these challenges, online auctions using conventional approaches may choose simply to not implement real-time video streaming at all.

Moreover, the approaches to online auctions as described above present still additional problems relating to digital user engagement and user retention. For example, insofar as a seller of a first item may want bidders to be made aware of other items from the same seller, bidders may have to navigate away from the auction of the first item to view said other items (e.g., at other web pages and/or at other applications). Upon an end of the auction for the first item, most bidders may simply exit the web page, rather than explore the other available items. Thus, the seller offering the online auction for the first item may see limited retention of bidders (if any) in other auctions offered by the same seller. Still additionally, in many existing approaches to online auctions, the seller has no way of directly engaging with or entertaining bidders, further reducing user retention in the online auction.

The systems and methods of the present description (e.g., the implementation of a publish/subscribe channel in combination with a real-time video stream, using a persistent connection between client and server) provides technological improvements that overcome at least the above-described problems.

First, using the publish/subscribe messaging framework described herein, a guest device in a live auction channel does not need to actively refresh web pages or otherwise actively solicit updates to auction information, after the initial loading of the auction information from the message broker. Instead, by registering to the message broker as a guest, the guest device becomes subscribed to receive specific, pre-defined classes of messages to be automatically transmitted by the message broker in real-time (e.g., via a WebSocket connection between the guest device and the message broker). Thus, from the perspective of the guest device, access to the live auction event (including the real-time video stream) is uninterrupted. Furthermore, because the message broker provides real-time updates to auction information, the likelihood of the user inadvertently placing failed bids is substantially reduced.

Second, the live auction events of the present description provide aspects for user engagement and user retention that are lacking in conventional online auction approaches. For one, a host in the live auction events as described herein may sequentially auction a plurality of items through one live auction channel, potentially retaining a larger number of bidders as compared to conventional approaches. Additionally, real-time video streaming and comment functionality, in combination with the improved timeliness of auction information received at guest devices, affords a greater degree of live engagement between users, as compared to conventional approaches. For example, upon observing questions or comments about a particular item being auctioned, the host might choose to answer those questions via the real-time video stream, or might chose to set up similar items to be auctioned next based upon the potential for high user engagement. Still additionally, as will be described herein, a guest in the live auction channel may use various interactive GUIs to navigate to other items to be auctioned, navigate to items for direct purchase, configure a payment instrument, etc., still without interrupting the real-time video stream and without interrupting the receiving of real-time auction information at the guest device.

Other aspects of the publish/subscribe messaging framework for live auction channels, and other technological advantages associated therewith, will be evident from the present description.

Example Computing Environment

FIG. 1 illustrates a block diagram of an example computing environment 100 via which techniques of the present description may be implemented. In particular, elements of the computing environment 100 may implement a publish/subscribe channel for a live auction event, in combination with a real-time video stream from a host to a plurality of guests. Although various components of the example computing environment 100 will be described below, it should be understood that additional, fewer, and/or alternate components may be envisioned in various embodiments, without necessarily deviating from the techniques described herein.

The computing environment includes a first mobile computing device 110a associated with a first user 112a, and a plurality of second mobile computing devices 110b associated with respective ones of a plurality of second users 112b. Mobile computing devices 110a and 110b may include, for example, smartphones, smart tablets, smart wearable devices, other suitable mobile devices, or some combination thereof. Although mobile computing devices 110a and 110b are discussed herein, it should be understood that the mobile computing devices 110*a* and 110*b* may, in some embodiments, be substituted for desktop computers and/or other non-mobile devices.

In the example environment 100, the first user 112*a* represents a host (or "host user") of a live auction event (e.g., a person or persons placing one or more items for auction). Thus, the first mobile computing device 110*a* is generally referred to herein as a host device 110*a*. The second users 112*b* in this example represent "guest users" participating in the live auction event (e.g., prospective bidders for one or more items). Thus, the mobile computing devices 110*b* are referred to herein as guest devices 110*b*.

Each of the mobile computing devices 110*a* and 110*b* may respectively comprise one or more computer processors and one or more non-transitory computer memories storing instructions that, when executed via the one or more processors, cause the device 110*a* or 110*b* to perform the actions attributed to the device 110*a* or 110*b* in the present description. In the case of the host device 110*a*, the one or more non-transitory memories may store one or more software applications 114 ("host application") including one or more sets of non-transitory computer executable instructions that, when executed via the one or more processors, cause the host device 110*a* to perform actions described herein. Similarly, the one or more memories of each guest device 110*b* may store one or more software applications 116 ("guest application") including one or more sets of non-transitory computer executable instructions that, when executed via the one or more processors of the guest device 110*b*, cause the guest device 110*b* to perform actions described herein. Although host application 114 and guest application 116 are illustrated as separate blocks in FIG. 1, it should be understood that applications 114 and 116 may represent separate aspects of a same one or more applications (e.g., a single application stored and executed both at devices 110*a* and 110*b*). Each of the host device 110*a* and guest devices 110*b* may comprise one or more application programming interfaces (APIs) operable for example to (1) generate and display GUIs, (2) transmit and/or receive real-time video data and/or auction information from one or more servers described herein.

The host device 110*a* (and, in some instances, the guest devices 110*b*) may comprise one or more camera devices, which may capture and transmit video data in real-time. Additionally, in some embodiments, the host device 110*a* (and in some instances, the guest devices 110*b*) may include one or more microphones and/or speaker, which may capture, transmit, and/or play audio (e.g., audio accompanying a real-time video stream). The one or more camera devices, microphones, and/or speakers may include integrated devices (e.g., a camera, microphone, or speaker natively included in a mobile computing device) and/or devices otherwise communicatively tethered to the host device 110*a* or guest device 110*b* (e.g., a peripheral webcam, speaker, or microphone connected wiredly or wirelessly to the mobile computing device). Additionally, each of the host device 110*a* and guest devices 110*b* may include one or more interactive I/O units (e.g., touchscreens, touchpads, keyboard, etc.) enabling navigation of graphical user interfaces, viewing of a real-time video stream, and/or interactive functionalities described herein.

An auction server 124 (i.e., one or more servers) may facilitate communications among devices 110*a* and 110*b*, and may store information associated with implementation of publish/subscribe channels described herein. The auction server 124 may include one or more processors and one or more non-transitory computer readable memories storing instructions that, when executed via the one or more processors, cause the auction server 124 to perform actions described herein. The one or more non-transitory memories of the auction server 124 may include a channel registry 126 storing information including, for example, a registry of live auction channels, message classes associated with the live auction channels, role-based authorization information associated with the live auction channels, messaging history regarding the live auction channels, device configuration information associated with devices 110*a* and 110*b*, profile information regarding users 112*a* and 112*b*, auction information regarding items being auctioned, and/or other relevant information described herein.

The auction server 124 may communicate with still additional servers to facilitate other functions described herein. For example, a video server 128 may facilitate provision of a unidirectional real-time video stream from the host device 110*a* to each of the plurality of guest devices 110*b* (the real-time video stream may include or exclude accompanying audio, in alternate embodiments). Additionally or alternatively, an item catalogue server 132 may store a listing of known items, from among which hosts 112*a* may explore and select one or more items to be included for auction in live auction events. Still additionally or alternatively, a payment server 134 may store and process payment information relating to hosts 112*a* and/or guests 112*b*, e.g., upon the guests 112*b* adding respective payment information via the guest application 116. Although each of the video server 128, item catalogue server 132, and payment server 134 are described in singular herein, it should be understood that each of the servers 128, 132, and 134 may respectively comprise one or more server devices, with functions thereof being distributed among the one or more servers.

Arrows in FIG. 1 represent signal communications exchanged among the elements of the computing environment 100. Elements of the computing environment 100 may communicate via any suitable one or more communications networks (e.g., the Internet, a wired or wireless local area network (LAN), etc.). Elements of the computing environment 100 may communicate of via any suitable one or more communication protocols, including for example a mobile cellular communications protocol (e.g., CDMA, GSM, EV-DO, LTE, IP, etc.), one or more IEEE 802.11 protocols (e.g., Wi-Fi), Bluetooth, and/or other suitable protocols in accordance with the computing capabilities of respective elements of the computing environment 100.

Generally, each of the video server 128, the item catalogue server 132, and the payment servers 134 may respectively comprise one or more processors and one or more non-transitory memories storing computer executable instructions that, when executed by the one or more processors, cause the server(s) to perform actions described herein. Although arrows in FIG. 1 connect the mobile computing devices 110*a* and 110*b* to the servers 128, 132, and 134 by way of the one or more auction servers 124, it should be noted that in some embodiments, the server(s) 128, 132, and/or 134 may exchange communications directly with the mobile computing devices 110*a* and 110*b*. Furthermore, although the servers 124, 128, 132, and 134 are illustrated in FIG. 1 as separate elements, it should be understood that functions of the servers 124, 128, 132 and 134 may be combined in various manners, in some embodiments. For example, in some embodiments, the auction server 124 is configured to also perform at least some of the functions of the video server 128, the item catalogue server 132, and/or the payment server 134.

To implement a live auction channel, the auction server 124 may function as a message broker to generate and distribute messages among the host devices 110a and 110a accordingly to the publish/subscribe messaging framework as described herein. Additionally, the auction server 124 may facilitate distribution of a real-time video stream from the host device 110a to the guest devices 110b participating in any given live auction event. Still additionally, the auction server 124 may implement other logic in facilitation of live auction events (e.g., managing item lists, auction timers, user profiles for users 112a and 112b, payment and shipping of items, etc.).

To provide scalability to enable multiple live auction events to run concurrently, the auction server 124 may comprise a plurality of servers and/or nodes operating independently. Logic for a particular live auction event may be handled by a respective process assigned to the particular event, the process being associated with a portion of memory of the auction server 124 storing information regarding the particular event. The process at the auction server 124 may run for the duration of the live auction event, terminating for example upon conclusion of an auction for a final item in the event, and/or upon instructions from the host device 110a. On the occurrence of a crash of the process handling the live auction event at the auction server 124, the auction server 124 may restore the process by retrieving the auction information and list of registered devices in the channel from the corresponding portion of server memory, and re-starting the process to run using the retrieved information. Furthermore, if the host device 110a and/or the guest devices 110b have lost connection to the auction server 124, the auction server 124 may redistribute the retrieved information to the host device 110a and/or the guest devices 110b. Connections of the auction server 124 to respective ones of the host device 110a and guest devices 110b may be supported by respective WebSocket-based connections with devices 110a and 110b handled by respective processes running at respective nodes of the auction server 124, which are associated with the process or node handling the logic of the live auction event.

To instantiate a new live auction event, the host device 110a may establish a communicative connection with the auction server 124, for example via a WebSocket-based connection via a WebSocket API supported by the host application 114 and the auction server 124. The host device 110a and the auction server 124 may exchange communications to initialize the event, for example by the host device 110a transmitting to the auction server 124 a selection of one or more items for auction, a start date and time for the event, and/or other configuration information described herein. Examples of signal communications and GUIs associated with establishing a live auction event will be provided in subsequent portions of this detailed description, for example with respect to FIGS. 2A-2C and FIGS. 6A-6N.

After setting a date and time for a live auction event, the auction server 124 may establish a publish/subscribe channel associated with the live auction event (i.e., a live auction channel). Establishing the live auction channel may include defining the classes of messages classes available to be published and/or subscribed to in the channel, along with the authorization information defining which participant roles are enabled to publish and/or subscribe to said classes of messages. Upon a start time of the live auction event, the auction server 124 may open the publish/subscribe channel to registration by guest devices 110b and initiate transmission of a real-time video stream from the host device 110a to the auction server 124, for connection of the video stream to guest devices 110b as the guest devices 110b are registered as participants in the channel.

A guest device 110b may form communicative connection with the auction server 124, for example, via a WebSocket-based connection via a WebSocket API supported by the guest application 116 and by the auction server 124 (e.g., upon the guest device 110b opening the guest application 116). Once connected to the auction server 124, the guest device 110b may navigate one or more GUIs to explore one or more available live auction events (e.g., current and/or upcoming live auction events). Examples of such communication and GUIs will be described further with respect to FIGS. 2A-2C. Upon selecting a live auction channel to join, the auction server 124 establishes the device 110b (and/or device user 112b) as a participant with a role of guest in the selected live auction channel.

Upon establishing the guest device 110b in the live auction channel, the auction server 124 may connect the guest device 110b to the unidirectional real-time video stream from the host device 110a. Additionally, upon the guest device 110b being established, the guest device 110b may initially load the live auction channel by requesting and receiving current auction information from the auction server 124 (e.g., a current item being auctioned, highest bid information, recent comments posted by other guests, items available for future auction or for direct purchase in the channel, etc.). After the initial loading of the channel, the guest device 110b is not required to actively solicit the auction server 124 for updated auction information. Rather, the guest device 110b, as a subscriber to certain classes of messages in the live auction channel, will automatically receive real-time messages from the auction server 124 (e.g., messages published by the host 112a, messages published by other ones of the guest devices 110b, and/or still other messages generated by the auction server 124). Furthermore, upon being established as a guest, the guest device 110b is enabled to publish to the auction server 124 certain classes of messages, subject to the role authorization information and other auction logic managed by the auction server 124.

In the event of a crash of the guest application 116 at a guest device 110b, the guest device 110b may restore the live auction event by repeating the steps of establishing connection to the real-time video stream and loading auction information from the memory of the auction server 124. Similarly, in the event of a crash at the host application 114 at the host device 110a, the host device 11 a can restore the live action event by re-establishing the transmission of the real-time video stream from the host device 110a and loading auction information from the memory of the auction server 124.

Subsequent portions of this detailed description provide examples of signal communications and GUIs associated with implementation of live auction channels, with reference to FIGS. 2A-2C, 3A, 3B, 4A-4E, 5A-5D, and 6A-6N. In various embodiments, described communications and GUIs may be implemented by suitable components of the computing environment 100 described above. In instances where example processes are described with reference to signal diagrams, it should be understood that the example processes may include additional, fewer, and/or alternate actions, in various embodiments. Furthermore, order actions of the described processes may vary from the order illustrated in the signal diagrams. Where interactive GUIs at a mobile computing device are described, interactions with the interactive GUIs may occur, for example, via touchscreen interactions, voice commands, and/or other suitable forms of user input.

Establishing and Advertising a Live Auction Event

Figure 2A:
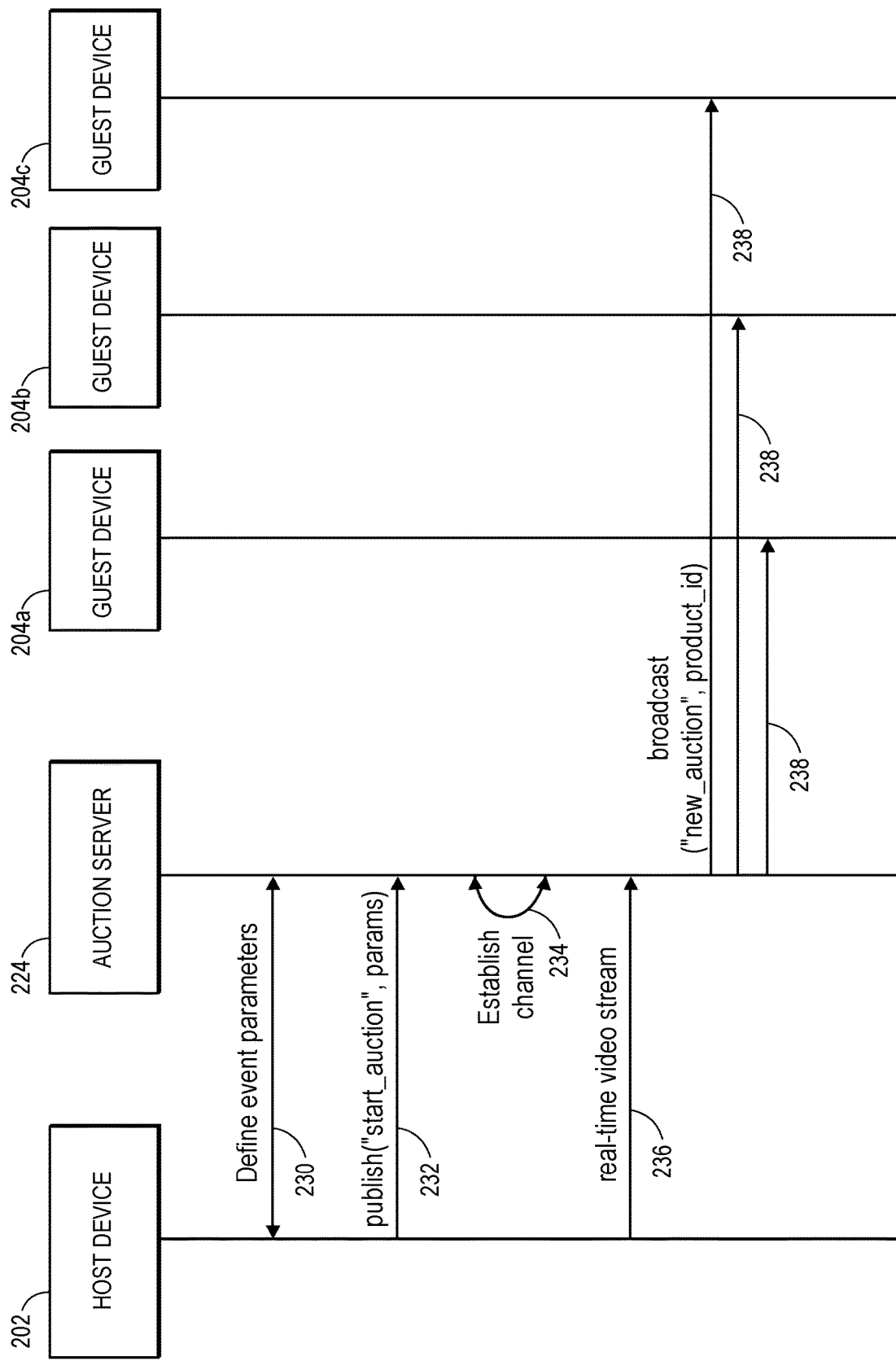
FIG. 2A is a signal diagram detailing example actions associated with establishing a publish/subscribe channel, in accordance with some embodiments.

FIG. 2A illustrates a signal diagram of an example process associated with establishing a publish/subscribe channel associated with a live auction event (i.e., a live auction channel). The process as depicted in FIG. 2A may include communications among an auction server 224 (e.g., the auction server 124 of FIG. 1), a host device 202 (e.g., host device 110a of host user 112a executing host application 114), and guest devices 204a, 204b, and 204c (e.g., respective guest devices 110b of respective guest users 112b executing guest application 116). Although the server 224 is referred to herein as the "auction server," it should be understood that the auction server 224 as described herein may additionally/alternatively implement functionalities of other servers of the present description, where appropriate. For example, in some embodiments, the auction server 224 may implement functionalities of the video server 128, the item catalogue server 132, and/or the payment server 134 of FIG. 1.

The process as illustrated in FIG. 2A begins with the host device 202 and the auction server 224 exchanging communications to define a plurality of parameters associated with a live auction event (230). The host device 202 may, for example, interact with the auction server 224 to define start date and time for a live auction event, a listing of items to be auctioned, auction timer settings, an additional one or more items to be made available for direct purchase during the live auction event, and/or other configuration settings, examples of which will be evident from the present description. Settings associated with a live auction event will be described in further detail with respect to FIGS. 6A-6N, which illustrate example GUIs that may execute, for example, on the host device 202.

At the defined start time for the live auction event, the auction server 224 may wait for the host device 202 to transmit a message to the auction server 224 indicating that the host is prepared to start the live auction event (232, e.g., a message belonging to a "start_auction" class). In some embodiments, the message class for starting the live auction event is associated with one or more parameters, e.g. to indicate a first item for auction, a starting auction timer for the first item, configuration settings of the host device, and/or other suitable information.

The auction server 224 establishes a publish/subscribe channel associated with the live auction event (234, i.e., a live auction channel, 234). Establishing the live auction channel may include, for example, defining the various classes of messages available for publishing/subscription by the host device 202 and/or for other participants, and the role authorization information associated therewith. The host device 202 (e.g., the device and/or the device user) may be initially associated with the role of host. A specific node at the auction server 224 (e.g., a unique process and one or more unique portions of server memory) may be established assigned to manage communications and other logic of the live auction event.

Upon a start of the live auction event, a real-time video stream may be established via activation of a camera of the host device 202 to continuously capture and transmit video unidirectionally to the auction server 224 (236). Optionally, though not necessarily, capturing and transmitting video may include capturing and transmitting audio by a microphone of the host device 202 (i.e., to form an audio-enabled real-time video stream). With the live auction channel and real-time video stream being established, the host device 202 may initiate an auction of a first item over the live auction channel. Optionally, the user of the host device 202 may wait for a period of time before starting an auction of a first item in the channel (e.g., the host device 202 may transmit real-time video but wait to auction until a desirable number of guests have joined the channel before starting the auction timer for the first item).

The auction server 224 advertises the live auction event by broadcasting one or more messages to prospective to respective devices 204a-204c (238, e.g., a message of a "new auction" class). The one or more messages at action 238 may include, for example, information indicative of the event host (e.g., host username or entity), an event title, and/or one or more items included in the event (e.g., a particular item presently being auctioned in the channel).

The guest application executing at guest devices 204a-204c may provide one or more interactive GUIs by which guest users can navigate available live auction events (e.g., live auction events that are ongoing) responsive to messages broadcasted by the auction server 224. Examples of interactive GUIs for the guest application are illustrated in FIGS. 2B and 2C, which respectively illustrate example GUIs 260 and 270 executing on a display 252 of a mobile computing device 250 (e.g., any one of guest devices 204a, 204b, or 204c executing the guest application 116).

Figure 2B:
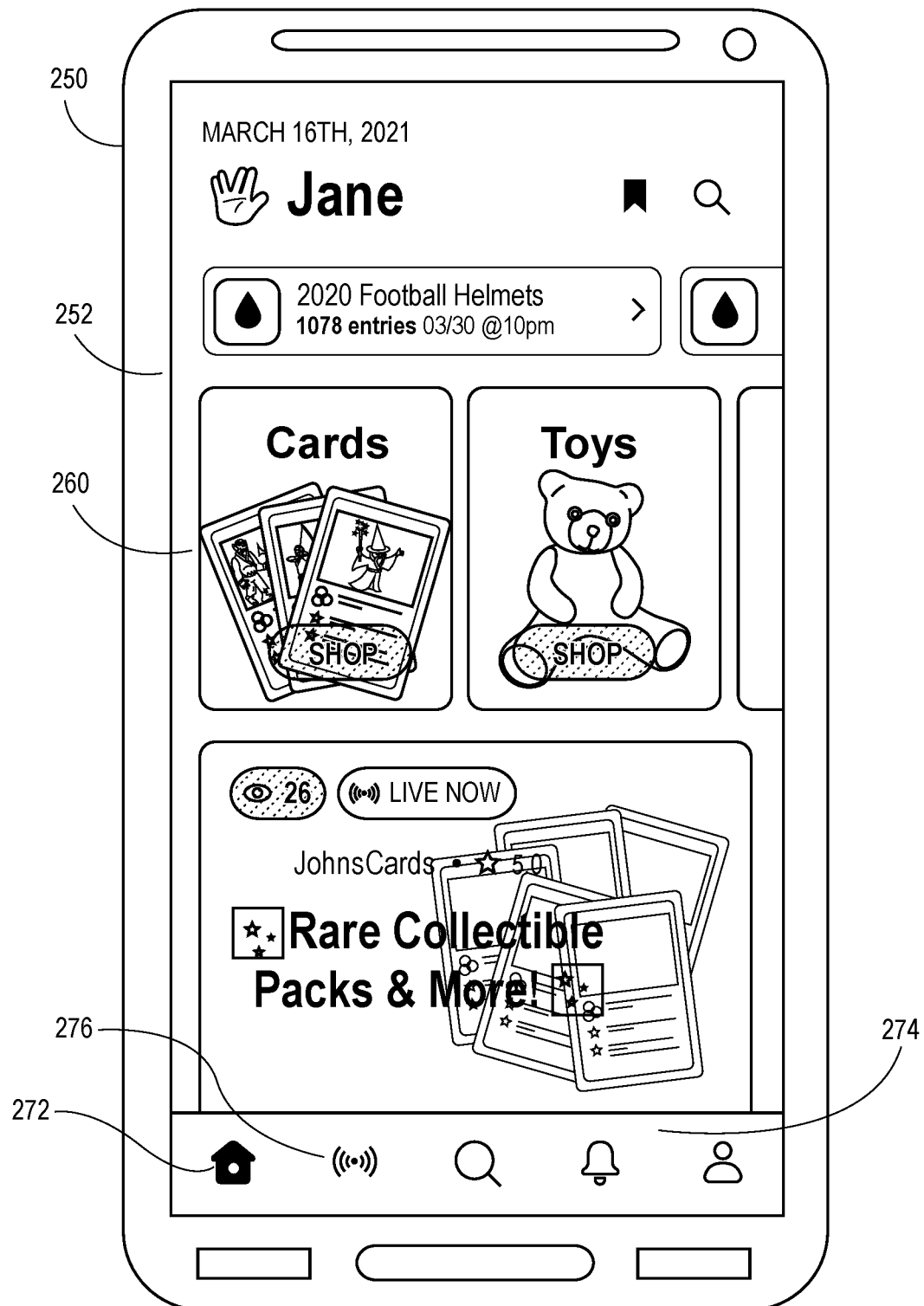
FIG. 2B is an example representation of an auction discovery graphical user interface (GUI) executing on a mobile computing device, in accordance with some embodiments.

Referring first to FIG. 2B, the GUI 260 provides a "home" interface by which the user of the mobile computing device 250 may navigate live auction events, and access various other application functionalities. The home interface may be persistently accessible at the application, for example via a home icon 272 presented on a navigation bar 274 that is persistently displayed at the guest application while the user navigates other application functionalities (represented by other icons in the navigation bar 274, e.g. search functionalities, notification configuration, user profile/payment information configuration, etc.).

Figure 2C:
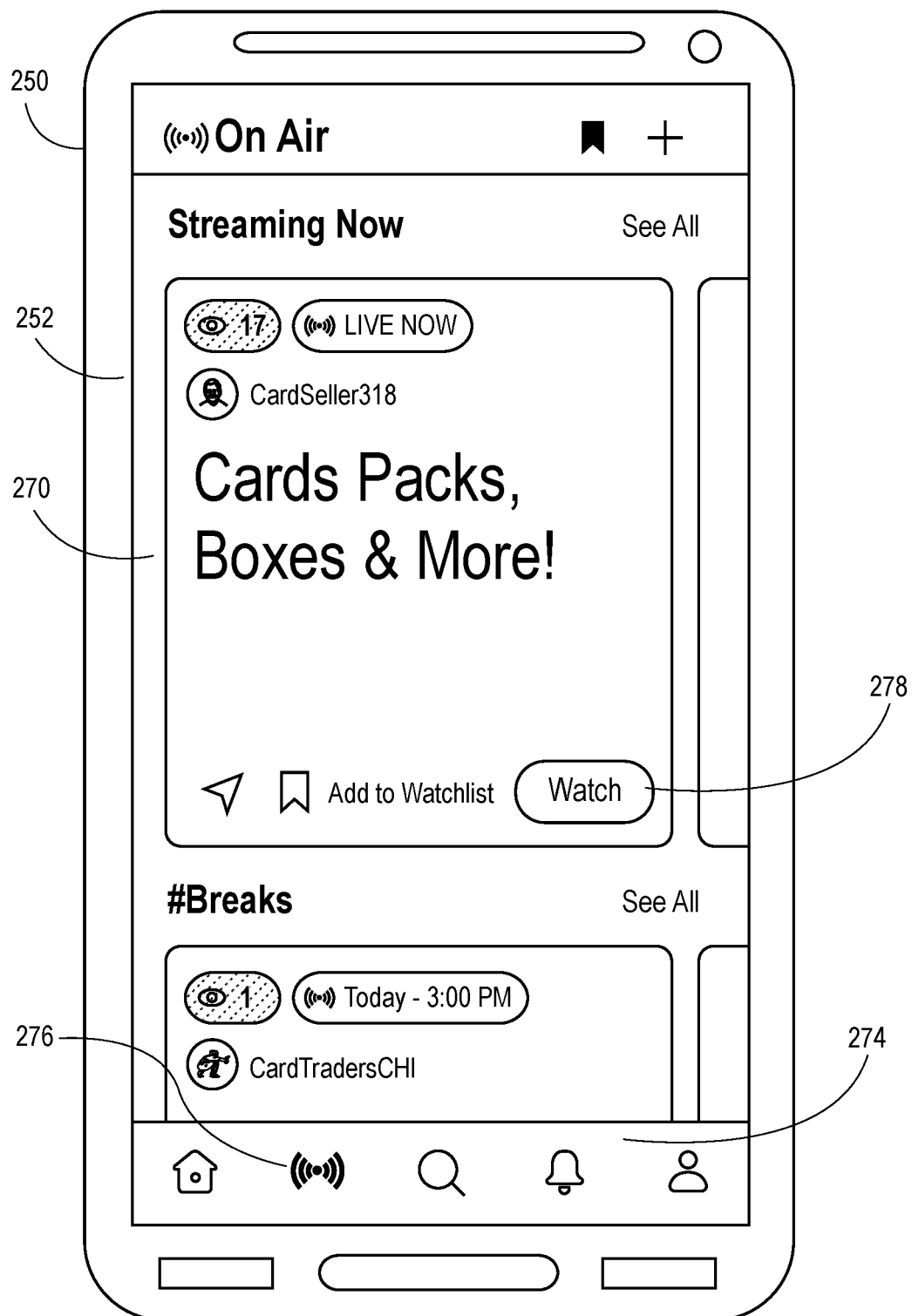
FIG. 2C is an example representation of another auction discovery GUI executing on a mobile computing device, in accordance with some embodiments.

Interacting with an icon 276 in the navigation bar 274 may direct the user to the GUI 270 of FIG. 2C. The GUI 270 which provides a listing of "on-air" events, e.g., the ongoing live auction events broadcasted by the auction server 224 via action 238. The GUI 270 includes a "watch" icon 278, selection of which registers the device 250 as a viewer (i.e., a guest participant) in the corresponding live auction channel, thereby allowing the device to view the real-time video stream and the auction(s) occurring in the channel. Additional communications and GUIs associated with a selected live auction channel are described with respect to FIGS. 3A-3E.

Registering as a Guest in a Live Auction Channel

FIG. 3A illustrates a signal diagram of an example process for connecting the guest device 204a to a live auction channel brokered by the auction server 224. At actions 320 and 322, the guest device 204a forms a bidirectional WebSocket connection with the auction server 224. Specifically, at action 320, the guest device 204a may transmit a request to form a communicative connection with the auction server 224 (e.g., the guest application 116 may request to open a WebSocket-based connection upon the guest device 204a opening the guest application 116). The guest device 204a and the auction server 224 may exchange additional handshaking communications with the auction server 224 eventually providing to the guest device 204a at action 322 a unique connection identifier specific to communications between the guest device 204a and auction server 224 (e.g., a unique WebSocket identifier). The connection between the guest device 204a and the auction server 224 may remain operative while the guest application continues to execute at the guest device (e.g., the same WebSocket connection may remain active while the guest application 204a participates in one, two, or more live auction channels).

With the communicative connection between the guest device 204a and auction server 224 opened, the user of the guest device 204a may, for example, use the guest application to navigate available live auction events and/or other application functionalities, e.g., as previously described with respect to FIGS. 2B and 2C, and as will be described with respect to subsequent figures.

At action 324, the guest device 204a transmits to the auction server 224 a request to join a particular live auction channel (324, e.g., one or more messages of a "join_auction" class, comprising a unique identifier corresponding to the selected live auction channel). The guest device 204a may transmit the message at action 324, for example, responsive to selection of the "watch" icon 278 from the GUI 270 of FIG. 2C. Responsive to the request from action 324, the auction server 224 may register the guest device 204a (e.g., the device and/or user) as a participant in the live auction event with a "guest" role. Upon registering the guest device 204a, the auction server transmits, to the guest device 204a, current real-time values for auction information to allow the guest device 204a to initially load the live auction event (326). Additionally, upon establishing the guest device 204a as a participant, the auction server 224 connects the guest device 204a to the real-time video stream from the host device (328), for viewing of the real-time video stream at the guest device 204a in combination with viewing of real-time auction information provided in the live auction channel. Although not shown in FIG. 3A, similar processes may occur for registration of guest devices 204b and 204c, and/or additional guest devices.

Figure 3B:
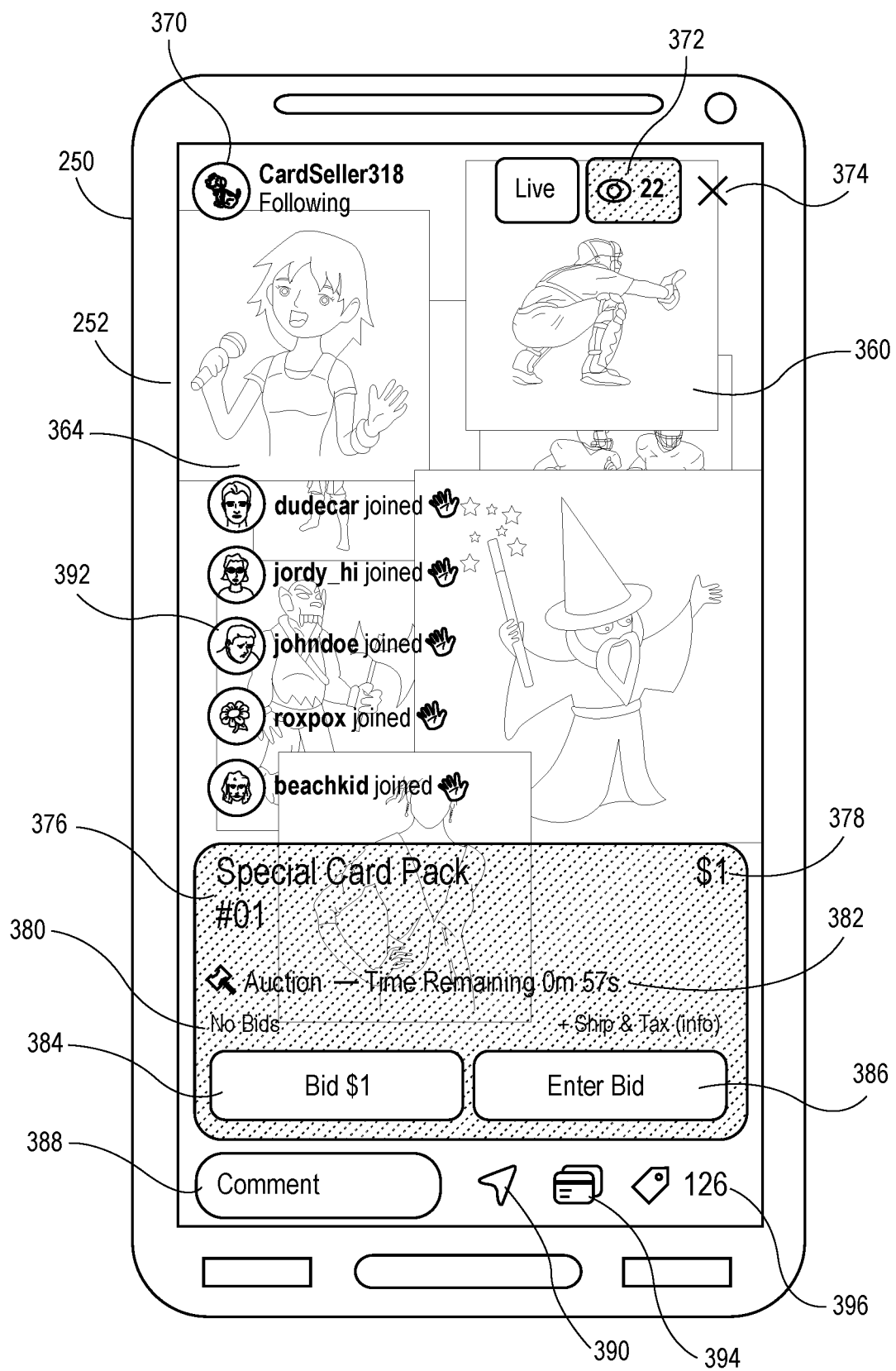
FIG. 3B is an example representation of an auction channel GUI executing on a mobile computing device, in accordance with some embodiments.

FIG. 3B illustrates an example interactive auction GUI 360 displaying a live auction channel as viewed at the display 252 of the mobile computing device 250 (e.g., guest device 204a, 204b, or 204c). The GUI 360 may be executed, for example, by the guest application 116 executing at the device 250, responsive to the registering of the guest device 250 as a participant as described with respect to FIG. 3A. Generally speaking, the GUI 360 provides an interactive view of various auction information and controls associated with the live auction event, presented over a view of the real-time video stream 364. The GUI 360 may be configured to update any of the auction information, controls, and real-time video stream in real-time as the device 250 receives messages from a message broker (e.g., the auction server 224).

An upper portion of the auction GUI 360 displays meta-information for the live auction event, including host information 370 (e.g., a username and profile picture of the host user) and a viewer count 372 (i.e., a number of guests in the channel). The upper portion of the GUI 360 also includes an "exit" icon 374, selection of which may cause the device 250 to stop viewing the channel and de-register as a guest, such that the device 250 is no longer subscribed to messages in the live auction channel and no longer receives the real-time video stream.

The auction GUI 360 includes various additional information regarding a current item being auctioned, said information including an item title 376, a current price 378 (e.g., highest bid), highest bidder information 380, and an auction timer 382, expiration of which concludes the auction for the current item. In a state of the auction event illustrated in FIG. 2C, the highest bidder information 380 indicates that no bids for the current item have yet been placed. Accordingly, the current price 378 may be defaulted for example to minimum bid value preset by the host (e.g., a $1 minimum for a first bid, as shown in this instance), or simply to zero.

Still referring to the auction GUI 360, bid controls 384 and 386 allow the user to place a bid for the item currently being auctioned. Specifically, selection of an incremental bid control 384 places a bid of a minimum allowable amount (e.g., the highest existing bid plus a minimum increment, in this instance $1). Alternatively, selection of a custom bid control 386 allows the user to manually input a user-defined amount to bid (as long as the user-defined amount is greater than or equal to the minimum allowable amount). In any case, use of the bid controls 388 and 390 causes the device 250 to publish a message to the auction server indicating the user's bid (e.g., a "place_bid" message class comprising the amount of the bid, user identifying information for the bidder, etc.).

Still referring to the auction GUI 360, the user of the device 250 may publish written comments to the live auction channel by entering text into a comment field 388 and submitting the entered text via a submit icon 390. Selection of the submit control 390 may cause the device 250 to publish the comment to the auction server for distribution to all participants, e.g. as shown in a comments list 392 (e.g., the device 250 publishes a message of a pre-defined "submit_comment" class, the message comprising the text entered in the field 388).

Still other interactive controls may be provided in the auction GUI 360. For example, selection of a payment icon 394 may allow the user of the device 250 to configure payment information to be used in the event of the user winning an auction, thereby allowing the user to successfully place bids. Additionally, selection of an items icon 396 may allow the user to view additional items to eventually be auctioned during the live auction event, and/or still additional items that may be available for direct purchase during the live auction event (i.e., available to be purchased for a preset price by any guest, without involving an auction). Additional GUIs that may be accessed via selection of icons 394 and 396 will be described with respect to FIGS. 4E-4G.

Bids, Payment, and Item Listings in a Live Auction Channel

Figure 4A:
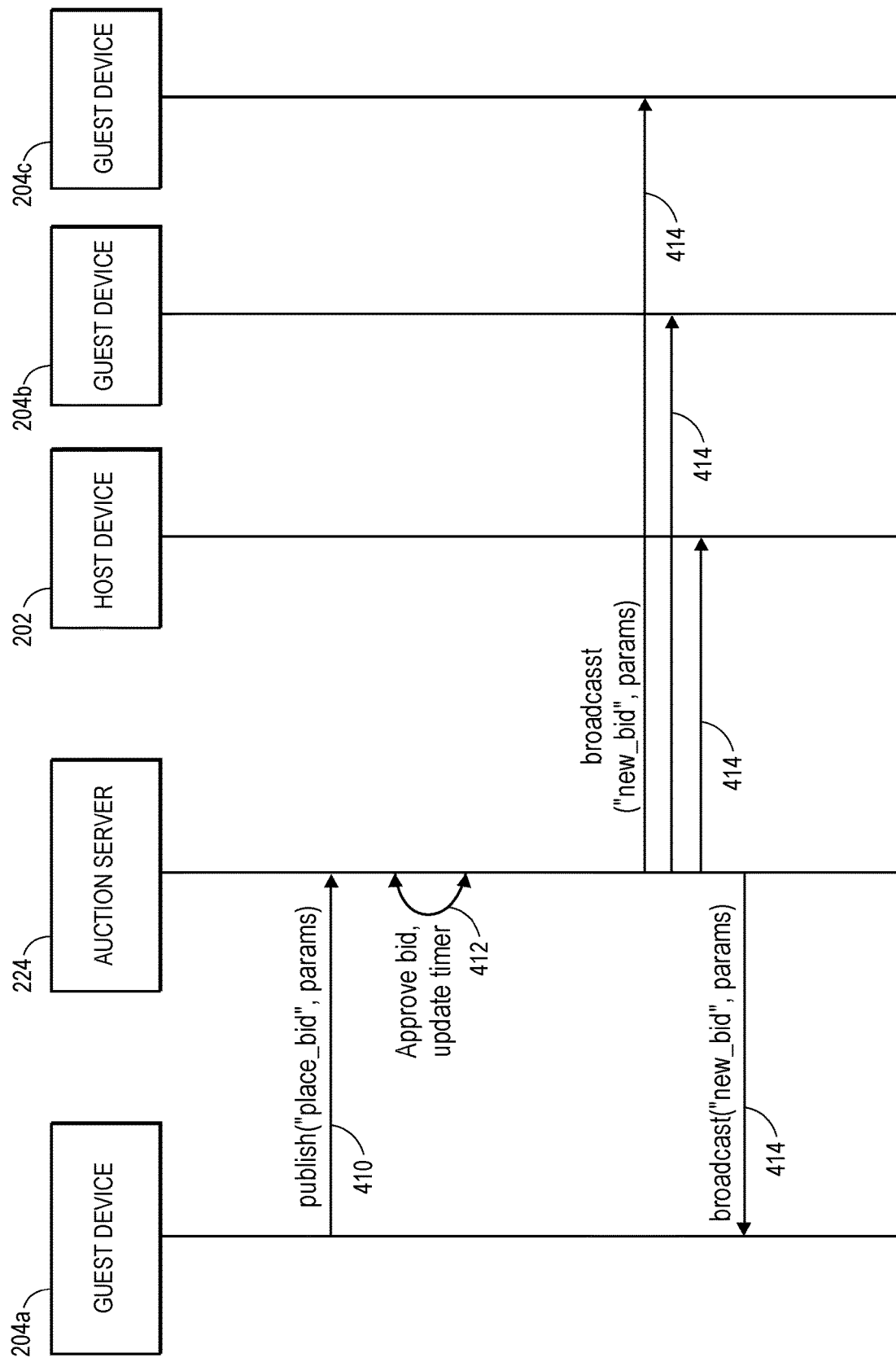
FIG. 4A is a signal diagram detailing example actions associated with a successful bid in an auction channel, in accordance with some embodiments.

FIG. 4A illustrates a signal diagram of an example process of successfully placing a bid from the guest device 204a. Actions of the signal diagram may be initiated, for example, in response to selection of either of the bid controls 384 or 386 as discussed with respect to FIG. 3B.

Responsive to one or more GUI interactions to place a new bid, the guest device 204a publishes a message to the auction server indicating the new bid (410). Said message may, for example, belong to a pre-defined "place_bid" message class, and comprise one or more parameters indicating the bid amount, user-identifying information, and/or other relevant bid information.

Responsive to receiving the bid message from action 410, the auction server 224 processes the message to determine the validity of the bid (412). Processing the message may include identifying the live auction channel to which the message pertains, e.g. based upon information included in the bid message, metadata for the socket connection with the guest device 204a, and/or other information. Processing the bid message at the auction server 224 may include authorizing the bid by determining, for example, whether the user of the guest device 204a has a role that allows the bid, and whether the amount of the bid exceeds a minimum allowable amount.

In the process shown in FIG. 4A, the auction server 224 determines at action 412 that the bid is valid. Accordingly, the auction server 224 updates its memory to reflect the new highest bid and highest bidder, and broadcasts a message indicative of the new highest bid to the host device 202 and to the all guests in the channel (414). Optionally, in some embodiments, rather than broadcasting the message to the guest device 204a that placed the bid, the auction server 224 may simply send a message to the 204a indicating that the bid was successful, with the guest device 204a remaining aware of the bid information that the guest device 204a previously placed at action 410.

In some instances, functions of the auction server 224 at action 412 may further include updating the countdown timer to the end of the auction for the current item. Specifically, in some embodiments, an auction for an item is configured such that, when a successful bid is placed with less than a pre-defined amount of time remaining in the auction, the auction timer is increased in a pre-determined manner, to incentivize more bids in the actively-contested auction. For example, valid bids placed with under 15 seconds remaining on the auction timer may cause the auction timer to increase by 5 seconds, 10 seconds, 15 seconds, etc., or may automatically reset the timer to a particular value (e.g., back to 15 seconds). In these embodiments, the message broadcasted at action 414 may include a timer parameters reflecting the change to the auction timer (e.g., indicating a new countdown timer or a new Unix timestamp value corresponding to the end time of the auction). Alternatively, if a "Sudden Death" mode is enabled in the auction for the item, the auction timer does not increase, even when bids are placed near the expiration of the auction timer.

Figure 4B:
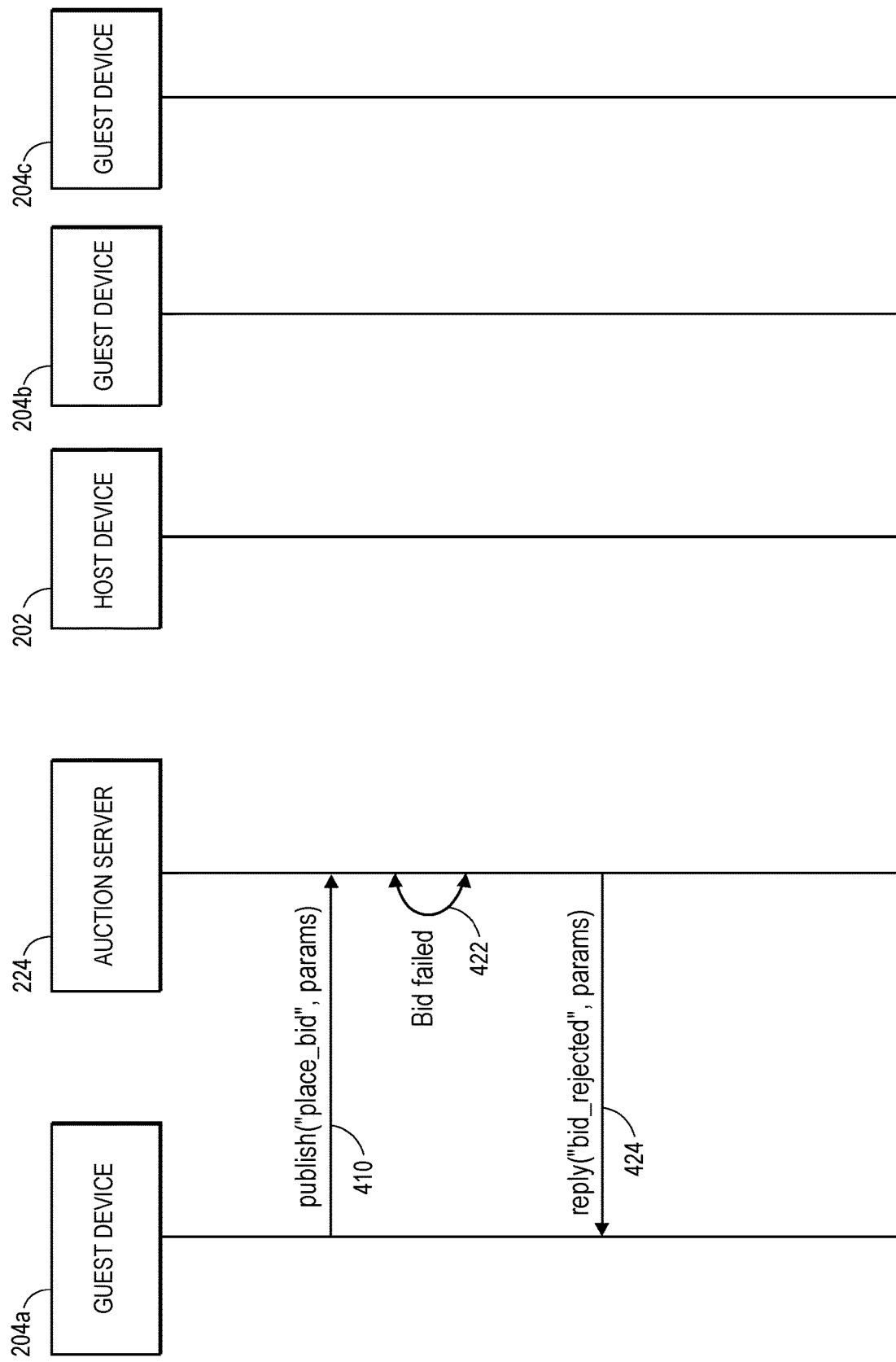
FIG. 4B is a signal diagram detailing example actions associated with a failed bid in an auction channel, in accordance with some embodiments.

FIG. 4B illustrates another signal diagram of an example process of a failed bid from the guest device 204a. As with FIG. 4A, actions of the signal diagram of FIG. 4B may be initiated, for example, in response to selection of either of the bid controls 384 or 386 as discussed with respect to FIG. 3B.

In the example process of FIG. 4B, the guest device 204a publishes to the auction server 224 the same bid message as previously described with respect to FIG. 4A (410). However, in this instance, the auction server 224 determines that the bid is improper, for example because the guest device 204a is not authorized to place bids or because the bid was not of a sufficient amount. Accordingly, the auction server 224 does not update regarding the highest bid, and the auction server 224 does not need to broadcast a message indicating the bid as in the process of FIG. 4A. Instead, the auction server 224 replies only to the guest device 204a to indicate the failure of the bid (e.g., a message belonging to a "bid_rejected" message class, comprising parameters indicating an error code indicating the reason for the failure of the bid).

Figure 4C:
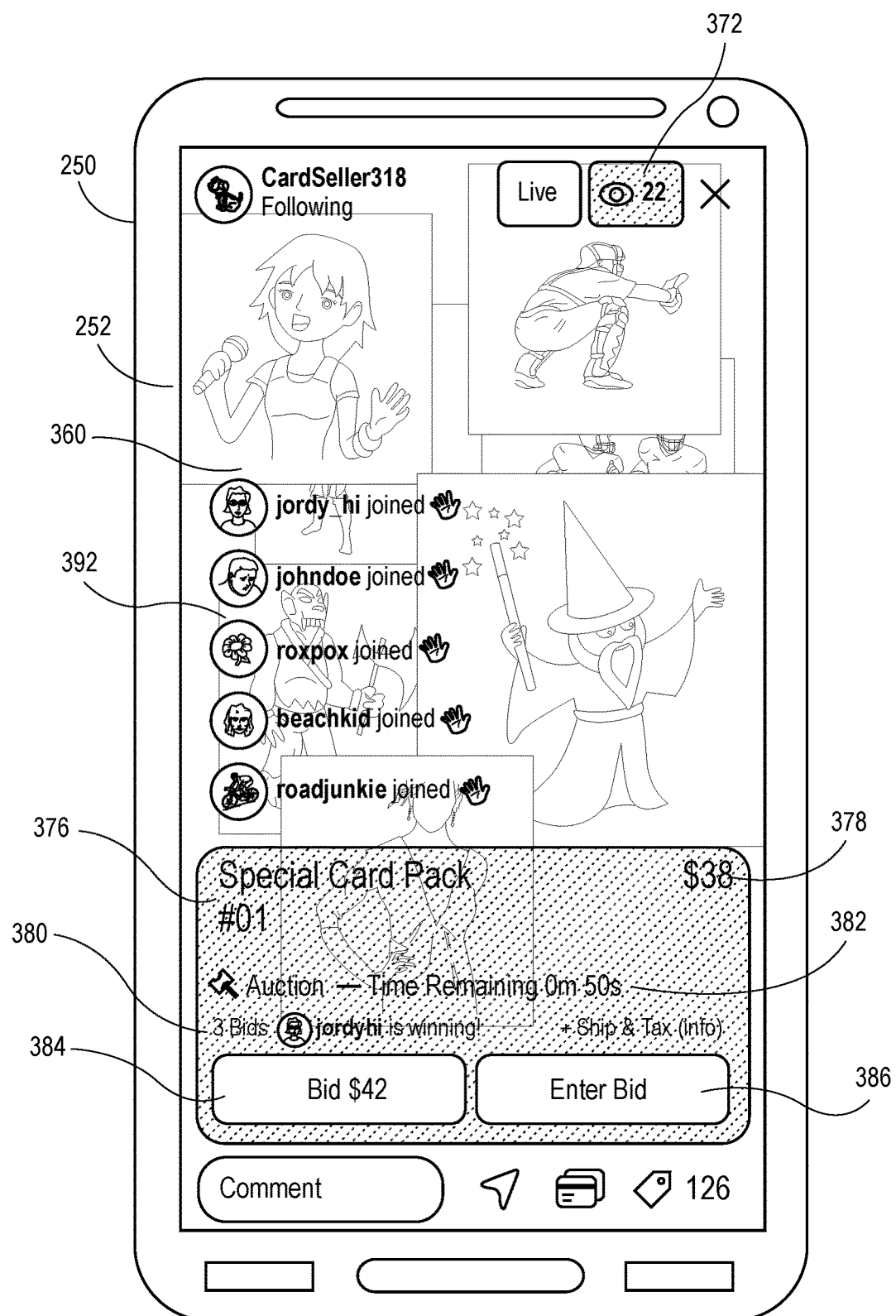
FIG. 4C is an example representation an updated auction channel GUI executing on a mobile computing device, in accordance with some embodiments.
Figure 4D:
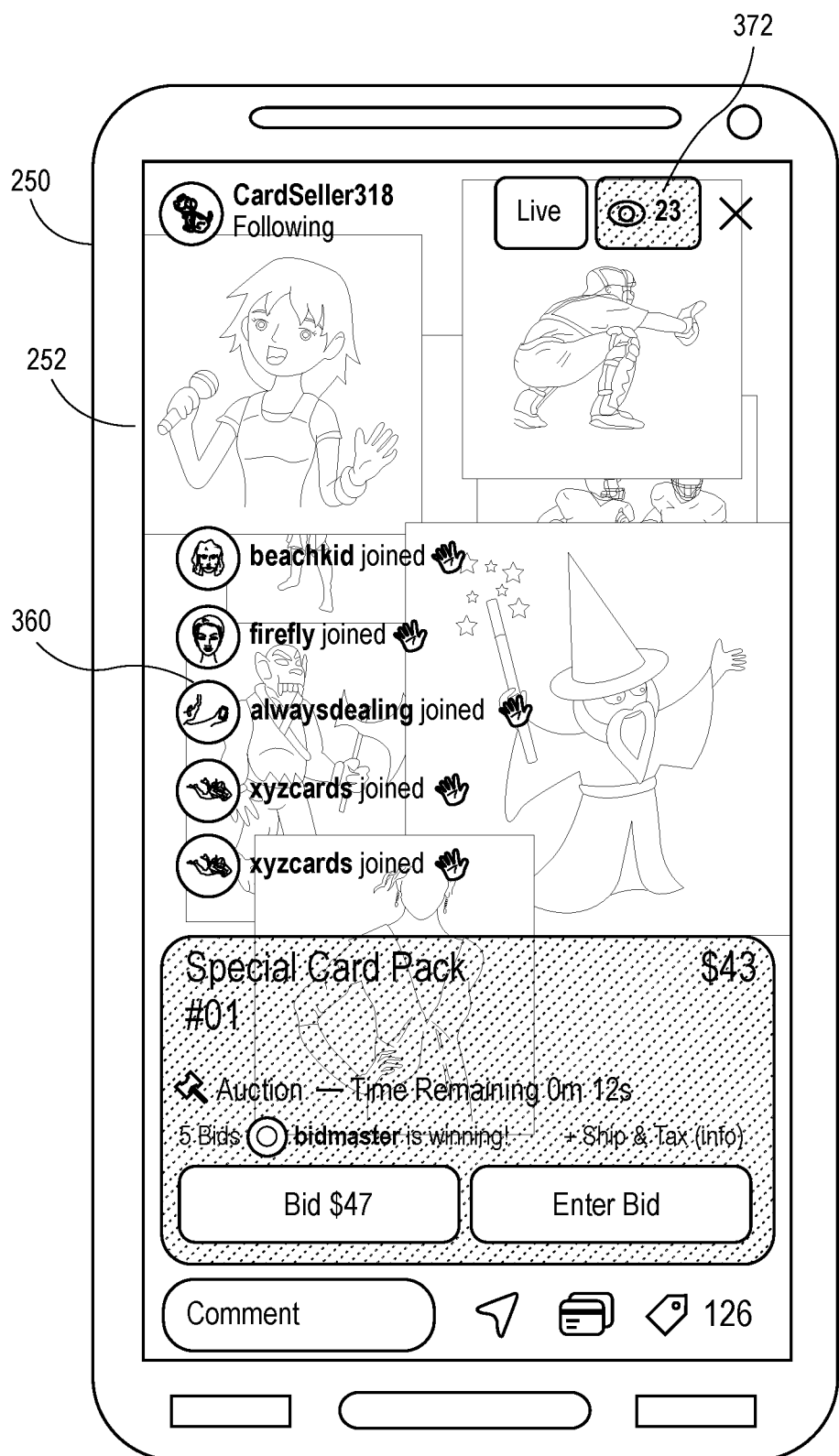
FIG. 4D is another example representation of another updated auction channel GUI executing on a mobile computing device, in accordance with some embodiments.

FIGS. 4C and 4D illustrate example updates of the interactive auction GUI 360 at the mobile computing device 250. Because the mobile computing device 250 is established as a subscriber to messages from the auction server, the mobile computing device 250 is not required to actively solicit information from the auction server to update the GUI 360. Rather, the GUI 360 may automatically update in real-time in response to messages from the auction server indicative of new bids, new comments, and/or other auction activity, without interrupting the real-time video stream displayed via the GUI 360.

In the updated GUI 360 as shown in FIG. 4C, new bid messages from the auction server have caused the GUI 360 to update the current price 378 and the highest bidder information 380 in real-time to display different values from those shown in FIG. 3B. Additionally, the GUI 360 is configured to continuously update the auction timer 382 (e.g., in response to messages from the auction server, and/or by automatically incrementing the auction timer 382 locally based upon passage of time). Bid controls 384 and 386 remain available at the auction GUI 360, with the incremental bid control 384 being updated to reflect a change to the minimum allowable bid. The comments list 392 is similarly updated in response to the device 250 receiving still additional messages broadcasted by the auction server.

FIG. 4D illustrates another update to the auction GUI 360, which is provided in response to receiving still additional messages broadcasted in real-time by the auction server. As with FIG. 4C, the updated auction GUI 360 in FIG. 4D automatically updates the auction information and controls to reflect new bids, new comments, and/or other updated information. Additionally, the auction GUI 360 in FIG. 4D updates the viewer count 372 in response to a message from the auction server indicating a change to the number of guests in the live auction channel.

Figure 4E:
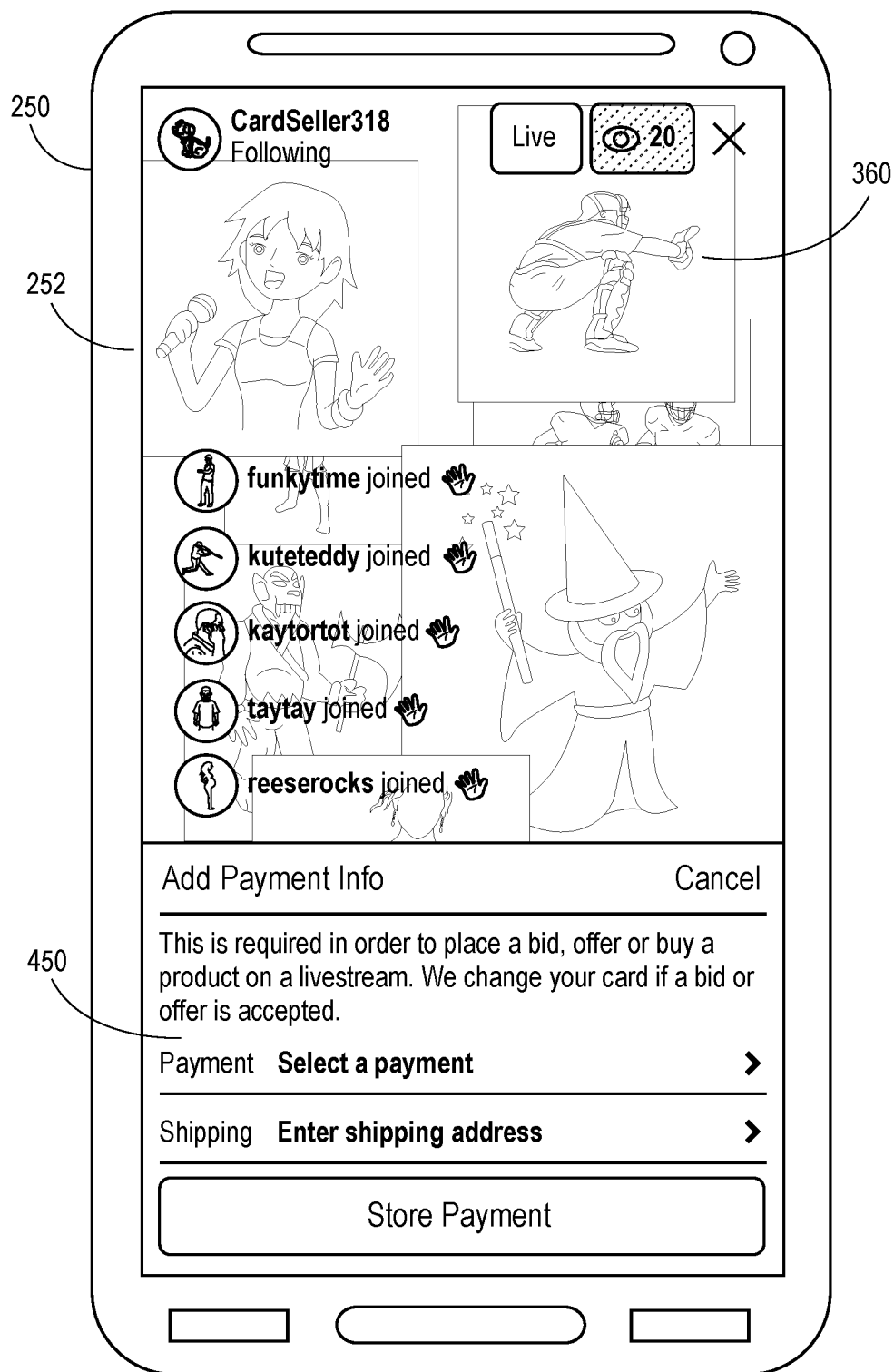
FIG. 4E is an example representation of a payment configuration GUI executing on a mobile computing device, in accordance with some embodiments.

FIG. 4E illustrates a payment configuration GUI 450 that may be accessed at the device 250, for example in response to selection of the payment icon 394 as described with respect to FIG. 3B. The payment configuration GUI 450 is presented on top of the auction GUI 360, with the auction GUI 360 continuing to automatically update while the payment configuration GUI 450 is displayed. That is, regardless of actions performed via the payment configuration GUI 450, the real-time updating of auction information via the GUI 360 is not interrupted, thereby allowing the user to return to the GUI 360 upon dismissal of the GUI 450 without any disconnection from the live auction channel.

Figure 4F:
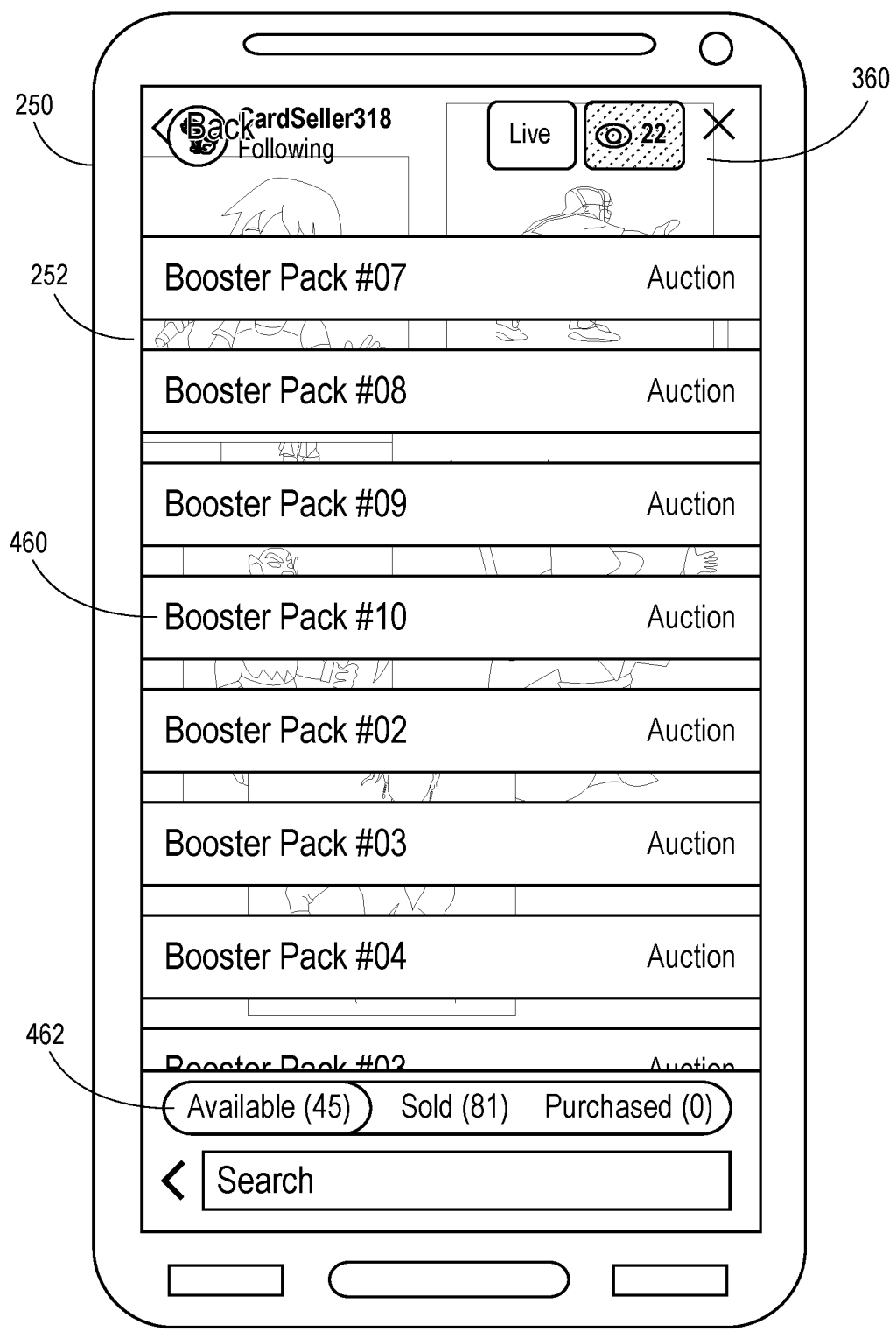
FIG. 4F is an example representation of an item exploration GUI executing on a mobile computing device, in accordance with some embodiments.
Figure 4G:
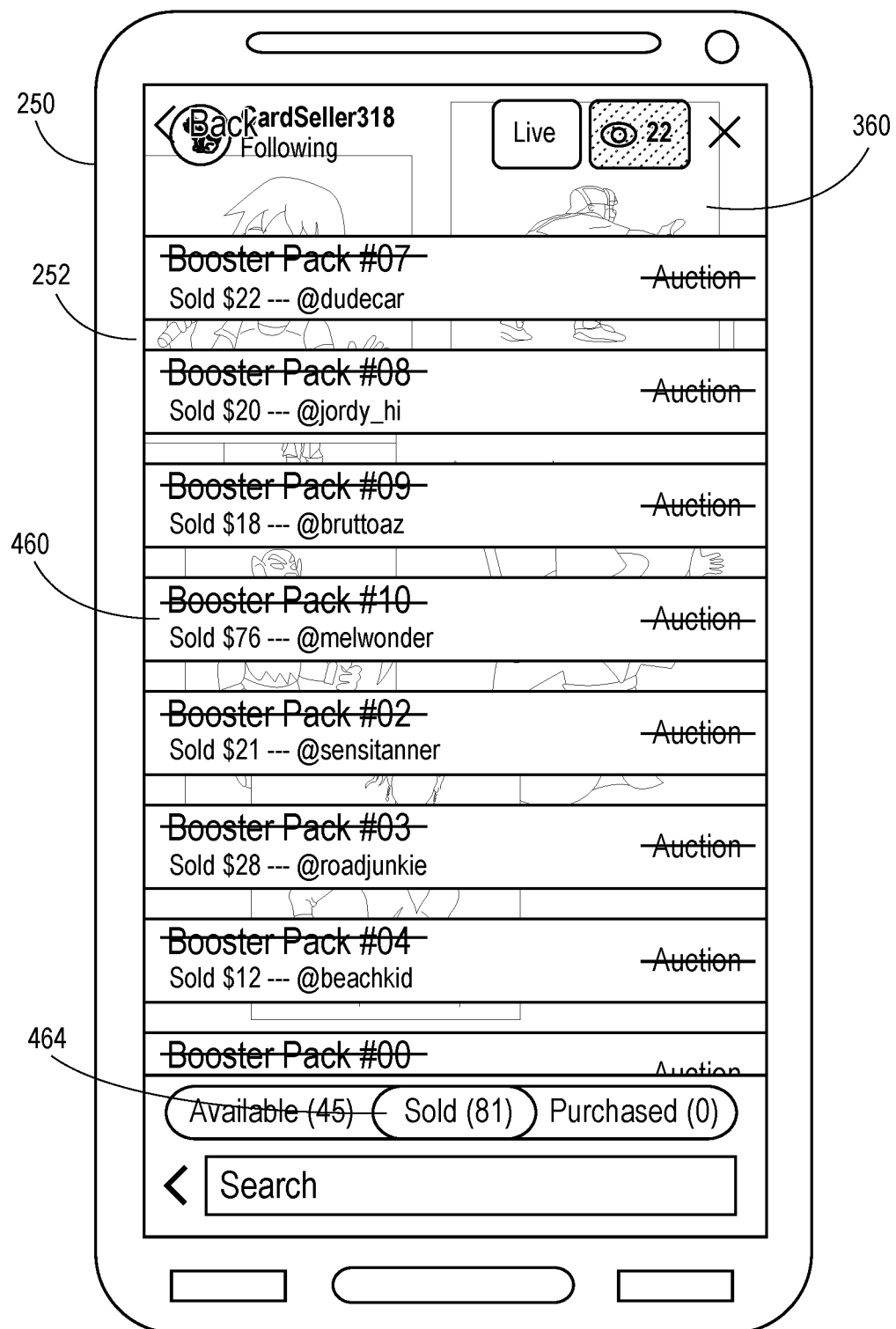
FIG. 4G is an example representation of another item exploration GUI executing on a mobile computing device, in accordance with some embodiments.

FIGS. 4F and 4G illustrate an item exploration GUI 460 that may be accessed at the device 250, for example in response to selection of the icon 396 as described with respect to FIG. 3B. Using the item exploration GUI 460, the user of the device can navigate among a plurality of items associated with the live auction event. As shown in FIG. 4F, selection of an "Available" tab 462 summons a list of items still available during the event, including items still to be made available by auction, as well as any items available for direct purchase. Alternatively, as shown in FIG. 4G, selection of a "Sold" tab 464 in the GUI 460 summons a list of items already sold during the event, including items already auctioned and items already sold via direct purchase. Still alternatively, if the user of the device 250 has won an auction or directly purchased an item in the live auction event, the user may view said items via selection of a "Purchased" tab in the item exploration GUI 460.

Notably, the item exploration GUI 460 in FIGS. 4F and 4G is displayed over the top of the auction GUI 360, and viewing of the GUI 460 does not interrupt the real-time updating of the underlying GUI 360 in response to messages from the auction server. Moreover, if information associated with the item exploration GUI 460 changes, the item exploration GUI 460 may similarly update in real-time to automatically reflect changes indicated by messages from the auction server (e.g., when an item transitions from "available" to "sold," or when a new item is added to the "available" tab).

Ending an Auction and Processing Winner Information

Figure 5A:
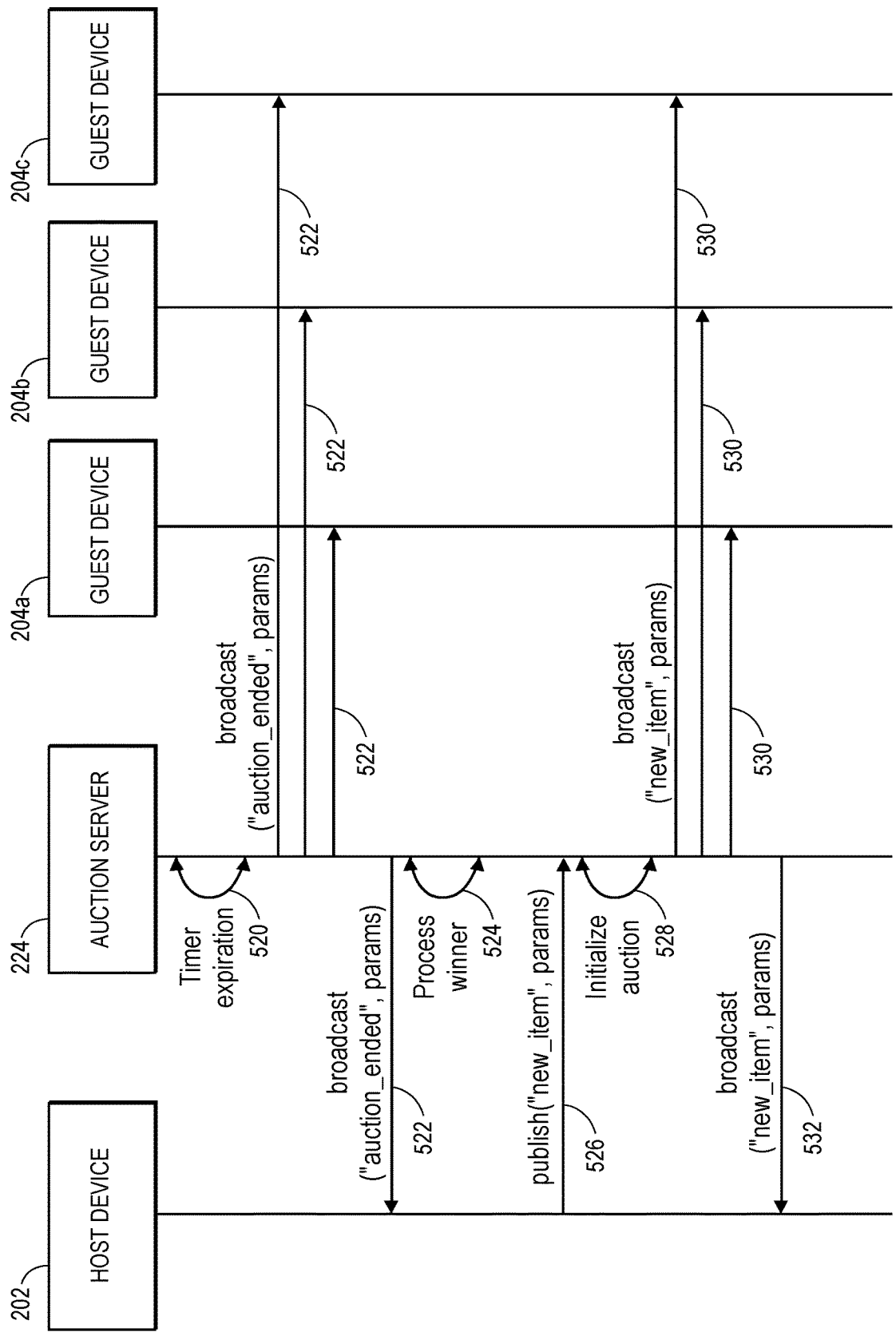
FIG. 5A is a signal diagram detailing example actions associated with concluding an auction, in accordance with some embodiments.

FIG. 5A illustrates a signal diagram of an example process of concluding an auction of a given item in a live auction event. The process of FIG. 5A begins when the auction server 224 determines that a timer associated with the auction of the item has expired (520). Responsive to the expiration of the timer, the auction server 224 retrieves from server memory current information indicative of the highest bidder and thus, the winner of the auction. The auction server generates and transmits, to the guest devices 204a-204c and to the host device 202, a message indicating the conclusion of the auction and the winner (522, e.g., containing the username of the winning user, the winning bid amount, a profile image for the winning user, etc.). The auction server 224 may perform additional processing actions to facilitate execution of an order of the item to the winning bidder at the ending bid price (524), e.g. to process the winning user's payment instrument and arrange shipping of the item from the host to an address of the winning user. Alternatively, in some embodiments, auction server 224 may facilitate shipping of the item to an intermediary entity before, during, or after the live auction event, and the intermediary entity may ship the item to the winning user after the auction of the item. This latter approach may provide advantages, for example by allowing the intermediary entity to verify authenticity and condition of the item, and by ensuring privacy of the winning bidder's personal address information. In some embodiments, the auction server 224 may be configured to automatically generate and/or distribute a shipping label for shipping of the item (e.g., from the host to the intermediary entity, from the intermediary entity to the winning user, or in some instances, simply from the host to the winning user).

Subsequently, the auction server 224 may wait for a message published by the host device indicating a new item to be selected for auction (526). The message indicating the new item may include, for example, an initial auction price for the new item and/or additional information regarding the item. In some embodiments, instead of the message from the host indicating the initial auction price, the auction server 224 may set the initial price, e.g., based upon an estimated value of the selected item and/or past auctions for the same item or similar items. Responsive to the message from the host device 202 at action 526, the auction server 224 initializes the auction for the new item, e.g., by persisting to server memory the item name, starting price, auction timer, etc. Upon initializing the auction, the auction server 224 broadcasts to the guest devices 204a-204c a message indicative of the new item (530), responsive to which GUIs at the respective guest devices 204a-204c automatically update to reflect the auction of the new item, thereby enabling bidding for the new item in a similar manner to that described with respect to FIGS. 3A-3B and 4A-4G. Thus, GUIs at the guest devices 204a-204c are updated without interrupting the real-time video stream or any other aspects of participation in the live auction channel at the guest devices 204a-204c.

Figure 5B:
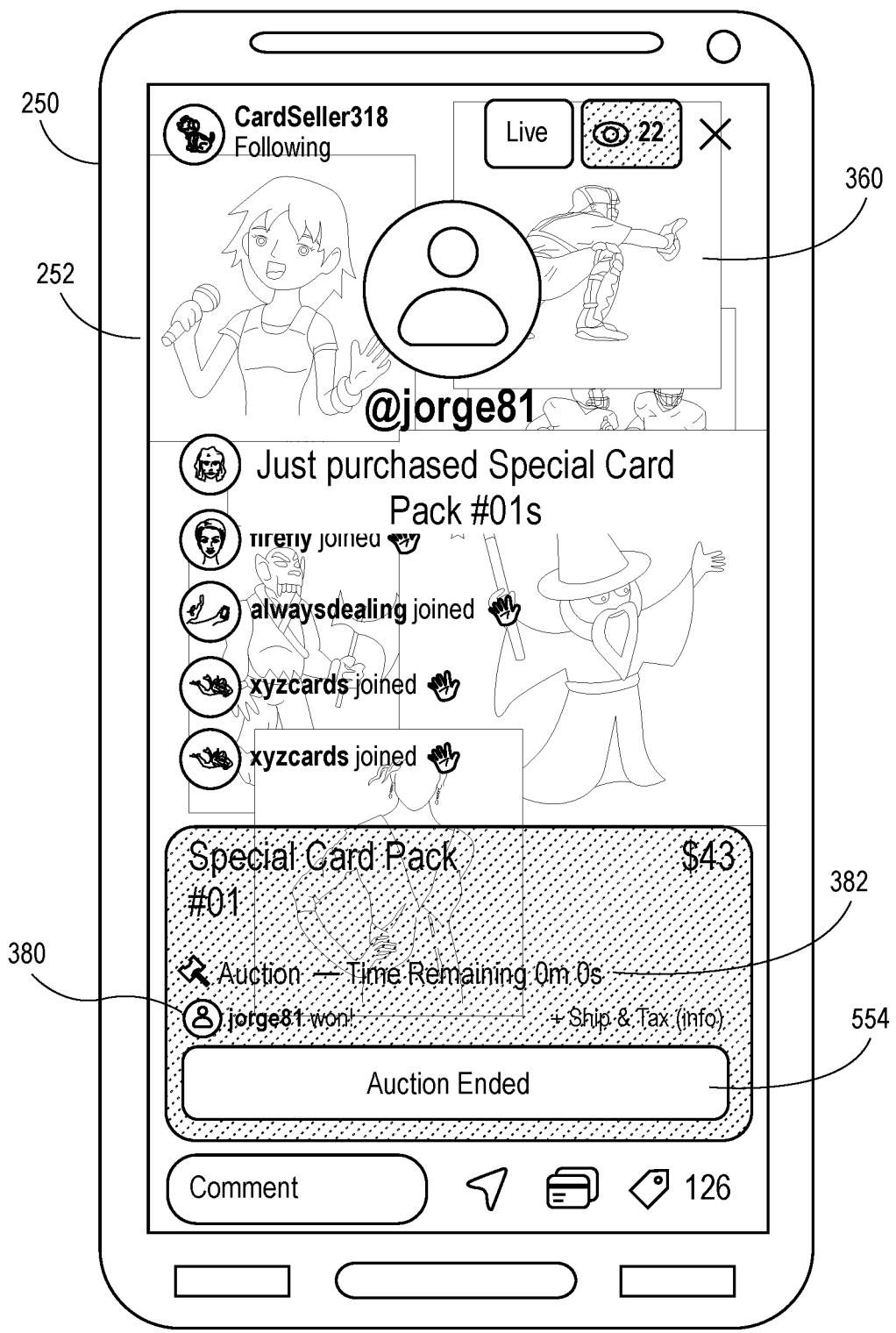
FIG. 5B is an example representation of another updated auction channel GUI executing on a mobile computing device, in accordance with some embodiments.

FIG. 5B illustrates another update to the auction GUI 360, in this instance responsive to a message from the auction server indicating the end of an auction for a given item (e.g., the message from action 522 in FIG. 5A). Specifically, the auction GUI 360 as shown in FIG. 5B updates the highest bidder information 380 to show the winner of the auction, and shows no time remaining in the auction timer 382. Additionally, the auction GUI 360 temporarily displays a winner notification 550 prominently displaying information indicative of the winner of the auction (e.g., displaying the winner username and/or profile image). Notably, as there is presently no item being auctioned, the previously displayed bid controls are unavailable, and the updated auction GUI 360 in FIG. 5B instead displays a notice 554 of the auction having ended. However, other aspects of the interactive auction GUI 360 remain available while the user of the guest device 250 awaits initialization of a new auction (e.g., the user can still post comments, configure payment, explore item lists, etc.).

FIG. 5C illustrates a signal diagram of an example process of successfully executing an order for an item upon the conclusion of an auction (e.g., corresponding to action 524 from FIG. 5A). The process of FIG. 5C begins with the auction server 224 retrieving information from server memory indicating the winner of the auction (560, the winner in this example being the user of the guest device 204a). The auction server 224 transmits, to a payment server 534 (e.g., payment server 134 from FIG. 1), one or more messages indicative of the item, the winning user, and the payment and/or shipping information associated therewith (562). Upon receiving from the payment server 534 a message indicating the order was executed successfully (564, e.g., payment and/or shipping information was successfully verified), the auction server 224 relays a message to the guest device 204a indicating that the order was successfully executed (566).

Figure 5D:
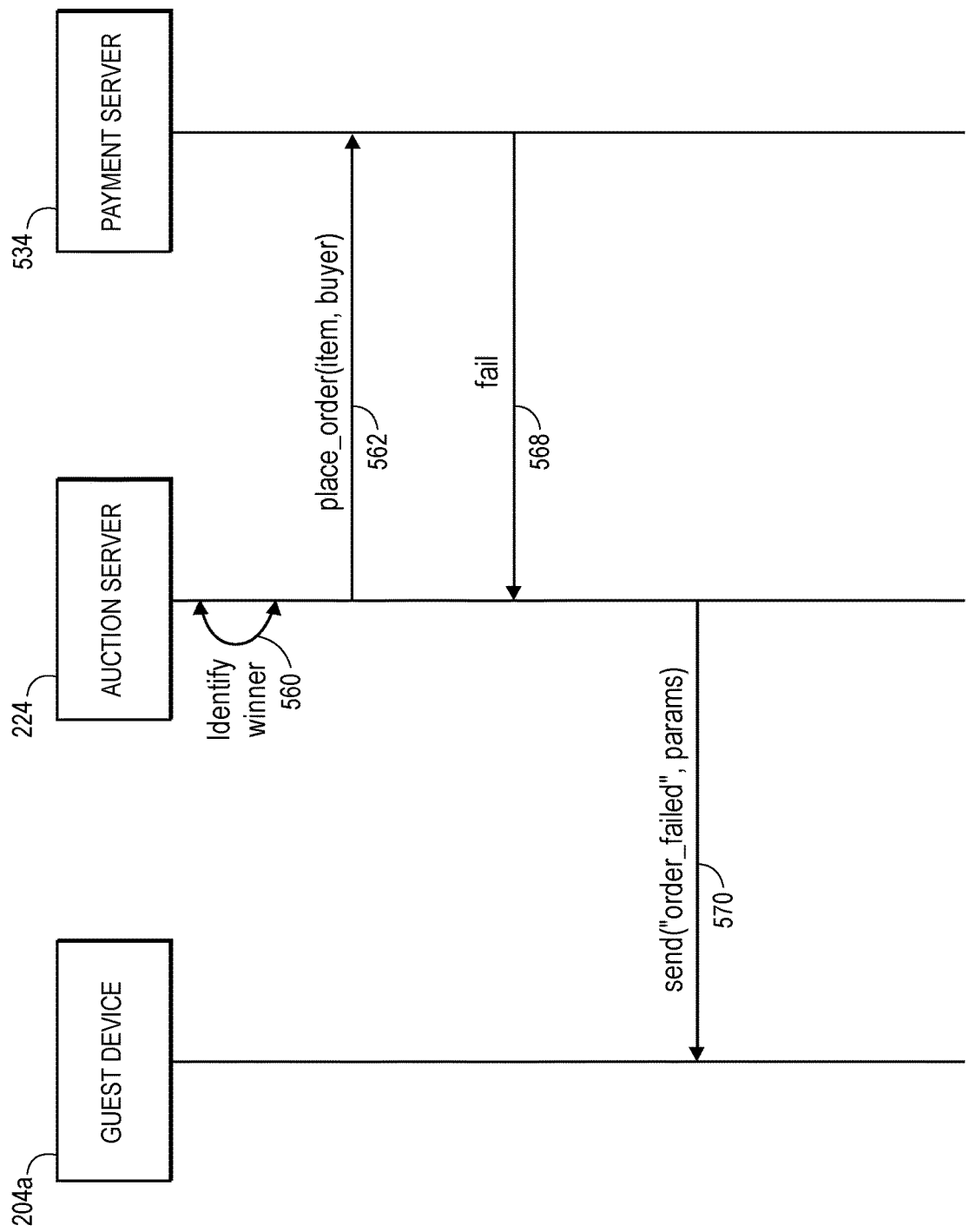
FIG. 5D is a signal diagram detailing example actions associated with a failed payment process, in accordance with some embodiments.

FIG. 5D illustrates a signal diagram of an example process similar to that in FIG. 5C, except with the placement of the order for the time in this instance being unsuccessful, e.g., due to invalid payment information or invalid shipping information for the winning user. In the example process of FIG. 5D, actions 560 and 562 proceed in the same manner as in the process of FIG. 5C. However, upon receiving a message from the payment server 534 indicating that the order was not executed successfully (568), the auction server 224 relays a notification to the guest device 204a indicating that the order failed, including reasons for the failure if available (570, e.g., including an error code).

Host Configuration of a Live Auction Event

Figure 6A:
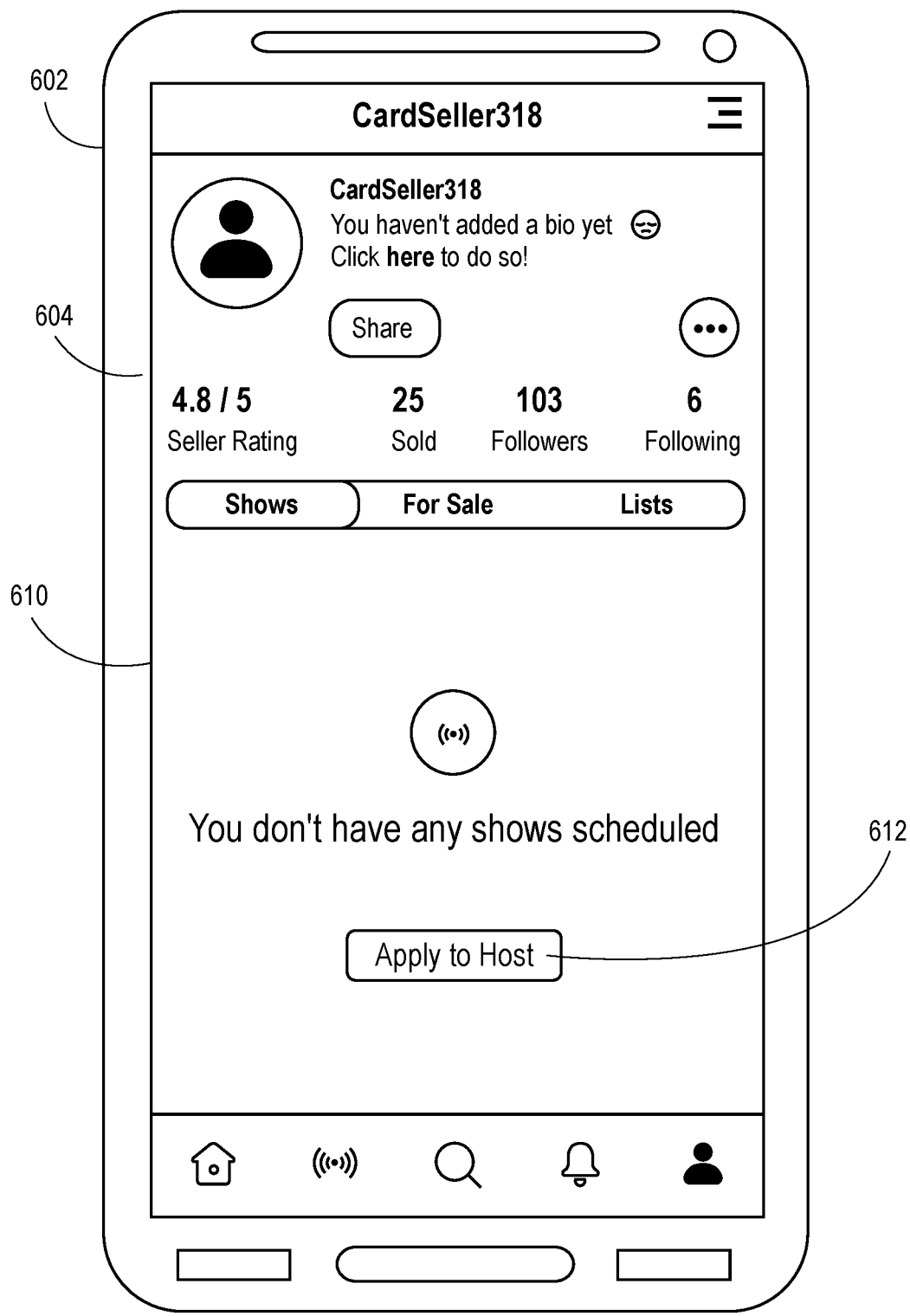
FIG. 6A is an example representation of an event list GUI executing on a mobile computing device, in accordance with some embodiments.
Figure 6B:
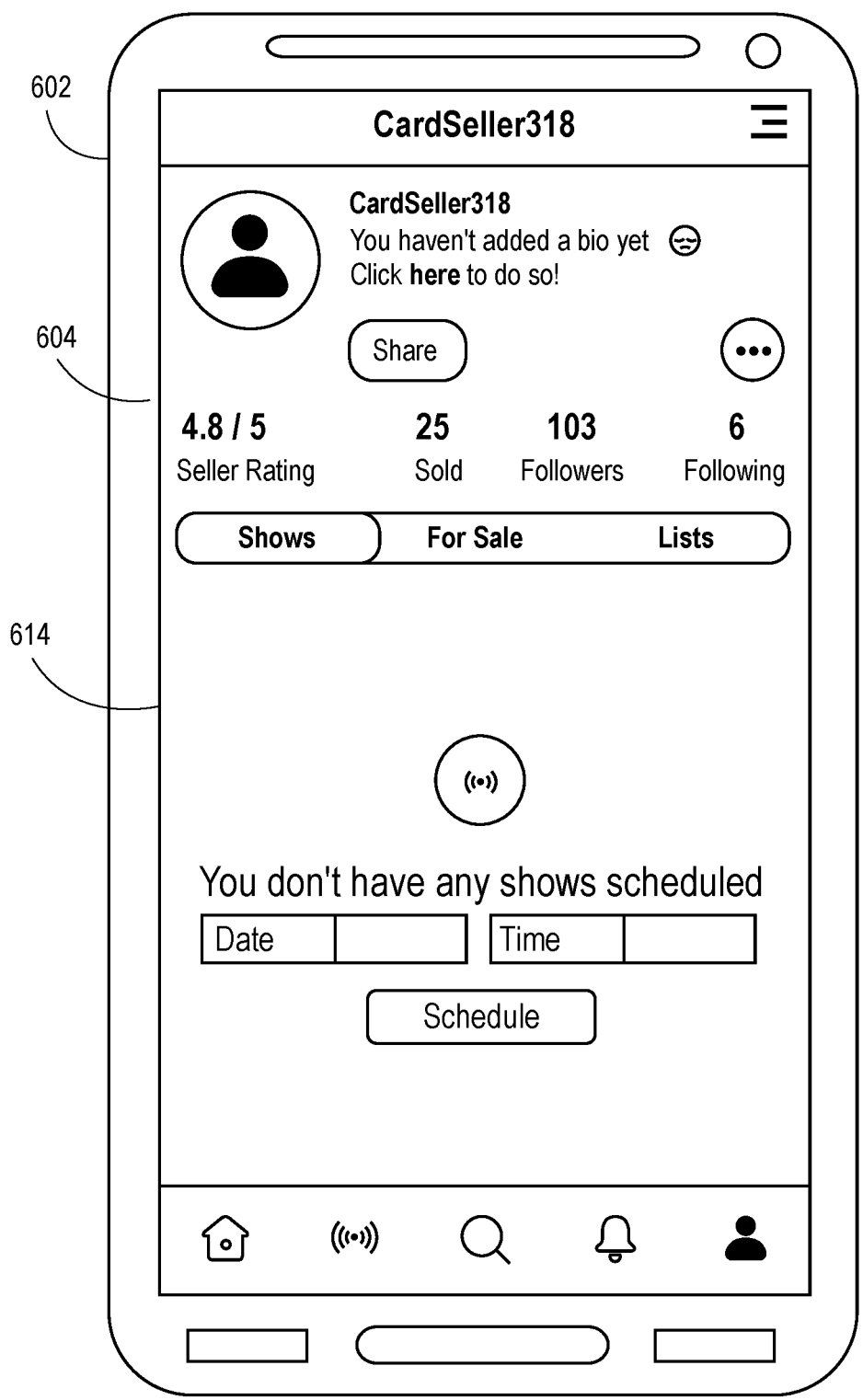
FIG. 6B is an example representation of an auction scheduling GUI executing on a mobile computing device, in accordance with some embodiments.
Figure 6C:
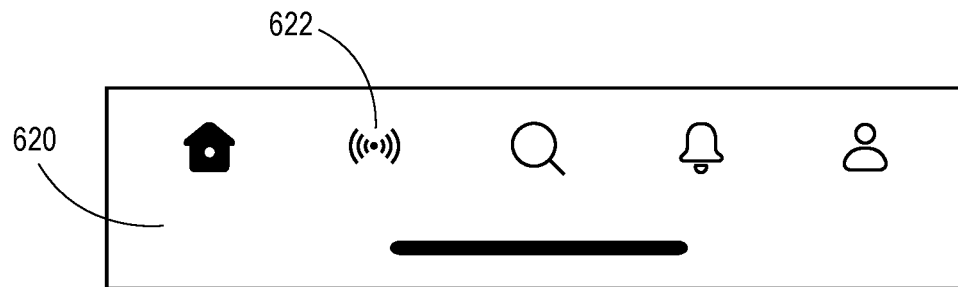
FIG. 6C is an example representation of a navigation GUI executing on a mobile computing device, in accordance with some embodiments.
Figure 6D:
FIG. 6D is an example representation of another navigation GUI executing on a mobile computing device, in accordance with some embodiments.
Figure 6E:
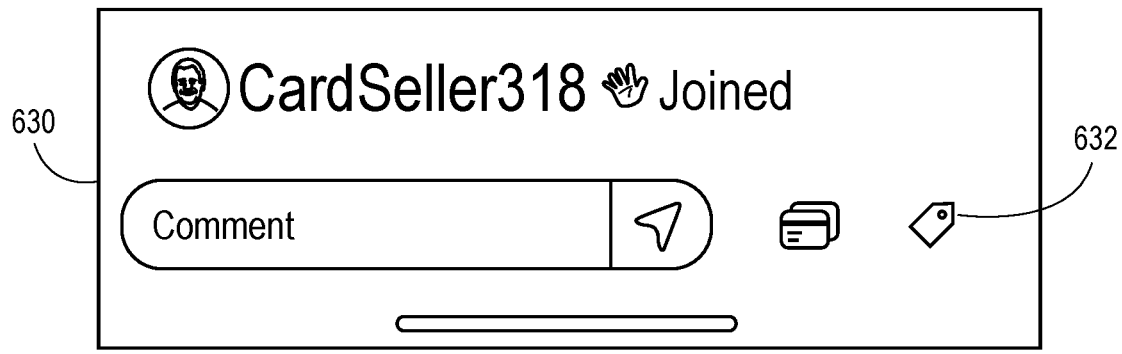
FIG. 6E is an example representation of an event preview GUI executing on a mobile computing device, in accordance with some embodiments.
Figure 6F:
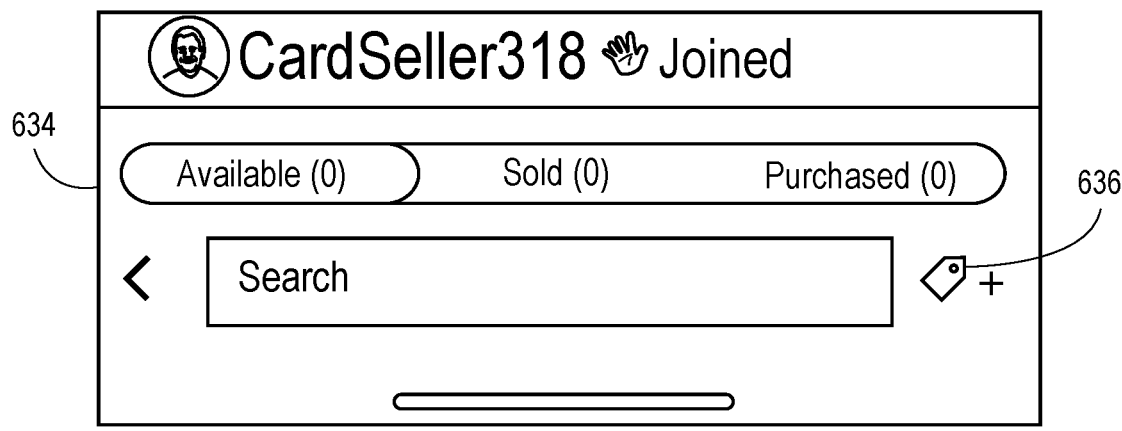
FIG. 6F is an example representation of another event preview GUI executing on a mobile computing device, in accordance with some embodiments.
Figure 6G:
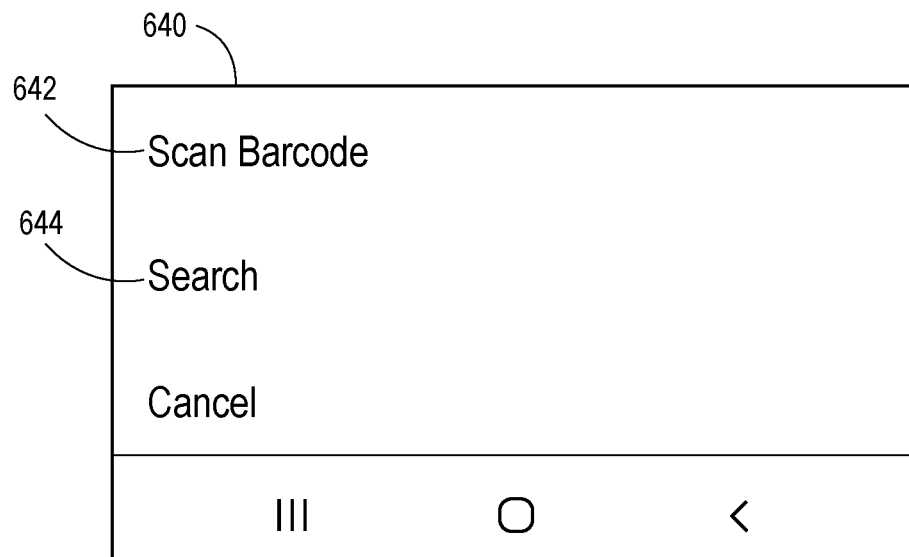
FIG. 6G is an example representation of an item search GUI executing on a mobile computing device, in accordance with some embodiments.
Figure 6H:
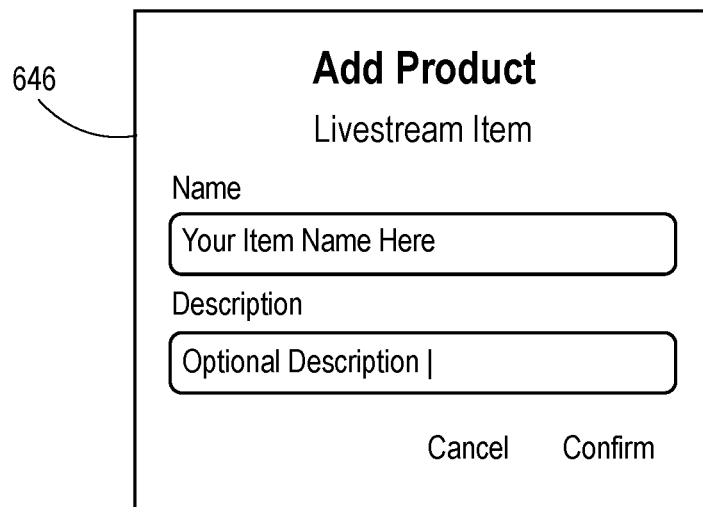
FIG. 6H is an example representation of a new item GUI executing on a mobile computing device, in accordance with some embodiments.
Figure 6I:
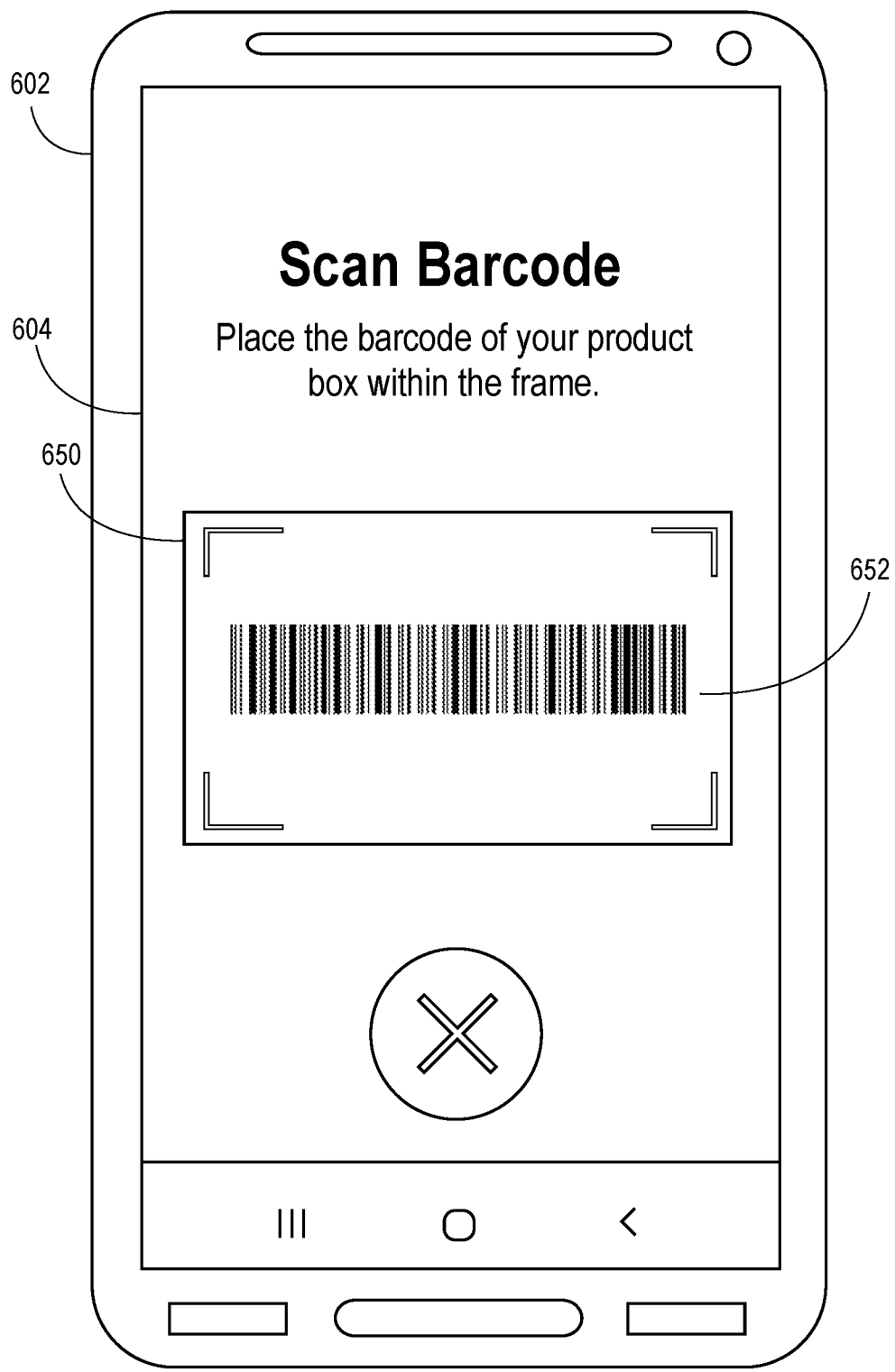
FIG. 6I is an example representation of an item scanning GUI executing on a mobile computing device, in accordance with some embodiments.
Figures 6J, 6K, 6L:
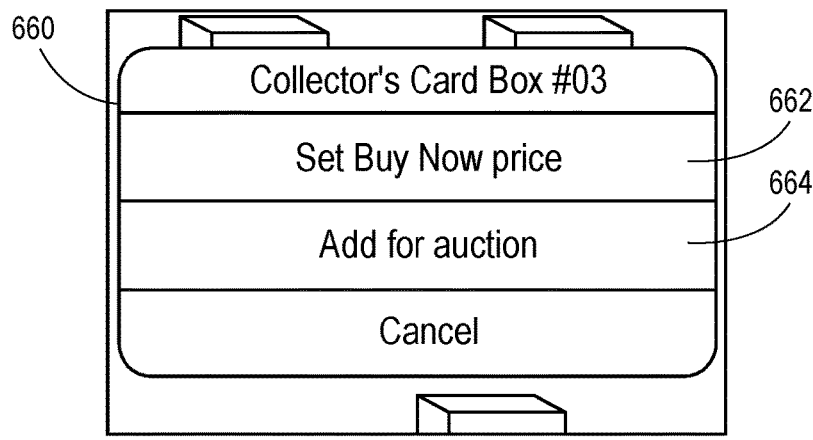
FIG. 6J is an example representation of an item configuration GUI executing on a mobile computing device, in accordance with some embodiments.
FIG. 6K is an example representation of another item configuration GUI executing on a mobile computing device, in accordance with some embodiments.
FIG. 6L is an example representation of still another item configuration GUI executing on a mobile computing device, in accordance with some embodiments.
Figure 6M:
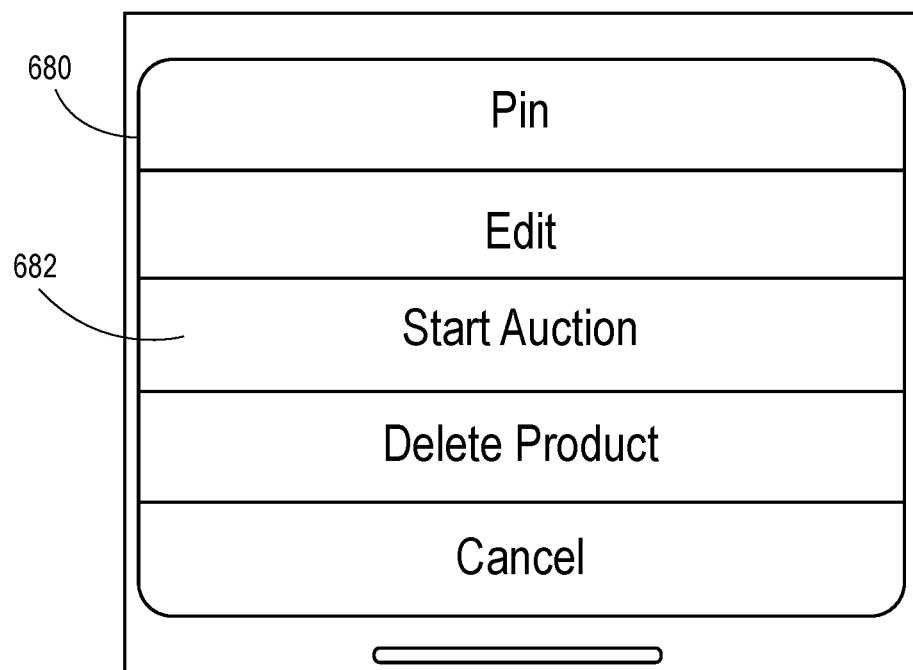
FIG. 6M is an example representation of an auction selection GUI executing on a mobile computing device, in accordance with some embodiments.
Figure 6N:
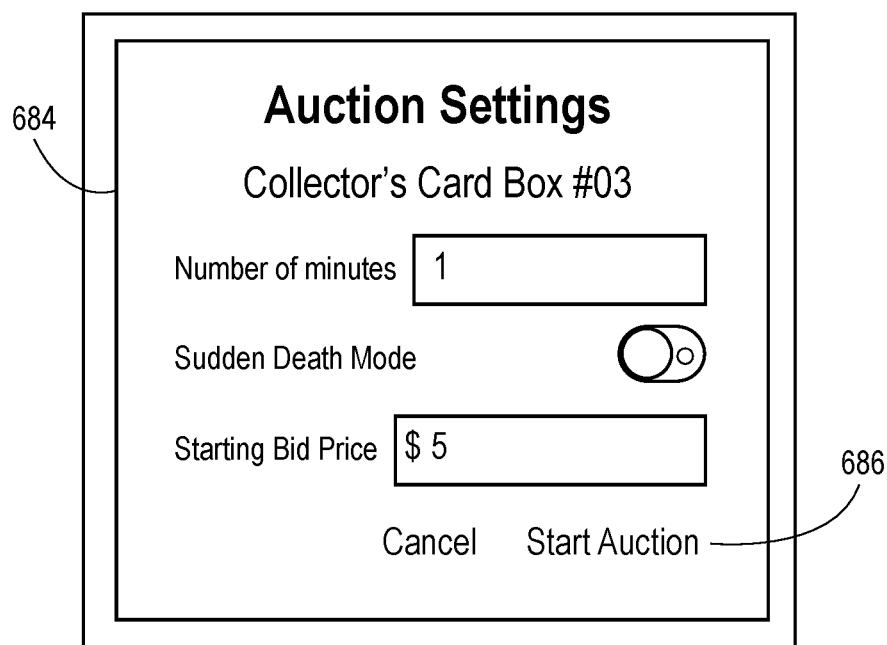
FIG. 6N is an example representation of an auction settings GUI executing on a mobile computing device, in accordance with some embodiments.

FIGS. 6A-6N illustrate various interactive GUIs that may be presented at a display 604 of a mobile computing device 602. Generally, the GUIs of FIGS. 6A-6N operate to enable a user of the device 602 to act as a host for a live auction event by scheduling the event, defining items for auction and/or direct purchase in advance of the event, and selecting items for auction during the auction event.

The GUIs of FIGS. 6A-6N may be presented at the "host device" 250 according to instructions stored on a host application at the host device 250 (e.g., host application 114 from FIG. 1). Actions associated with the GUIs of FIGS. 6A-6N may be facilitated by communications between the host device 602 and one or more servers (e.g., the auction server 114 and/or other servers described with respect to FIG. 1). Although the display 604 and device 602 are not visually depicted in some of FIGS. 6A-6N, it should be understood that, unless indicated otherwise, any of the GUIs of FIGS. 6A-6N may be presented at the display 604 of the device 602. Moreover, elements the GUIs of FIGS. 6A-6N may be combined with other elements of the GUIs of FIGS. 6A-6N and/or other GUIs described herein, in various embodiments. Interaction with example GUIs illustrated in FIGS. 6A-6N may be performed via touchscreen interactions, voice commands, and/or other suitable user interactions, in various embodiments.

First referring to FIG. 6A, an example event list GUI 610 configured to list live auction events scheduled by a particular user. The user of the device may access the GUI 610, for example, using a navigation bar continuously displayed in the host application (e.g., similar to the navigation bar 274 described with respect to FIGS. 2B and 2C). The GUI 610 includes an icon 612 selectable to request to schedule a live auction event and a channel associated therewith. FIG. 6B illustrates another example GUI 614 that may be presented, for example, upon a selection the icon 612 from FIG. 6A. The GUI 614 of FIG. 6B allows the user to schedule a date and start time in advance of a live auction event.

FIG. 6C illustrates another GUI 620 consisting of a navigation bar, e.g., similar to the navigation bar 274 described with respect to FIGS. 2B, 2C, and 6A. The navigation bar in the GUI 620 includes an "on-air events" icon 622. Selection of the icon 622 may allow the user of the device 602 to explore a listing of live auction events (e.g., as shown in FIG. 2C), including any live auction events the user is scheduled to host. FIG. 6D illustrates another example GUI 624 that may be presented, for example, in response to a selection of the icon 622 of FIG. 6C. The GUI 624 of FIG. 6D displays various information associated with an upcoming live auction event that the user has scheduled to host (e.g., a date and start time of the event, host user information, a title of the event, etc.). In particular, the GUI 624 includes a "preview" icon 626 that may be selected, for example, to preview an item listing associated with the event and/or other aspects of the live auction channel in advance of the start time of the event.

FIGS. 6E and 6F illustrate example event preview GUIs that the user of the device 602 may access, for example, by selecting the icon 626 of FIG. 6D. Specifically, FIG. 6E illustrates a first preview GUI 630 displaying a preview of a live auction channel environment. The preview GUI 630 includes an items icon 632, selection of which may direct the user to a second preview GUI 634 as shown in FIG. 6F. The GUI 634 displays a listing of items associated with the event (e.g., items to be initially listed as "available" during the event") and includes an add item icon 636, selection of which may enable the user to add one or more items for the event. In some embodiments, the GUIs 630 and/or 634 may additionally or alternatively be accessed, so as to allow the host to modify the item listing during the event using the GUIs discussed in this section.

FIG. 6G illustrates an example GUI 640 for adding an item to a live auction event. The GUI 640 may be presented at the host device 602, for example, in response to a selection of the add item icon 636 of FIG. 6F. The GUI 640 includes controls that provide access to two different mechanisms of adding an item. First, a "Scan Barcode" control 642 allows the user to identify the item to be added by capturing an image of the item's barcode (and/or capturing other images associated with the item). Second, a "Search" control 644 allows the user to identify the item to be added by entering text from which the item is identified. Use of either the scanning or searching mechanisms may, for example, involve querying an item catalogue server storing a list of items (e.g., the item catalogue server 132 of FIG. 1, which may store item titles, descriptions, barcodes, and/or other information that may be loaded from the item catalogue server identification of an item).

FIG. 6H illustrates an example "new item" GUI 646 that may be presented at the host device 602, for example, when use of neither the barcode scanning mechanism nor the search mechanism from FIG. 6G is suitable. That is, a host may seek to add to a live auction event an item that is not yet contained in an item catalogue server, and thus cannot be identified via scanning or search functionalities. In these instances, the host may use the new item GUI 646 to add a name and brief description of the item to be added.

FIG. 6I illustrates an example item scanning GUI 650 that may be presented at the host device 602, for example, in response to a selection of the scan barcode control 644 from FIG. 6G. Use of the GUI 650 may cause activation of a camera of the host device 602, displaying a view of the camera upon the GUI 650. When a barcode (or other unique machine-readable code) is aligned within a camera box 652 of the GUI 650, the GUI 650 use image recognition techniques to detect the presence of the barcode and automatically capture an image. The device 602 may transmit the captured barcode image to the item catalogue server for identification of an item based upon the barcode image. Responsive to identifying the item, the item catalogue server may provide back to the device 602 an indication of the identified item.

In any event, once an item to be added to a live auction event has been identified (e.g., by the item catalogue server or by the user adding a new item), the host may configure the identified item for auction or for direct purchase. FIG. 6J illustrates an example item configuration GUI 660 that may be presented at the host device 602 upon the identification of the item to be added. The example GUI 660 includes a first control 662 selectable to configure the time item for direct purchase (i.e., purchase a set price by any guest without an auction occurring), and an alternate second control 664 selectable to configure the item to be auctioned.

Selection of the first control 662 in the GUI 660 may cause display of another item configuration GUI 670 as shown in FIG. 6K. The GUI 670 of FIG. 6K may allow the user of the host device 602 to configure the item for direct purchase by adding and/or editing a name of the item, a description of the item (e.g., condition of the item), a price of the item for direct purchase, and a quantity of the item being offered for direct purchase (individually or in combination). Alternatively, referring back to FIG. 6J, selection of the second control 664 in the GUI 660 may cause display of still another item configuration GUI 672, as shown in FIG. 6L. The item configuration GUI 672 may allow the user of the host device 602 to configure the item for auction by adding and/or editing a name of the item, description of the item (e.g., condition of the item), and/or quantity of the item to be auctioned (individually or in combination).

At the start time of the live auction event, the host may select a first item for auction, for example by selecting the first item from the listing of items the host previously configured for the event. Additionally, the host sets a next item for auction each time a given auction concludes. FIG. 6M illustrates an example auction selection GUI 680 that the user of the host device 602 may access to start an auction for a particular item. The GUI 680 may be presented at the host device 602, for example, in response to a selection from the GUI 634 of FIG. 6F during the live auction event. The GUI 680 includes a "Start Auction" control 682, selection of which may summon still another auction configuration GUI 684 for initiating an auction of the item, as shown in FIG. 6N.

Using the GUI 684 of FIG. 6N, the host may define parameters for the auction of the given item, including an initial timer for the auction and a starting bid price (e.g., a minimum amount that a first guest must bid for the item). Additionally, the GUI 684 allows the host to enable or disable a "Sudden Death" mode affecting behavior of the auction timer during the auction. When the sudden death mode is disabled, a new bid placed when the auction timer is less than a predetermined value causes the auction timer to be increased (e.g., when the timer is less than 15 seconds, the timer may be increased by 5 seconds, 10 seconds or 15 seconds, defaulted to 15 seconds or 30 seconds, etc.) Alternatively, when the sudden death mode is enabled, the auction timer does not increase in response to new bids, even if guests place bids when the auction timer is nearly expired.

In any, case, still referring to FIG. 6N, selection of a "Start Auction" control 686 may complete configuration of the item for auction. Selection of the control 686 may cause the host device 602 to publish a message to the auction server indicating the item to be auctioned, such that the auction server may broadcast an new auction to guest devices registered in the live auction channel (e.g., as previously described with respect to FIG. 5A).

Example Mobile Computing Device and Server

Figure 7:
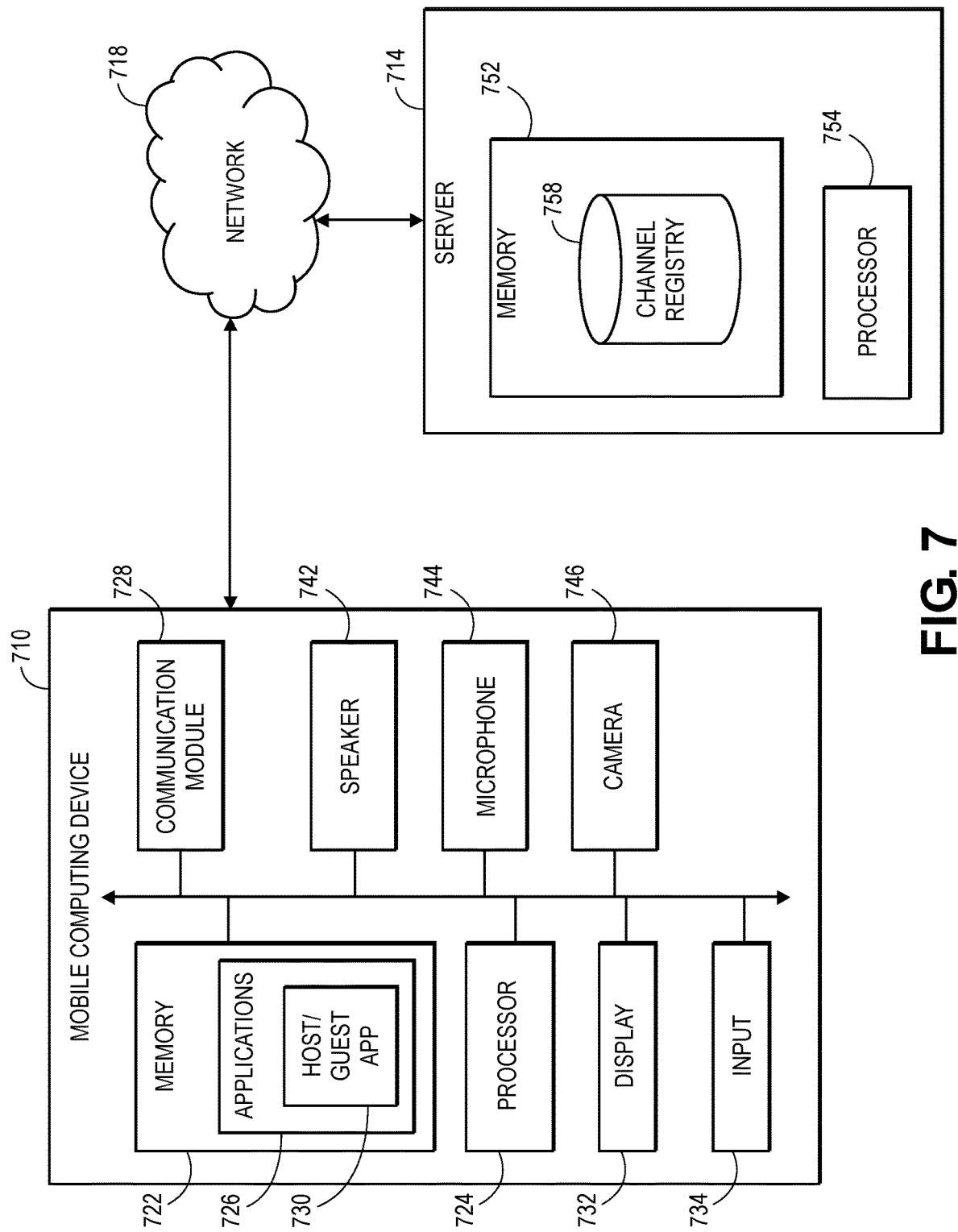
FIG. 7 is a block diagram of an example mobile computing device and server, in accordance with some embodiments.

FIG. 7 illustrates a block diagram of example components of a mobile computing device 710 and server 714 communicating over a network 718, in accordance with embodiments of the systems and methods described herein. The mobile computing device 710 may correspond, for example, to any of the mobile computing devices of the present description (e.g., host device 110a, 202, or 602, guest device 110b, 204a, 204b, 204c, 250, etc.). The server 714 may correspond, for example, to the auction server 124 and/or 224, and/or to another one or more servers of the present description. The mobile computing device and/or server 714 may include additional, fewer, or alternate components to those described in this section, in various embodiments. Additionally, in some embodiments, the mobile computing device 710 may be substituted for another computing device(s), e.g., a desktop computer.

The mobile computing device 710 may include may include a memory 722, which may include one or more non-transitory memories (e.g., ROM) and/or one or more volatile memories (e.g., RAM). In particular, non-transitory portions of the memory 722 may store non-transitory, computer executable instructions that are executable by a processor 724 (i.e., one or more processors) to cause the mobile computing device 710 to perform actions described in this detailed description. Non-transitory portions of the memory 722 may include one or more applications 726. Each respective application 726 may include one or more sets of non-transitory computer executable instructions that, when executed by the processor 724, cause the mobile computing device 710 to perform operations associated with the respective application 726 (e.g., operations involving the processor 724, a communication module 728, and/or other components of the mobile computing device 710 discussed herein). The one or more applications may include a live auction application 730 ("Host/Guest App") usable to access live auction events as a host and/or as a guest via communications between the mobile computing device 710 and the server 714).

The mobile computing device 710 may include a display unit 732 (i.e., one or more display devices, such as a touch-enabled visual display ("touchscreen") or other visual display). The mobile computing device may further include an input unit 734 (i.e., one or more user input devices, e.g., a touchscreen or touchpad, a keyboard, a mouse, etc.). In some embodiments, aspects of the display unit 732 and 734 are integrated (e.g., as a touchscreen with both touch input and display capability). The display unit 732 and/or the input unit 734 may be physically included within the mobile computing device 710 (e.g., a fixedly installed touchscreen), or may be operatively coupled with the mobile computing device 710 by other means (e.g., a peripheral touch pad, mouse, keyboard, etc. connected to the mobile computing device 710 by wired and/or wireless means).

The mobile computing device 710 may include a speaker 742, a microphone 744, and/or a camera 746. In some embodiments, the mobile computing device 710 may include still other sensor components, e.g., a positioning unit (e.g., GPS), an accelerometer, a gyroscope, etc. The speaker 742, microphone 744, camera 746, and/or other sensor component(s) may be physically included within the mobile computing device 710 (e.g., a natively installed speaker, microphone, or camera), and/or may be operatively coupled with the mobile computing device 710 by other means (e.g., a peripheral camera, speaker, or microphone connected to the mobile computing device 710 by wired and/or wireless means).

Collectively, the display unit 732, input unit 734, speaker 742, microphone 744, camera 746, and/or other sensing component(s) may provide one or more user interfaces of the mobile computing device 710. For example, the display unit 732 may display/present one or more graphical user interfaces (GUIs) which may include interactive controls that the user of the mobile computing device 710 can activate via the input device 734 to cause functionalities described herein to be performed (e.g., via a touchscreen tap or swipe, a mouse click, a keyboard stroke, etc.). Additionally or alternatively, in some embodiments, similar user interfaces may be provided at least partially by the speaker 742, microphone 744, camera 746, and/or other sensing components of the mobile computing device 710 (e.g., an interactive audio interface, a gesture-based user interface, or a user interface responsive to physical movement of the mobile computing device 710). In some embodiments, a user of the live auction application 730 at the mobile computing device 710 may configure device permissions defining components of the mobile computing device 710 the live auction application 730 may use to provide GUIs, provide notifications, and/or perform other functionalities.

The server 714 (i.e., one or more servers, e.g., the auction server 124 and/or other servers of FIG. 1) include a memory 752, which may include one or more non-transitory memories (e.g., ROM) and/or one or more volatile memories (e.g., RAM). In particular, non-transitory portions of the memory 752 may store non-transitory, computer executable instructions that are executable by a processor 754 (i.e., one or more processors) to cause the mobile computing device to perform actions described in this detailed description. Non-transitory portions of the memory 752 may include, for example, one or more application containing non-transitory instructions for controlling logic and communications relating to live auction events and the live auction channels associated therewith. The memory 752 may further include one or more APIs configured to control communications between the server 714 and the mobile computing device 710. Still additionally or alternatively, the memory 752 may store a channel registry 758, which may store various information described herein as relating to publish/subscribe channels associated with live auction events (e.g., participants, message classes, role authorization information, item listings, etc.).

The network 718 may include any suitable one or more communications networks, e.g., the Internet, a wired or wireless local area network (LAN), etc. Communications over the network 718 may include communications according to any suitable one or more communications protocols, including for example a mobile cellular communications protocol (e.g., CDMA, GSM, EV-DO, LTE, IP, etc.), one or more IEEE 802.11 protocols (e.g., Wi-Fi), Bluetooth, and/or other suitable protocols in accordance with the computing capabilities of the mobile computing device 710 and/or the server 714.

Example Computer-Implemented Methods

Figure 8A:
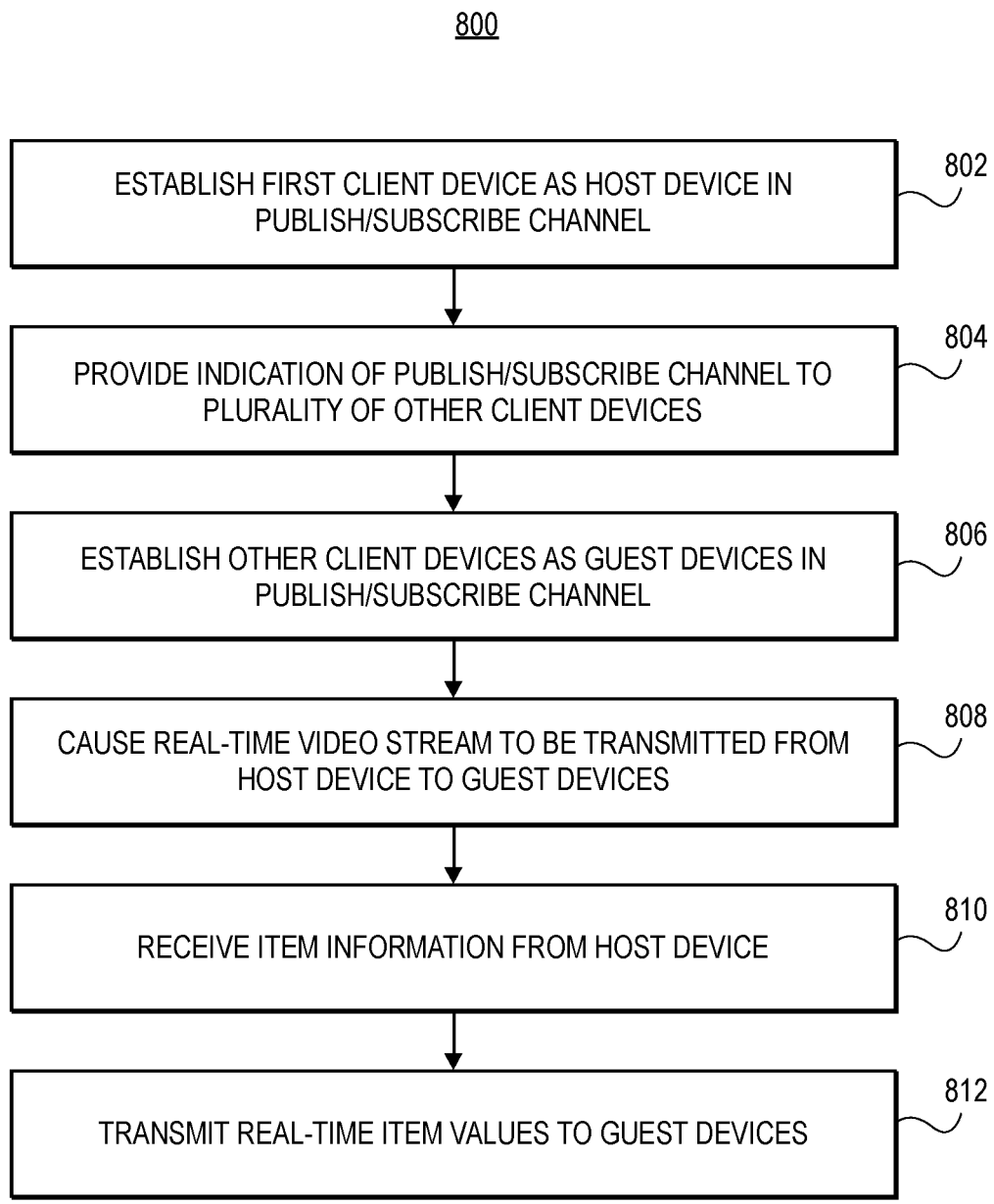
FIG. 8A is a flow diagram of an example auction channel method implemented via one or more servers, in accordance with some embodiments.
Figure 8B:
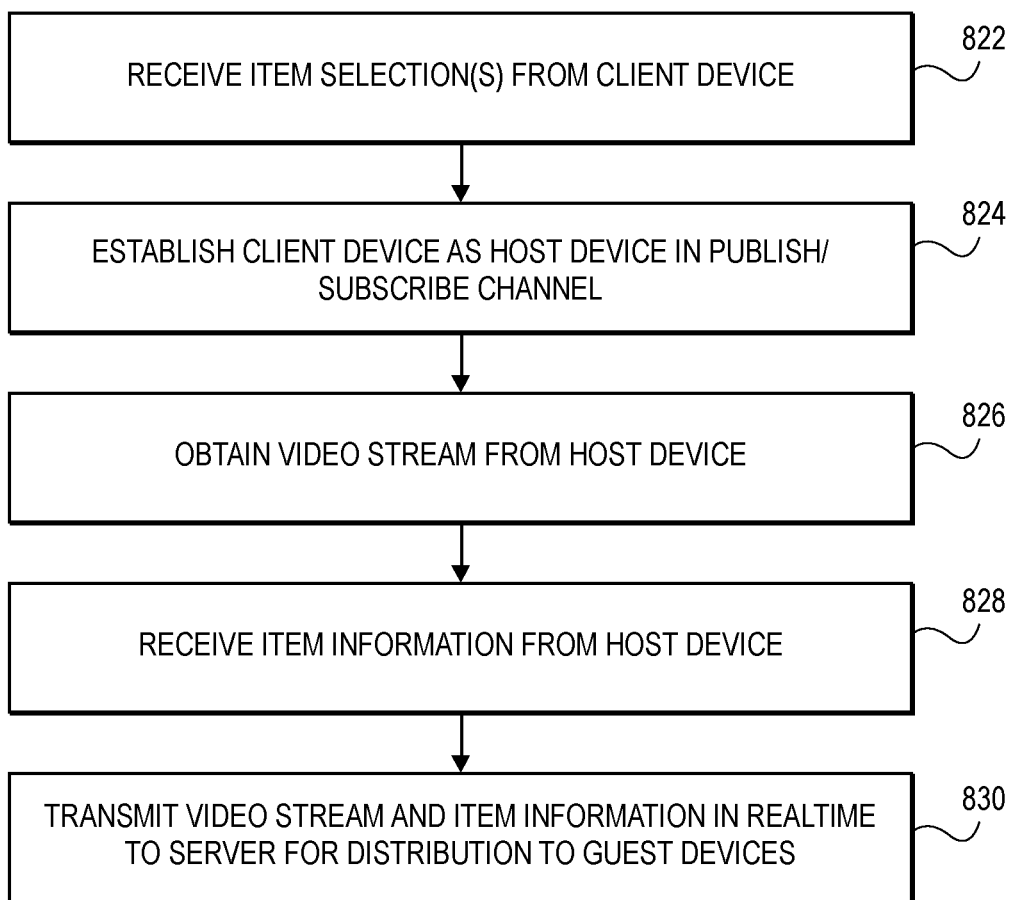
FIG. 8B is a flow diagram of an example auction host method implemented via a mobile computing device, in accordance with some embodiments.
Figure 8C:
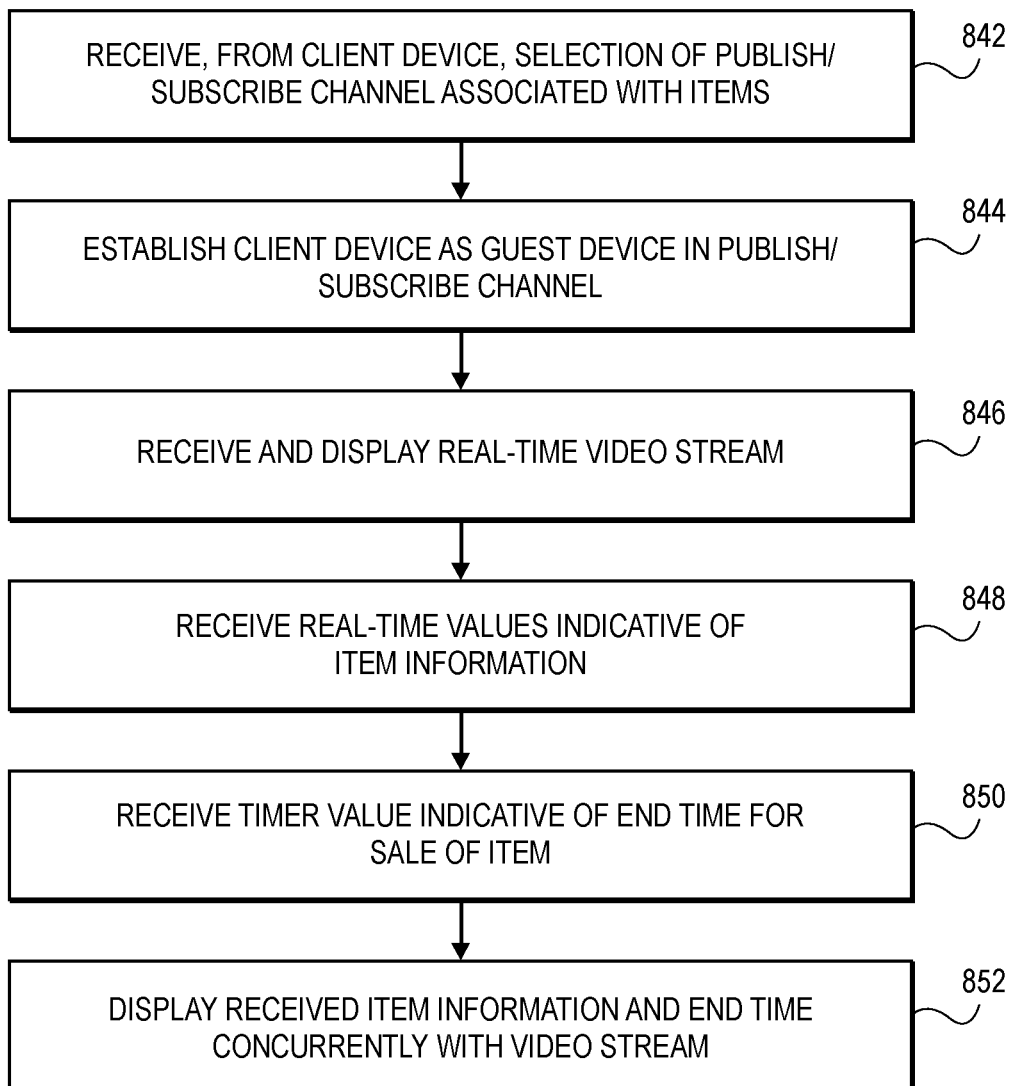
FIG. 8C is a flow diagram of an example auction guest method implemented via a mobile computing device, in accordance with some embodiments.

FIGS. 8A-8C illustrate block diagrams of example computer-implemented methods that may be performed by computing devices of the present description. At a high level, each of the methods of FIGS. 8A-8C relates to implementation of a publish/subscribe channel associated with one or more items in a live auction event, in accordance with the techniques described in previous sections of this detailed description.

In embodiments, one or more memories of a computing device may store non-transitory, computer executable instructions that, when executed via one or more processors of the computing device, cause the computing device to perform actions of the computer-implemented methods described herein. Furthermore, in some embodiments, one or more non-transitory computer readable media may be provided (e.g., a non-removable computer memory, a removable flash drive, etc.), the one or more non-transitory computer readable media storing instructions that, when executed by one or more computing devices, cause the one or more computing devices to perform actions of the methods described herein. Order of actions of the methods described in this section vary from the order illustrated, and actions of the methods may be combined and/or substituted with other actions described in this detailed description, in various embodiments.

First referring to FIG. 8A, a computer-implemented method 800 is provided. The method 800 may be performed, for example, via a server (i.e., one or more servers, e.g., the auction server 124 and/or other servers of FIG. 1, and/or the auction server 224 introduced in FIG. 2A) in communication with a one or more client computing devices (e.g., host and/or guest mobile computing devices described herein) via a network (i.e., one or more networks).

The method 800 includes, responsive to first communications received from a first client computing device, establishing the first client device as a host device in a publish/subscribed channel associated with one or more items in a live auction event (802). Establishing the first client device as the host may enable the client device to communicate information associated with the one or more items to guest devices in the publish/subscribe channel. Specifically, the host device in the publish/subscribe channel is enabled to publish auction information to the server, with the server being configured to responsively publish the item information to subscribed guest devices (e.g., based upon stored information in a channel registry at the server).

In embodiments, after establishing the first client device as the host, the server may communicate with the host device to configure various other aspects of the live auction event using techniques of the present description (e.g., additional items for auction, items for direct purchase, "Sudden Death" timer settings, etc.).

The method 800 further includes providing, via communications to each of a plurality of second client computing devices, an indication of the publish/subscribe channel being available to each of the plurality of second client devices (804). That is, the server may "advertise" the presence of the publish/subscribe channel to prospective guest users, e.g., via communications with an application executing at respective ones of the second client devices belonging to prospective guest users, thereby enabling each of the plurality of second client devices to display information such as that depicted in FIGS. 2B and 2C.

The method 800 further includes, responsive to second communications from respective ones of the plurality of second client devices, establishing the respective ones of the plurality of second client devices as guest devices in the publish/subscribe channel (806). Establishing the respective ones of the plurality of second client devices may, for example, include communications between the server and client device to establish the client devices as participants having the role of "guest" in the channel, and additional operations at the server to modify the registry at the server to reflect the roles of the registered guest devices, thereby enabling guest devices to publish and/or subscribe to certain classes of messages in the channel.

Having established the host and guests participating in the publish/subscribe channel, the server may perform role-based authorization to handle subsequent incoming communications from the host and guest devices, e.g., verifying that a given device is permitted to publish a particular class of message to which an incoming communication belongs. Additionally, the server may perform role-based processing to determine which of the host and/or guest devices are to receive outgoing communications from the server.

Still referring to FIG. 8A, the method 800 further includes causing a real-time video stream to be transmitted unidirectionally to each of the plurality of guest devices, the real-time video stream originating from the host device (808). The action 808 may, for example, include receiving the video stream from the host device at the server, and forwarding the real-time video stream to guest devices in the publish/subscribe channel. Additionally or alternatively, causing the real-time video stream to be transmitted may include communications of the server with another one or more computing devices to otherwise direct the distribution of real-time video from the host device to the guest devices. Optionally, but not necessarily, the real-time video stream may include accompanying real-time audio similarly originating from the host device.

The method 800 may still further include receiving, from the host device, third communications (810). The third communications from the host device specifically may include at least an indication of a particular item for sale (e.g., for auction) from among the one or more items associated with the live auction event. In some embodiments, the third communications may include an indication of an initial price for the particular item. Alternatively, in some embodiments, the server may determine the initial price for the particular item, e.g., based upon an estimated value of the particular item or based upon past auction activity associated with the particular item and/or similar items.

The method 800 still further includes, responsive to receiving the third communications, publishing a plurality of real-time values to each of the plurality of guest devices (812). The plurality of real-time values are indicative of information associated with the live auction event, including for example (1) the particular item for auction, (2) the price for the particular item, and (3) an end time of the auction of the particular item. A value indicative of the end time of the auction can include, for example, a value indicating time remaining until the end time (e.g., a countdown timer value), or a value of the end time itself (e.g., as a Unix timestamp).

The method 800 may include additional, fewer, and/or alternate actions, in various embodiments. For example, the method 800 may additionally include receiving new bids for the particular item from one or more of the guest devices, processing the new bids (e.g., verifying guest role information and updating the auction timer, if necessary), and/or broadcasting the new bids to the host device and guest devices in real-time via the publish/subscribe channel. Still additionally or alternatively, the method 800 include various other actions to facilitate a live auction event as described in this detailed description (e.g., receiving and broadcasting comments in the live auction channel, generating and/or modifying messages to be sent over the live auction channel, processing orders, receiving and publishing new items for auction during the live auction event, etc.).

Referring next to FIG. 8B, a computer-implemented method 820 is provided. Generally speaking, the method 820 may be performed by a client computing device associated with a host user in a live auction event (e.g., the mobile computing device 110a of FIG. 1, the host device 202 introduced in FIG. 2A, and/or the host device 650 introduced in FIG. 6A). Actions of the method 820 may include communications between the client computing device and a server (i.e., one or more servers, e.g., the auction server 124 and/or other servers of FIG. 1, and/or the auction server 224 introduced in FIG. 2A).

The method 820 includes receiving, via a graphical user interface presented at a display unit of the client device, a first one or more user interactions indicative of one or more items (822, e.g., a selection of one or more items to be auctioned during a live auction event implemented via a publish/subscribe channel as described herein). The one or more user interactions at action 822 may, for example, actions associated with searching items from an item catalogue server, identifying an item by a barcode, etc.

The method 820 further includes, via communications between the client device and one or more servers, establishing the client device as a host device in a publish/subscribe channel associated with the one or more items (824). Establishing the client device as the host device in the channel may enable the client device to (1) publish, by way of the server to a plurality of guest devices in the publish/subscribe channel, classes of messages indicative of real-time information associated with the one or more items (e.g., a new item to be auctioned, a starting price, etc.), and/or (2) subscribe to classes of messages broadcasted by the one or more servers in response to published messages from other devices and/or generation of messages by the server.

The method 820 further includes obtaining a video stream via a camera unit of the host device (826). Obtaining the video stream may include causing the camera unit (e.g., a native or peripheral camera associated with the host device) to continuously capture real-time video to be provided to guest devices during the live auction event. Optionally, but not necessarily, obtaining the real-time video stream may include obtaining accompanying audio via a microphone of the host device.

The method 820 still further includes receiving, via the graphical user interface, a second one or more user interactions (828). The second one or more user interactions may be indicative of item information including at least at least a particular item for sale (e.g., for auction) from among the one or more items. Additionally, in some embodiments, the indicated item information may further include a price of the particular item (e.g., an initial starting auction price). Alternatively, in some embodiments, the one or more servers may determine the initial price for the particular item, e.g., based upon an estimated value of the particular item or based upon past auction activity associated with the particular item and/or similar items.

The method 820 still further includes transmitting, to the one or more servers in real-time, the video stream and the item information (830). Transmitting of the video stream and item information may enable the one or more servers to distribute the video stream and item information in real-time to guest devices, for display of the video stream and item information at the guest devices in the publish/subscribe channel.

The method 820 may include additional, fewer, and/or alternate actions, in various embodiments. For example, the method 820 may include various other operations of the host device discussed in the present description (e.g., receiving and displaying bids and comments published by guest devices, adding items for direct purchase in the live auction channel, handling a crash at the host device by restoring information from the one or more servers, etc.).

Referring now to FIG. 8C, a computer-implemented method 840 is provided. Generally speaking, the method 840 may be performed by a client computing device associated with a guest user in a live auction event (e.g., one of the mobile computing device 110b in FIG. 1, one of the devices 204a-204c introduced in FIG. 2A, and/or the device 250 introduced in FIG. 2B).

The method 840 includes receiving a user selection of a publish/subscribe channel associated with one or more items (842). The user selection may be received, for example, via a graphical user interface presented at a display unit of the client device (e.g., from an auction exploration GUI listing active/upcoming live auction events, as described with respect to FIGS. 2B and 2C).

The method 840 further includes, responsive to receiving the selection, establishing the client device as a first guest in the publish/subscribe channel associated with the one or more items (844). Establishing the client device as the first guest device in the channel may enable the client device to (1) publish, by way of the server to other guest devices and a host device in the publish/subscribe channel, classes of messages indicative of actions at the first guest device (e.g., bids, comments, purchases of items, etc.), and/or (2) subscribe to classes of messages broadcasted by the one or more servers, (e.g., new bids or comments published the host device or other guest devices, other messages generated by the server, etc.).

The method 840 still further includes, upon establishing the client device as the first guest device, receiving and displaying at the display unit (e.g., via the GUI), a real-time video stream originating from the host device of the publish/subscribe channel (846). Optionally, but not necessarily, the real-time video stream may include accompanying real-time audio similarly originating from the host device.

The method 840 further includes receiving a plurality of real-time values indicative of item information (848). The client device may receive the real-time values from the one or more servers via the publish/subscribe channel, with the real-time values indicating at least (1) a particular item for sale (e.g., for auction) from among the one or more items (e.g., as selected from the host device), (2) a real-time price of the particular item (e.g., a current highest bid, or the initial price of the particular item if no bids have yet been placed), and (3) real-time participation of the one or more other guest devices in the publish/subscribe channel (e.g., real-time information identifying the guest user(s) who placed recent bids, and/or comments posted by other guest devices in the publish/subscribe channel).

The method 840 still further includes receiving, from the one or more servers via the publish/subscribe channel, a value indicative of an end time for the sale of the particular item (850). The value indicative of the end time of the sale can include, for example, a value indicating time remaining until the end time (e.g., an auction countdown timer value), or a value of the end time itself (e.g., an auction end time as a Unix timestamp).

The method 840 further includes displaying, via the graphical user interface and concurrently with the real-time video stream from the host device, a plurality of user interface elements indicative of the received item information and the end time (852). The plurality of user interface elements displayed at action 852 may, for example, take the form of any of the guest device GUIs discussed with respect to any one or more of FIG. 3B, 4C-4G, or 5B.

The method 840 may include additional, fewer, and/or alternate actions, in various embodiments. For example, the method 840 may include various other operations of the guest device discussed in the present description (e.g., publishing bids and comments, receiving and displaying bids and comments published by other guest devices, receiving interactions to purchase an item included for direct purchase in the live auction channel, handling a crash at the guest device by restoring information from the one or more servers etc.).

ADDITIONAL CONSIDERATIONS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims. By way of example, and not limitation, the disclosure herein contemplates at least the following aspects:

1. One or more servers comprising one or more processors and one or more memories storing non-transitory computer executable instructions. The instructions, when executed via the one or more processors, cause the one or more servers to, responsive to first communications received from a first client computing device, establish the first client device as a host device in a publish/subscribe channel, the publish/subscribe channel enabling the host device to publish, via the one or more servers to a plurality of guest devices in the publish/subscribe channel, information associated with one or more items. The instructions may further cause the one or more servers to provide, to each of a plurality of second client computing devices, an indication of the publish/subscribe channel being available to each of the plurality of second client devices. The instructions may further cause the one or more servers to, responsive to second communications from respective ones of the plurality of second client devices, establish the respective ones of the plurality of second client devices as guest devices in the publish/subscribe channel. Still further, the instructions may cause the one or more servers to cause a real-time video stream to be transmitted to each of the plurality of guest devices, the real-time video stream originating from the host device. The instructions may yet further cause the one or more servers to receive, from the host device, third communications indicative at least of a particular item for sale from among the one or more items. Still further, the instructions may cause the one or more servers to, responsive to receiving the third communications from the host device, transmit a plurality of real-time values to each of the plurality of guest devices via the publish/subscribe channel, the plurality of real-time values being indicative of the particular item, a price of the particular item, and an end time of the sale of the particular item.

2. The one or more servers of the previous aspect, wherein non-transitory computer executable instructions, when executed via the one or more processors, further cause the one or more servers to: receive, from a particular guest device from among the plurality of guest devices in the publish/subscribe channel, bid information indicative of a bid for the particular item by the particular guest device, the bid information comprising a bid amount; responsive to receiving the bid information, analyze the bid information to validate the bid for the particular item; and upon validating the bid for the particular item, (1) update a stored record of the price of the particular item at the one or more servers, and (2) transmit, to the host device and to each of the plurality of guest devices via the publish/subscribe channel, updated real-time item information including at least the updated price of the particular item.

3. The one or more servers of the previous aspect, wherein the instructions to validate the bid for the particular item comprise instructions to determine, based upon stored channel registry information associated with the publish/subscribe channel, that a role assigned to the particular guest device is authorized to perform the bid for the particular item.

4. The one or more severs of either one of aspects 2-3, wherein the updated real-time item information further includes user identity information corresponding to the particular guest device from which the bid information was received.

5. The one or more servers of any one of aspects 2-4, wherein the non-transitory computer executable instructions, when executed via the one or more processors, further cause the one or more servers to, upon validating the bid for the particular item, update a stored record of the end time of the sale of the particular item, and wherein the updated real-time item information further includes an indication of the update to the end time.

6. The one or more servers of aspect 5, wherein the indication of the update to the end time comprises a Unix timestamp value indicative of the updated end time.

7. The one or more servers of any one of aspects 1-6, wherein the non-transitory computer executable instructions, when executed via the one or more processors, further cause the one or more servers to: responsive to determining that the current time has passed the end time, obtain winning bid information associated with the sale of the particular item; and transmit, to the host device and to each of the plurality of guest devices via the publish/subscribe channel, a notification of the winning bid information.

8. The one or more servers of aspect 7, wherein the non-transitory computer executable instructions, when executed via the one or more processors, further cause the one or more servers to: subsequent to the transmitting of the notification of the winning bid information; receive, from the host device via the publish/subscribe channel, fourth communications indicative of a next item for sale from among the one or more items; and responsive to receiving the third communications from the host device, transmit a further plurality of real-time values to each of the plurality of guest devices via the publish/subscribe channel, the further plurality of real-time values being indicative of the next item, a price of the next item, and an end time of the sale of the next item.

9. The one or more servers of any one of aspects 1-8, wherein the first communications from the first client device comprises image data containing a barcode, wherein the non-transitory computer executable instructions, when executed via the one or more processors, further cause the one or more servers to analyze the image data to identify an item corresponding to the barcode, and wherein the establishing of the first client device as the host device enables the host device to publish, to the plurality of guest devices in the publish subscribe channel, information associated with the identified item corresponding to the barcode.

10. The one or more servers of any one of aspects 1-9, wherein the third communications received from the host device are further indicative of the price of the particular item, the price being an initial auction price.

11. The one or more servers of any one of aspects 1-10, wherein the third communications received from the host device are further indicative of the end time of the sale of the particular item.

12. A computer-implemented method comprising, responsive to first communications received from a first client computing device, establish, via one or more processors, the first client device as a host device in a publish/subscribe channel, the publish/subscribe channel enabling the host device to publish, via the one or more servers to a plurality of guest devices in the publish/subscribe channel, information associated with one or more items. The method further comprises providing, via the one or more processors to each of a plurality of second client computing devices, an indication of the publish/subscribe channel being available to each of the plurality of second client devices. The method further comprises, responsive to second communications from respective ones of the plurality of second client devices, establishing, via the one or more processors, the respective ones of the plurality of second client devices as guest devices in the publish/subscribe channel. The method still further comprises causing, via the one or more processors, a real-time video stream to be transmitted to each of the plurality of guest devices, the real-time video stream originating from the host device. Still additionally, the method comprises receiving, from the host device and via the one or more processors, third communications indicative at least of a particular item for sale from among the one or more items. Still further, the method includes, responsive to receiving the third communications from the host device, transmitting, via the one or more processors, a plurality of real-time values to each of the plurality of guest devices via the publish/subscribe channel, the plurality of real-time values being indicative of the particular item, a price of the particular item, and an end time of the sale of the particular item.

13. The computer-implemented method of aspect 12, performed by the one or more servers of any one of aspects 1-11.

14. The method of either one of aspects 12-13, further comprising: receiving, via the one or more processors from a particular guest device from among the plurality of guest devices in the publish/subscribe channel, bid information indicative of a bid for the particular item by the particular guest device, the bid information comprising a bid amount; responsive to receiving the bid information, analyzing the bid information via the one or more processors to validate the bid for the particular item; and upon validating the bid for the particular item, and via the one or more processors, (1) updating a stored record of the price of the particular item at the one or more servers, and (2) transmitting, to the host device and to each of the plurality of guest devices via the publish/subscribe channel, updated real-time item information including at least the updated price of the particular item.

15. The method of aspect 14, wherein validating the bid for the particular item comprising determining based upon stored channel registry information associated with the publish/subscribe channel, that a role assigned to the particular guest device is authorized to perform the bid for the particular item.

16. The method of either one of aspects 14-15, wherein transmitting the updated real-time item information includes transmitting user identity information corresponding to the particular guest device from which the bid information was received.

17. The method of any one of aspects 14-16, further comprising, upon validating the bid for the particular item, and via the one or more processors, updating a stored record of the end time of the sale of the particular item, wherein transmitting the updated real-time item information includes transmitting an indication of the update to the end time.

18. The method of aspect 17, transmitting an indication of the update to the end time includes transmitting Unix timestamp value indicative of the updated end time.

19. The method of any one of aspects 12-18, further comprising: determining, via the one or more processors, that a current time has passed the end time of the sale of the particular item; responsive to determining that the current time has passed the end time, obtaining, via the one or more processors, winning bid information associated with the sale of the particular item; and transmitting, to the host device and to each of the plurality of guest devices via the publish/subscribe channel, a notification of the winning bid information.

20. The method of aspect 19, further comprising, subsequent to transmitting the notification of the winning bid information: receiving, via the one or more processors, from the host device via the publish/subscribe channel, fourth communications indicative of a next item for sale from among the one or more items; and responsive to receiving the third communications from the host device, transmitting, via the one or more processors, a further plurality of real-time values to each of the plurality of guest devices via the publish/subscribe channel, the further plurality of real-time values being indicative of the next item, a price of the next item, and an end time of the sale of the next item.

21. The method of any one of aspects 12-20, wherein receiving the first communications from the first client device comprises receiving image data containing a barcode, wherein the method further includes analyzing the image data to identify an item corresponding to the barcode, and wherein the establishing of the first client device as the host device enables the host device to publish, to the plurality of guest devices in the publish subscribe channel, information associated with the identified item corresponding to the barcode.

22. The method of any one of aspects 12-21, wherein receiving the third communications from the host device includes receiving an indication of the price of the particular item, the price being an initial auction price.

23. The method of any one of aspects 12-22, wherein receiving the third communications from the host device includes receiving an indication of the end time of the sale of the particular item.

24. One or more computer readable media storing non-transitory computer executable instructions. The instructions, when executed via one or more processors of one or more servers, cause the one or more servers to, responsive to first communications received from a first client computing device, establish the first client device as a host device in a publish/subscribe channel, the publish/subscribe channel enabling the host device to publish, via the one or more servers to a plurality of guest devices in the publish/subscribe channel, information associated with one or more items. The instructions further cause the one or more servers to provide, to each of a plurality of second client computing devices, an indication of the publish/subscribe channel being available to each of the plurality of second client devices. The instructions still further cause the one or more servers to, responsive to second communications from respective ones of the plurality of second client devices, establish the respective ones of the plurality of second client devices as guest devices in the publish/subscribe channel. The instructions still yet further cause the one or more servers to cause a real-time video stream to be transmitted to each of the plurality of guest devices, the real-time video stream originating from the host device. Still additionally, the instructions cause the one or more servers to receive, from the host device, third communications indicative at least of a particular item for sale from among the one or more items. The instructions further cause the one or more servers to, responsive to receiving the third communications from the host device, transmit a plurality of real-time values to each of the plurality of guest devices via the publish/subscribe channel, the plurality of real-time values being indicative of the particular item, a price of the particular item, and an end time of the sale of the particular item.

25. The one or more computer readable media of aspect 24, read via the one or more servers of any one of aspects 1-11.

26. The one or more computer readable media of either one of aspects 24-25, wherein the instructions, when executed via the one or more processors of one or more servers, cause the one or more servers to perform the method of any one of aspects 12-23.

27. One or more computer readable media storing non-transitory computer executable instructions. The instructions, when executed via one or more processors of a client computing device, cause the client computing device to receive, via a graphical user interface presented at a display unit of the client device, a first one or more user interactions indicative of one or more items. The instructions further cause the client device to, via communications between the client device and one or more servers, establish the client device as a host device in a publish/subscribe channel associated with the one or more items, the publish/subscribe channel enabling the client device to publish, to a plurality of guest devices in the publish/subscribe channel, real-time information associated with the one or more items. The instructions further cause the client device to obtain a video stream via a camera unit of the client device. The instructions still further cause the client computing device to receive, via the graphical user interface, a second one or more user interactions indicative of item information including at least (1) a particular item for sale from among the one or more items, and (2) a price of the particular item. The instructions still yet further cause the client computing device to transmit, to the one or more servers in real-time, the video stream and the item information for display of the real-time video stream concurrently with the item information at each of the plurality of guest devices in the publish/subscribe channel.

28. The one or more computer readable media of aspect 27, wherein the non-transitory computer executable instructions, when executed via the one or more processors, further cause the client computing device to: receive, from the one or more servers in real-time, a plurality of real-time values indicative of bid information comprising at least (1) a particular guest device from among the plurality of guest devices, and (2) a bid value of a bid placed via the particular guest device; and display the bid information via the graphical user interface while continuing to obtain and transmit the video stream from the client device.

29. The one or more computer readable media of either one of aspects 27-28, wherein the instructions to receive the first one or more user interactions indicative of one or more items include instructions to: receive, via the graphical user interface, a search query; and receive, via the graphical user interface, a selection from a list of results of the search query presented via the graphical user interface in response to the search query.

30. The one or more computer readable media of any one of aspects 27-29, wherein the instructions to receive the first one or more user interactions indicative of one or more items include instructions to obtain, via the camera unit, image data depicting a barcode corresponding to an item to be included in the one or more items associated with the publish/subscribe channel.

31. The one or more computer readable media of any one of aspects 27-30, wherein the instructions to receive the second one or more user interactions indicative of one or more items include instructions to receive, via the graphical user interface, a selection of a setting to control a behavior of a timer associated with the sale of the particular item.

32. The one or more computer readable media of any one of aspects 27-31, wherein the non-transitory computer executable instructions, when executed via the one or more processors, further cause the client computing device to, subsequent to an end time of the sale of the particular item: receive, via the graphical user interface, a third one or more user interactions indicative of further item information including at least (1) a second item for sale from among the one or more items, and (2) a starting price of the second item; and transmit, to the one or more servers in real-time concurrently with the video stream, the further item information for display of the further item information at each of the plurality of guest devices in the publish/subscribe channel.

33. The one or more computer readable media of any one of aspects 27-32, wherein the non-transitory computer executable instructions, when executed via the one or more processors, further cause the client computing device to: receive, from the one or more servers in real-time, further real-time information indicative of one or more comments posted via one or more of the guest devices in the publish/subscribe channel; and display the posted comments via the graphical user interface while continuing to obtain and transmit the video stream from the client device.

34. A computer-implemented method comprises receiving, via a graphical user interface presented at a display unit of a client computing device, a first one or more user interactions indicative of one or more items. The method further comprises, via communications between one or more processors of the client device and one or more servers, establishing the client device as a host device in a publish/subscribe channel associated with the one or more items, the publish/subscribe channel enabling the client device to publish, to a plurality of guest devices in the publish/subscribe channel, real-time information associated with the one or more items. The method further comprises obtaining a video stream via a camera unit of the client device. The method still further comprises receiving, via the graphical user interface, a second one or more user interactions indicative of item information including at least (1) a particular item for sale from among the one or more items, and (2) a price of the particular item. The method still further comprises transmitting, via the one or more processors to the one or more servers in real-time, the video stream and the item information for display of the real-time video stream concurrently with the item information at each of the plurality of guest devices in the publish/subscribe channel.

35. The method of aspect 34, further comprising receiving, via the one or more processors from the one or more servers in real-time, a plurality of real-time values indicative of bid information comprising at least (1) a particular guest device from among the plurality of guest devices, and (2) a bid value of a bid placed via the particular guest device; and displaying the bid information via the graphical user interface while continuing to obtain and transmit the video stream from the client device.

36. The method of either one of aspects 34-35, wherein receiving the first one or more user interactions includes: receiving, via the graphical user interface, a search query; and receiving, via the graphical user interface, a selection from a list of results of the search query presented via the graphical user interface in response to the search query.

37. The method of any one of aspects 34-36, wherein receiving the first one or more user interactions includes obtaining, via the camera unit, image data depicting a barcode corresponding to an item to be included in the one or more items associated with the publish/subscribe channel.

38. The method of any one of aspects 34-37, wherein receiving the second one or more user interactions includes receiving, via the graphical user interface, a selection of a setting to control a behavior of a timer associated with the sale of the particular item.

39. The method of any one of aspects 34-36, further comprising, subsequent to an end time of the sale of the particular item: receiving, via the graphical user interface, a third one or more user interactions indicative of further item information including at least (1) a second item for sale from among the one or more items, and (2) a starting price of the second item; and transmitting, via the one or more processors to the one or more servers in real-time concurrently with the video stream, the further item information for display of the further item information at each of the plurality of guest devices in the publish/subscribe channel.

40. The method of any one of aspects 34-36, further comprising: receiving, via the one or more processors from the one or more servers in real-time, further real-time information indicative of one or more comments posted via one or more of the guest devices in the publish/subscribe channel; and display the posted comments via the graphical user interface while continuing to obtain and transmit the video stream from the client device.

41. A client computing device comprises one or more processors, a camera unit, and one or more memories. The one or more memories store non-transitory computer executable instructions that, when executed via the one or more processors, cause the client computing device to receive, via a graphical user interface presented at a display unit of the client device, a first one or more user interactions indicative of one or more items. The instructions further cause the client device to, via communications between the client device and one or more servers, establish the client device as a host device in a publish/subscribe channel associated with the one or more items, the publish/subscribe channel enabling the client device to publish, to a plurality of guest devices in the publish/subscribe channel, real-time information associated with the one or more items. The instructions further cause the client device to obtain a video stream via the camera unit of the client device. The instructions still further cause the client device to receive, via the graphical user interface, a second one or more user interactions indicative of item information including at least (1) a particular item for sale from among the one or more items, and (2) a price of the particular item. The instructions still yet further cause the client device to transmit, to the one or more servers in real-time, the video stream and the item information for display of the real-time video stream concurrently with the item information at each of the plurality of guest devices in the publish/subscribe channel.

42. The client computing device of aspect 41, configured to perform the method of any one of aspects 34-40.

43. The one or more computer readable media of any one of aspects 27-33, read via the client computing device of either one of aspects 41-42.

44. One or more computer readable media storing non-transitory computer executable instructions. The instructions, when executed via one or more processors of a client computing device, cause the client computing device to receive, via a graphical user interface presented at a display unit of the client device, a user interaction indicating a selection of a publish/subscribe channel associated with one or more items. The instructions further cause the client device to, responsive to receiving the user interaction, and via communications with one or more servers, establish the client device as a first guest device in the publish/subscribe channel to enable the client device to receive real-time information published by a host device and by one or more other guest devices via the publish/subscribe channel. The instructions further cause the client device to, upon establishing the client device as the first guide device, receive and display at the display unit, via the graphical user interface, a real-time video stream associated with the publish/subscribe channel, the real-time video stream originating from the host device. The instructions still further cause the client device to receive, from the one or more servers via the publish/subscribe channel, a plurality of real-time values indicative of item information including at least (1) a particular item for sale from among the one or more items, the particular item being selected via the host device, (2) a real-time price of the particular item, and (3) real-time participation of the one or more other guest devices in the publish/subscribe channel. Still further, the instructions cause the client device to receive, from the one or more servers via the publish/subscribe channel, a time value indicative of an end time of the sale of the particular item. The instructions still yet further cause the client device to display, via the graphical user interface concurrently with the real-time video stream, a plurality of user interface elements indicative of the received item information and the end time.

45. The client computing device of aspect 44, wherein the non-transitory computer executable instructions, when executed via the one or more processors, further cause the client computing device to: receive, via the graphical user interface, one or more user interactions indicative of a bid for the particular item; and responsive to receiving the one or more interactions, transmit, to the one or more servers via the publish/subscribe channel, bid information indicative associated with the bid for the particular item.

46. The client computing device of aspect 45, wherein the non-transitory computer executable instructions, when executed via the one or more processors, further cause the client computing device to: receive, from the one or more servers via the publish/subscribe channel, a response message indicating the bid for the particular item was successful; and update the display of the real-time price of the particular item via the graphical user interface, based upon the bid information.

47. The client computing device of either one of aspects 45-46, wherein the non-transitory computer executable instructions, when executed via the one or more processors, further cause the client computing device to, upon receiving the response message, update the display of the end time via the graphical user interface.

48. The client computing device of any one of aspects 44-47, wherein the non-transitory computer executable instructions, when executed via the one or more processors, further cause the client computing device to: receive, from the one or more servers via the publish/subscribe channel, a further plurality of real-time values associated with a bid for the particular item originating one of the one or more other guest devices in the publish/subscribe channel, the further plurality of real-time values indicating at least (1) an update to the real-time price of the particular item, and (2) a user identifier associated with the another client computing device; and update the display of the real-time price and the real-time participation via the graphical user interface, based upon the further plurality of real-time values.

49. The client computing device of aspect 48, wherein the non-transitory computer executable instructions, when executed via the one or more processors, further cause the client computing device to update the display of the end time via the graphical user interface, based upon the receiving of the further plurality of real-time values.

50. The client computing device of any one of aspects 44-49, wherein the non-transitory computer executable instructions, when executed via the one or more processors, further cause the client computing device to: receive, via the graphical user interface, a further one or more user interactions indicating a request to view items associated with the publish/subscribe channel; and responsive to receiving the further one or more user interactions, display, via the graphical user interface, concurrently with the real-time video stream, an interactive real-time listing of the one or more items associated with the publish/subscribe channel.

51. The client computing device of any one of aspects 44-50, wherein the non-transitory computer executable instructions, when executed via the one or more processors, further cause the client computing device to: receive, via the graphical user interface, a further one or more user interactions indicating a request to add payment information for a user of the client computing device; and responsive to receiving the further one or more user interactions, display, via the graphical user interface, concurrently with the real-time video stream, one or more interactive controls to enable the user to add payment information associated with the user while viewing the real-time video stream.

52. The client computing device of any one of aspects 44-51, wherein the non-transitory computer executable instructions, when executed via the one or more processors, further cause the client computing device to: subsequent to an end to the sale of the particular item, receive a further plurality of real-time values from the one or more servers via the publish/subscribe channel, the further plurality of values indicating at least (1) a second item for sale from among the one or more items, and (2) a starting sale price of the second item; and display, via the graphical user interface concurrently with the real-time video stream, a further plurality of user interface elements indicative of the second item and the starting sale price.

53. A computer-implemented method comprises receiving, via a graphical user interface presented at a display unit of a client computing device, a user interaction indicating a selection of a publish/subscribe channel associated with one or more items. The method further comprises, responsive to receiving the user interaction, and via communications via one or more processors of the client computing device with one or more servers, establishing the client device as a first guest device in the publish/subscribe channel to enable the client device to receive real-time information published by a host device and by one or more other guest devices via the publish/subscribe channel. The method further comprises, upon establishing the client device as the first guide device, receiving and displaying at the display unit, via the graphical user interface, a real-time video stream associated with the publish/subscribe channel, the real-time video stream originating from the host device. The method still further comprises receiving, from the one or more servers via the publish/subscribe channel, a plurality of real-time values indicative of item information including at least (1) a particular item for sale from among the one or more items, the particular item being selected via the host device, (2) a real-time price of the particular item, and (3) real-time participation of the one or more other guest devices in the publish/subscribe channel. Still further, the method comprises receiving, from the one or more servers via the publish/subscribe channel, a time value indicative of an end time of the sale of the particular item. The method still further yet comprises displaying, via the graphical user interface concurrently with the real-time video stream, a plurality of user interface elements indicative of the received item information and the end time.

54. The method of aspect 53, further comprising: receiving, via the graphical user interface, one or more user interactions indicative of a bid for the particular item; and responsive to receiving the one or more interactions, transmitting, via the one or more processors to the one or more servers via the publish/subscribe channel, bid information indicative associated with the bid for the particular item.

55. The method of aspect 54, further comprising: receiving, via the one or more processors, from the one or more servers via the publish/subscribe channel, a response message indicating the bid for the particular item was successful; and via the one or more processors, updating the display of the real-time price of the particular item via the graphical user interface, based upon the bid information.

56. The method of either one of aspects 54-55, further comprising, upon receiving the response message, and via the one or more processors, updating the display of the end time via the graphical user interface.

57. The method of any one of aspects 53-56, further comprising: receiving, via the one or more processors from the one or more servers via the publish/subscribe channel, a further plurality of real-time values associated with a bid for the particular item originating one of the one or more other guest devices in the publish/subscribe channel, the further plurality of real-time values indicating at least (1) an update to the real-time price of the particular item, and (2) a user identifier associated with the another client computing device; and via the one or more processors, updating the display of the real-time price and the real-time participation via the graphical user interface, based upon the further plurality of real-time values.

58. The method of aspect 57, further comprising, via the one or more processors, update the display of the end time via the graphical user interface, based upon the receiving of the further plurality of real-time values.

59. The method of any one of aspects 53-58, further comprising: receiving, via the graphical user interface, a further one or more user interactions indicating a request to view items associated with the publish/subscribe channel; and responsive to receiving the further one or more user interactions, displaying, via the graphical user interface, concurrently with the real-time video stream, an interactive real-time listing of the one or more items associated with the publish/subscribe channel.

60. The method of any one of aspects 53-59, further comprising: receiving, via the graphical user interface, a further one or more user interactions indicating a request to add payment information for a user of the client computing device; and responsive to receiving the further one or more user interactions, displaying, via the graphical user interface, concurrently with the real-time video stream, one or more interactive controls to enable the user to add payment information associated with the user while viewing the real-time video stream.

61. The method of any one of aspects 53-60, further comprising: subsequent to an end to the sale of the particular item, receiving, via the one or more processors, a further plurality of real-time values from the one or more servers via the publish/subscribe channel, the further plurality of values indicating at least (1) a second item for sale from among the one or more items, and (2) a starting sale price of the second item; and displaying, via the graphical user interface concurrently with the real-time video stream, a further plurality of user interface elements indicative of the second item and the starting sale price.

62. A client computing device comprises one or more processors, a display unit, and one or more memories. The one or more memories store non-transitory computer executable instructions that, when executed via the one or more processors, cause the client computing device to receive, via a graphical user interface presented at the display unit of the client device, a user interaction indicating a selection of a publish/subscribe channel associated with one or more items. The instructions further cause the client device to, responsive to receiving the user interaction, and via communications with one or more servers, establish the client device as a first guest device in the publish/subscribe channel to enable the client device to receive real-time information published by a host device and by one or more other guest devices via the publish/subscribe channel. The instructions further cause the client device to, upon establishing the client device as the first guide device, receive and display at the display unit, via the graphical user interface, a real-time video stream associated with the publish/subscribe channel, the real-time video stream originating from the host device. The instructions still further cause the client device to receive, from the one or more servers via the publish/subscribe channel, a plurality of real-time values indicative of item information including at least (1) a particular item for sale from among the one or more items, the particular item being selected via the host device, (2) a real-time price of the particular item, and (3) real-time participation of the one or more other guest devices in the publish/subscribe channel. Still further, the instructions cause the client device to receive, from the one or more servers via the publish/subscribe channel, a time value indicative of an end time of the sale of the particular item. Still further yet, the instructions cause the client device to display, via the graphical user interface concurrently with the real-time video stream, a plurality of user interface elements indicative of the received item information and the end time.

63. The client computing device of aspect 62, configured to perform the method of any one of aspects 53-61.

64. The one or more computer readable media of any one of aspects 44-52, read via the client computing device of either one of aspects 62-63.

65. Any one of the above aspects in combination with any other suitable one or more of the above aspects.

Thus, many modifications and modifications and variations may be made in the techniques and structures described and illustrated herein without departing from the spirit and scope of the present claims. Accordingly, it should be understood that the methods and apparatus described herein are illustrative only and are not limiting upon the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Unless a claim element is defined by reciting the word "means" and a function without the recital of any structure, it is not intended that the scope of any claim element be interpreted based upon the application of 35 U.S.C. § 112(f). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Throughout the present disclosure, embodiments are described in which various elements are optional—present in some, but not all, embodiments of the system. Where such elements are depicted in the accompanying figures and, specifically, in figures depicting block diagrams, the optional elements are generally depicted in dotted lines to denote their optional nature.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for generating dynamic user experience applications through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed:

1. One or more computer readable media storing non-transitory computer executable instructions that, when executed via one or more processors of a client computing device, cause the client computing device to:
   receive, via a graphical user interface presented at a display unit of the client device, a first one or more user interactions indicative of one or more items;
   via communications between the client device and one or more servers, establish the client device as a host device in a publish/subscribe channel associated with the one or more items, the publish/subscribe channel enabling the client device to publish, to the one or more servers for distribution to a plurality of guest devices in the publish/subscribe channel, messages belonging to a first set of one or more message classes from among a plurality of message classes defined by the one or more servers, the messages real-time information associated with the one or more items;
   obtain a video stream via a camera unit of the client device;
   receive, via the graphical user interface, a second one or more user interactions indicative of item information including at least (1) a particular item for sale from among the one or more items, and (2) a price of the particular item;
   transmit, to the one or more servers in real-time, first communications indicating the item information, the first communications belonging to the first set of one or more message classes; and
   transmit, to the one or more servers in real-time, the video stream for display of the real-time video stream concurrently with the item information at each of the plurality of guest devices in the publish/subscribe channel.

2. The one or more computer readable media of claim 1, wherein establishing the client device as the host device further causes the host device to be subscribed to automatically receive, from the one or more servers, messages belonging to a second set of one or more message classes from among the plurality of message classes defined by the one or more servers, and wherein the non-transitory computer executable instructions, when executed via the one or more processors, further cause the client device to:
   receive, from the one or more servers in real-time, second communications indicative of real-time bid information comprising at least (1) a particular guest device from among the plurality of guest devices, and (2) a bid value of a bid placed via the particular guest device, the second communications belonging to the second set of one or more message classes; and
   display the bid information via the graphical user interface while continuing to obtain and transmit the video stream.

3. The one or more computer readable media of claim 1, wherein the instructions to receive the first one or more user interactions indicative of one or more items include instructions to:
   receive, via the graphical user interface, a search query; and
   receive, via the graphical user interface, a selection from a list of results of the search query presented via the graphical user interface in response to the search query.

4. The one or more computer readable media of claim 1, wherein the instructions to receive the first one or more user interactions indicative of one or more items include instructions to obtain, via the camera unit, image data depicting a barcode corresponding to an item to be included in the one or more items associated with the publish/subscribe channel.

5. The one or more computer readable media of claim 1, wherein the instructions to receive the second one or more user interactions indicative of one or more items include instructions to receive, via the graphical user interface, a selection of a setting to control a behavior of a timer associated with the sale of the particular item.

6. The one or more computer readable media of claim 1, wherein the non-transitory computer executable instructions, when executed via the one or more processors, further cause the client device to, subsequent to an end time of the sale of the particular item:
   receive, via the graphical user interface, a third one or more user interactions indicative of further item information including at least (1) a second item for sale from among the one or more items, and (2) a starting price of the second item; and
   transmit, to the one or more servers in real-time concurrently with the video stream, third communications indicating the further item information, the third communications belonging to the first set of one or more message classes.

7. The one or more computer readable media of claim 1, wherein the non-transitory computer executable instructions, when executed via the one or more processors, further cause the client device to:
   receive, from the one or more servers in real-time, further real-time information indicative of one or more comments posted via one or more of the guest devices in the publish/subscribe channel; and
   display the posted comments via the graphical user interface while continuing to obtain and transmit the video stream from the client device.

8. The one or more computer readable media of claim 1, wherein the publish/subscribe channel is a first publish/subscribe channel associated with a first one or more items, and wherein the non-transitory computer executable instructions, when executed via the one or more processors, cause the client device to:
   display, via the graphical user interface, an indication of a second publish/subscribe channel being available to the client device, the second publish/subscribe channel being associated with a second one or more items;
   receive, via the graphical user interface, a fourth one or more user interactions indicative of a selection of the second publish/subscribe channel;
   via fourth communications between the client device and the one or more servers, and responsive to the fourth one or more user interactions, establish the client device as a guest device in the second publish/subscribe channel, the establishing of the client device as the guest device in the second publish/subscribe channel causing the client device to be subscribed to automatically receive, from the one or more servers, messages belonging to a third set of one or more message classes from among the plurality of message classes defined by the one or more servers;

receive, from the one or more servers, fifth communications indicative of second item information including at least (1) a current item for sale from among the second one or more items, and (2) a price of the current item;

receive, from the one or more servers, a second real-time video stream associated with the second publish/subscribe channel; and display, via the graphical user interface, the second real-time video stream concurrently with the second item information.

9. The one or more computer readable media of claim 8, wherein establishing the client device as a guest device in the second publish/subscribe channel enables the client device to publish, to the one or more servers for distribution to a host device of the second publish/subscribe channel and to a further plurality of guest devices in the second publish/subscribe channel, messages belonging to a fourth set of one or more message classes from among the plurality of message classes defined by the one or more servers, and wherein the non-transitory computer executable instructions, when executed via the one or more processors, further cause the client device to:

receive, via the graphical user interface, a fifth one or more user interactions indicative of a bid for the current item; and responsive to receiving the fifth one or more user interactions, transmit, to the one or more servers via the second publish/subscribe channel, sixth communications indicative of the bid, the sixth communications belonging to the fourth set of one or more message classes.

10. A computer-implemented method comprising:

receiving, via a graphical user interface presented at a display unit of the client device, a first one or more user interactions indicative of one or more items;

via communications between one or more processors of the client device and one or more servers, establishing the client device as a host device in a publish/subscribe channel associated with the one or more items, the publish/subscribe channel enabling the client device to publish, to the one or more servers for distribution to a plurality of guest devices in the publish/subscribe channel, messages belonging to a first set of one or more message classes from among a plurality of message classes defined by the one or more servers, the messages real-time information associated with the one or more items;

obtaining a video stream via a camera unit of the client device;

receiving, via the graphical user interface, a second one or more user interactions indicative of item information including at least (1) a particular item for sale from among the one or more items, and (2) a price of the particular item;

transmitting, via the one or more processors to the one or more servers in real-time, first communications indicating the item information, the first communications belonging to the first set of one or more message classes; and transmitting, via the one or more processors to the one or more servers in real-time, the video stream for display of the real-time video stream concurrently with the item information at each of the plurality of guest devices in the publish/subscribe channel.

11. The computer-implemented method of claim 10, wherein establishing the client device as the host device further causes the host device to be subscribed to automatically receive, from the one or more servers, messages belonging to a second set of one or more message classes from among the plurality of message classes defined by the one or more servers, and the method further comprising:

receiving, from the one or more servers in real-time, second communications indicative of real-time bid information comprising at least (1) a particular guest device from among the plurality of guest devices, and (2) a bid value of a bid placed via the particular guest device, the second communications belonging to the second set of one or more message classes; and displaying the bid information via the graphical user interface while continuing to obtain and transmit the video stream.

12. The computer-implemented method of claim 10, wherein receiving the first one or more user interactions includes:

receiving, via the graphical user interface, a search query; and receiving, via the graphical user interface, a selection from a list of results of the search query presented via the graphical user interface in response to the search query.

13. The computer-implemented method of claim 10, wherein receiving the first one or more user interactions includes obtaining, via the camera unit, image data depicting a barcode corresponding to an item to be included in the one or more items associated with the publish/subscribe channel.

14. The computer-implemented method of claim 10, wherein receiving the second one or more user interactions includes receiving, via the graphical user interface, a selection of a setting to control a behavior of a timer associated with the sale of the particular item.

15. The computer-implemented method of claim 10, further comprising, subsequent to an end time of the sale of the particular item:

receiving, via the graphical user interface, a third one or more user interactions indicative of further item information including at least (1) a second item for sale from among the one or more items, and (2) a starting price of the second item; and transmitting, via the one or more processors to the one or more servers in real-time concurrently with the video stream, third communications indicating the further item information, the third communications belonging to the first set of one or more message classes.

16. The computer-implemented method of claim 10, further comprising:

receiving, via the one or more processors from the one or more servers in real-time, further real-time information indicative of one or more comments posted via one or more of the guest devices in the publish/subscribe channel; and displaying the posted comments via the graphical user interface while continuing to obtain and transmit the video stream from the client device.

17. The computer-implemented method of claim 10, wherein the publish/subscribe channel is a first publish/ subscribe channel associated with a first one or more items, and the method further comprising:

displaying, via the graphical user interface, an indication of a second publish/subscribe channel being available to the client device, the second publish/subscribe channel being associated with a second one or more items;

receiving, via the graphical user interface, a fourth one or more user interactions indicative of a selection of the second publish/subscribe channel;

via fourth communications between the one or more processors of the client device and the one or more servers, and responsive to the fourth one or more user interactions, establishing the client device as a guest device in the second publish/subscribe channel, the establishing of the client device as the guest device in the second publish/subscribe channel causing the client device to be subscribed to automatically receive, from the one or more servers, messages belonging to a third set of one or more message classes from among the plurality of message classes defined by the one or more servers;

receiving, from the one or more servers, fifth communications indicative of second item information including at least (1) a current item for sale from among the second one or more items, and (2) a price of the current item;

receiving, from the one or more servers, a second real-time video stream associated with the second publish/subscribe channel; and displaying, via the graphical user interface, the second real-time video stream concurrently with the second item information.

18. The computer-implemented method of claim 17, wherein establishing the client device as a guest device in the second publish/subscribe channel enables the client device to publish, to the one or more servers for distribution to a host device of the second publish/subscribe channel and to a further plurality of guest devices in the second publish/subscribe channel, messages belonging to a fourth set of one or more message classes from among the plurality of message classes defined by the one or more servers, and the method further comprising:

receive, via the graphical user interface, a fifth one or more user interactions indicative of a bid for the current item; and responsive to receiving the fifth one or more user interactions, transmitting, via the one or more processors to the one or more servers via the second publish/subscribe channel, sixth communications indicative of the bid, the sixth communications belonging to the fourth set of one or more message classes.

19. A client computing device comprising:
one or more processors;
a display unit;
a camera unit; and
one or more memories storing non-transitory computer executable instructions that, when executed via the one or more processors, cause the client computing device to:
receive, via a graphical user interface presented at the display unit, a first one or more user interactions indicative of one or more items;
via communications between the client device and one or more servers, establish the client device as a host device in a publish/subscribe channel associated with the one or more items, the publish/subscribe channel enabling the client device to publish, to the one or more servers for distribution to a plurality of guest devices in the publish/subscribe channel, messages belonging to a first set of one or more message classes from among a plurality of message classes defined by the one or more servers, the messages real-time information associated with the one or more items;

obtain a video stream via the camera unit;

receive, via the graphical user interface, a second one or more user interactions indicative of item information including at least (1) a particular item for sale from among the one or more items, and (2) a price of the particular item;

transmit, to the one or more servers in real-time, first communications indicating the item information, the first communications belonging to the first set of one or more message classes; and transmit, to the one or more servers in real-time, the video stream for display of the real-time video stream concurrently with the item information at each of the plurality of guest devices in the publish/subscribe channel.

20. The client computing device of claim 19, wherein establishing the client device as the host device further causes the host device to be subscribed to automatically receive, from the one or more servers, messages belonging to a second set of one or more message classes from among the plurality of message classes defined by the one or more servers, and wherein the non-transitory computer executable instructions, when executed via the one or more processors, further cause the client device to:

receive, from the one or more servers in real-time, second communications indicative of real-time bid information comprising at least (1) a particular guest device from among the plurality of guest devices, and (2) a bid value of a bid placed via the particular guest device, the second communications belonging to the second set of one or more message classes; and display the bid information via the graphical user interface while continuing to obtain and transmit the video stream.

21. The client computing device of claim 19, wherein the instructions to receive the first one or more user interactions indicative of one or more items include instructions to:

receive, via the graphical user interface, a search query; and receive, via the graphical user interface, a selection from a list of results of the search query presented via the graphical user interface in response to the search query.

22. The client computing device of claim 19, wherein the instructions to receive the first one or more user interactions indicative of one or more items include instructions to obtain, via the camera unit, image data depicting a barcode corresponding to an item to be included in the one or more items associated with the publish/subscribe channel.

23. The client computing device of claim 19, wherein the instructions to receive the second one or more user interactions indicative of one or more items include instructions to receive, via the graphical user interface, a selection of a setting to control a behavior of a timer associated with the sale of the particular item.

24. The client computing device of claim 19, wherein the non-transitory computer executable instructions, when executed via the one or more processors, further cause the client device to, subsequent to an end time of the sale of the particular item:

receive, via the graphical user interface, a third one or more user interactions indicative of further item information including at least (1) a second item for sale from among the one or more items, and (2) a starting price of the second item; and transmit, to the one or more servers in real-time concurrently with the video stream, third communications indicating the further item information, the third communications belonging to the first set of one or more message classes.

25. The client computing device of claim 19, wherein the non-transitory computer executable instructions, when executed via the one or more processors, further cause the client device to:

receive, from the one or more servers in real-time, further real-time information indicative of one or more comments posted via one or more of the guest devices in the publish/subscribe channel; and display the posted comments via the graphical user interface while continuing to obtain and transmit the video stream from the client device.

26. The client computing device of claim 19, wherein the publish/subscribe channel is a first publish/subscribe channel associated with a first one or more items, and wherein the non-transitory computer executable instructions, when executed via the one or more processors, cause the client device to:

display, via the graphical user interface, an indication of a second publish/subscribe channel being available to the client device, the second publish/subscribe channel being associated with a second one or more items;

receive, via the graphical user interface, a fourth one or more user interactions indicative of a selection of the second publish/subscribe channel;

via fourth communications between the client device and the one or more servers, and responsive to the fourth one or more user interactions, establish the client device as a guest device in the second publish/subscribe channel, the establishing of the client device as the guest device in the second publish/subscribe channel causing the client device to be subscribed to automatically receive, from the one or more servers, messages belonging to a third set of one or more message classes from among the plurality of message classes defined by the one or more servers;

receive, from the one or more servers, fifth communications indicative of second item information including at least (1) a current item for sale from among the second one or more items, and (2) a price of the current item;

receive, from the one or more servers, a second real-time video stream associated with the second publish/subscribe channel; and display, via the graphical user interface, the second real-time video stream concurrently with the second item information.

27. The client computing device of claim 26, wherein establishing the client device as a guest device in the second publish/subscribe channel enables the client device to publish, to the one or more servers for distribution to a host device of the second publish/subscribe channel and to a further plurality of guest devices in the second publish/subscribe channel, messages belonging to a fourth set of one or more message classes from among the plurality of message classes defined by the one or more servers, and wherein the non-transitory computer executable instructions, when executed via the one or more processors, further cause the client device to:

receive, via the graphical user interface, a fifth one or more user interactions indicative of a bid for the current item; and responsive to receiving the fifth one or more user interactions, transmit, to the one or more servers via the second publish/subscribe channel, sixth communications indicative of the bid, the sixth communications belonging to the fourth set of one or more message classes.

* * * * *